United States Patent
Komatsu et al.

(10) Patent No.: US 8,408,470 B2
(45) Date of Patent: Apr. 2, 2013

(54) OBJECT FOR AUTHENTICATION VERIFICATION, AUTHENTICATION VERIFYING CHIP READING DEVICE AND AUTHENTICATION JUDGING METHOD

(75) Inventors: Nobuaki Komatsu, Tokyo (JP); Shin-ichiro Nanjo, Tokyo (JP)

(73) Assignee: International Frontier Technology Laboratory, Inc., Tokyo (JP)

( * ) Notice: Subject to any disclaimer, the term of this patent is extended or adjusted under 35 U.S.C. 154(b) by 649 days.

(21) Appl. No.: 12/600,412

(22) PCT Filed: May 14, 2008

(86) PCT No.: PCT/JP2008/058849
§ 371 (c)(1), (2), (4) Date: Nov. 16, 2009

(87) PCT Pub. No.: WO2008/143087
PCT Pub. Date: Nov. 27, 2008

(65) Prior Publication Data
US 2010/0193590 A1      Aug. 5, 2010

(30) Foreign Application Priority Data

May 14, 2007   (JP) ................................ 2007-128678
Jun. 15, 2007   (JP) ................................ 2007-158232

(51) Int. Cl.
*G06K 7/10*    (2006.01)
(52) U.S. Cl. ........ 235/470; 235/435; 156/220; 264/284; 382/100; 359/2
(58) Field of Classification Search .................. 235/470, 235/435; 156/220; 264/284; 382/100; 359/2
See application file for complete search history.

(56) References Cited

U.S. PATENT DOCUMENTS
(Continued)

FOREIGN PATENT DOCUMENTS

| JP | 58-150162 U | 10/1983 |
|----|-------------|---------|
| JP | 06-164825 A | 6/1994 |

(Continued)

OTHER PUBLICATIONS

Singapore Search Report dated Jun. 3, 2011, issued in corresponding Singapore Patent Application No. 200907570-6.

(Continued)

*Primary Examiner* — Allyson Trail
(74) *Attorney, Agent, or Firm* — Westerman, Hattori, Daniels & Adrian, LLP

(57) ABSTRACT

A structure of a subject such as a card, a bank note, or a stock certificate easily faked and needing authenticity validation and a method for judging the authenticity of the subject. An authenticity validation chip having structural color developers irregularly arranged is attached to a card. An optical sensor detects the arrangement of the structural color developers to individually recognize the card or judge its authenticity. To validate the authenticity, when or after the card is taken in, the information in the authenticity validation chip provided on the card is read. Each of the structural color developers is a transparent resin flake or a transparent resin thin layer. The information is read two-dimensionally with a camera, and the authenticity of the authenticity validation chip is judged by observing the distributed state of the structural color developers. Alternatively, the information can be read linearly. A given straight or curved line can be used by altering the read portion while associating the shape of the read line with the movement of the card in taking in the card.

42 Claims, 48 Drawing Sheets (a)

(b)

U.S. PATENT DOCUMENTS

| | | | | |
|---|---|---|---|---|
| 5,464,690 A | * | 11/1995 | Boswell | 428/334 |
| 8,059,858 B2 | * | 11/2011 | Brundage et al. | 382/100 |
| 2004/0104273 A1 | | 6/2004 | Nakamura | |
| 2012/0062966 A1 | * | 3/2012 | Nanjo | 359/2 |

FOREIGN PATENT DOCUMENTS

| | | |
|---|---|---|
| JP | 10-044650 A | 2/1998 |
| JP | 2002-103777 A | 4/2002 |
| JP | 2003-029636 A | 1/2003 |
| JP | 2003-272021 A | 9/2003 |
| JP | 2004-171109 A | 6/2004 |
| JP | 2005-119097 A | 5/2005 |
| JP | 2006-247871 A | 9/2006 |

OTHER PUBLICATIONS

International Search Report of PCT/JP2008/058849, mailing date of Aug. 19, 2008.

* cited by examiner (a)

OBJECT FOR AUTHENTICATION VERIFICATION, AUTHENTICATION VERIFYING CHIP READING DEVICE AND AUTHENTICATION JUDGING METHOD

FIELD OF THE INVENTION

The present invention relates to a structure of an object such as a card, a bank note, securities, etc., which is often forged or counterfeited and which requires authentication to check whether it is authentic or not. The invention also relates to a method for verifying the authenticity of such the object.

BACKGROUND ART

In the present-day society, which is often called a card-oriented society, a wide variety of cards are used. There are cards relating to the assets of a property owner such as a bank cash card, a credit card of a credit company, a prepaid card such as securities, and identification cards such as a driver's license, a health insurance card and a passport.

On many types of cards relating to the personal property or securities and bonds, necessary information is written on a magnetic stripe disposed on the surface or on the rear surface of the card. By using an automatic machine such as an ATM (automated teller machine) or a manual reading device, magnetic information is read from the magnetic stripe, and various types of processing are carried out.

FIG. 1 (a) illustrates an example of a cash card currently in use in a cash card processing flow. The reference numeral 1 shows a cash card body made of plastics or the like. On its front surface, there are provided a magnetic stripe 2 where information is recorded and an arrow mark 3 to indicate the card inserting direction. Although not shown in the drawing, other necessary matters are entered thereon by embossed characters.

Because the information written in the magnetic stripe can be easily read by using a device called skimmer, the card is often forged and used, and this causes troubles and damages.

To overcome the problems, an IC card incorporating a semiconductor memory has been used, and this type of card is now propagated through the efforts of banks and credit card companies to replace the magnetic card.

However, even in the case of this IC card, it is possible to read the information stored in the memory, and this card may not be absolutely safe when elaborate forgery is attempted. In addition, the IC card is much more expensive compared with the magnetic card, and it would be hard to expect the rapid propagation of the IC card.

In case of a bank cash card, it would suffice if the card can be used within the boundary of one country. In case of the credit card; however, the card must also be usable in foreign countries. The credit card is a magnetic card used worldwide, and it is very difficult to replace it with the IC card of unified standards.

Further, on the cash card and the credit card, information such as the name of the card owner is given by means of embossing. Because these types of information are also given in the magnetic information, the embossed information may often serve as a clue in the preparation for forging a card.

When these magnetic cards or IC cards are lost or stolen, the card owner may easily become aware of the loss or theft. When the card comes back into the hand of the original owner after it has been stolen, and, in particular, when the card owner does not become aware of the fact that the card has been stolen, it is liable to cause damage by the use of the forged card.

Not for the prevention of the illegitimate use to prevent the card forgery, but as the means for identifying the qualification of a card user, a personal identification number, consisting of 4-digit numbers, has been used. Since assumable numbers have been often used for these personal identification numbers, there have been many cases of the loss and damage. In recent years, the personal identification number is stolen not only by assumption of it but also by peeping such as the means of stealthily taking a photograph of the personal identification number. It is now very difficult to prevent the illegitimate use of cards by using the personal identification number.

For the prevention of trouble or damage caused by the use of the forged card, biometrics technique based on pattern recognizing technique is sometimes adopted. As representative examples of biometrics technique, iris recognition, finger prints recognition, palm-prints recognition, finger vein recognition, palm vein recognition, and hand-back vein recognition are known. As the recognition other than iris recognition, there are contact type and non-contact type recognition. In both cases, it is necessary to register the pattern in advance. Time and procedures are required for the registration of the pattern, and also, much time is needed for the recognition of the pattern itself, and that results higher costs.

In case of the contact type recognition, the user must directly touch a detection device, and this often causes physiological repugnance or disgust. When the user has injury on the physical part necessary for the biometrical recognition, or in the worst case where the user has lost the physical part to be needed for the recognition, the biometrics recognition cannot be carried out. Also, the recognition is partially made during the process of identifying, and accordingly, it is not a perfect method.

Further, in the system using the biometrical recognition where only the card owner himself or herself can use, even when the card owner wants to ask somebody to handle the card on behalf of the owner, who has not enough time to use the card personally or does not find a card processing device nearby, it is not allowed. This causes much inconvenience to the user.

As one of the means to prevent the forgery, an embossed hologram on a plastic base with surface irregularities is mounted on credit cards, prepaid cards, bank notes, securities, etc. This embossed hologram is very difficult to copy, and it is practically impossible to forge the cards with the embossed hologram. However, in the current practice, it is a person, who reads the embossed hologram at a glance. In this respect, it is possible to forge the card by using a similar embossed hologram and to use.

FIG. 1 (b) illustrates an example of a credit card with the embossed hologram, in which the card authentication is verified by the human sense. The reference numeral 1 shows a credit card body made of plastics or the like. On its front surface, a magnetic stripe 2 where information is recorded and an arrow mark 3 to indicate the inserting direction of the credit cash card are provided. Although not shown in the drawing, necessary matters are given thereon by embossed characters.

The credit cash card 1 is inserted into a terminal device with a portion with the arrow mark 3 at the foremost position. Near the forward end, an authentication verifying chip 4 consisted of, for example, an embossed hologram is mounted.

In case of a credit card, unlike the cash card, the magnetic stripe is disposed on the rear surface of the card. However, the direction to insert the card into the terminal device is the same. As a result, the reading direction of the magnetic information on the credit card is reverse to the case of the cash card.

In the verifying chip 4, a pattern [A] is confirmed by a person, who inserts the card into the terminal device by visual inspection, i.e., by sensuous means, but is not read by the card terminal device. Because, in the authentication verification based on the human sense, there are wide varieties in the ability of each individual person who confirms and identifies, and there are differences and varieties in the conditions of recognizing, psychological conditions, physical conditions, etc. even when by the same person. This method, thus, gives high effect in primary screening, but its reliability is low.

In the authentication verification by using supplementary tools or implements, it is carried out by using ultra-fine lines, special lines and micro-characters by using a screen with special shape, a magnifying device such as a magnifying glass or a special type filter generating optical interferences. Practically, a material having a special optical property is mixed into the base material, laminated film or ink using such as a base material with light-emitting property, a light-emitting laminated film, light-emitting ink, thermo-chromic ink, photo-chromic ink, etc., and the auxiliary tool of a special filter, a ultra-violet ray lamp, etc. is used. Even when these types of implements are used, final verification depends on human sense, and the reliability is low.

In the authentication verification by means of mechanical processing, it is carried out by mechanically detecting the property, such as the magnetic or optical property, of the object material. Practically, a light-emitting material or a magnetic material is mixed into a base material, laminated film or ink and a detection device is used. Or, special coded information is magnetically or optically added by means of OCR characters or magnetic barcodes, and a magnetic or optical detection device is used.

In the authentication verifying technique by means of the mechanical processing, an artifact-metrics system using an artifact without having reproducibility, randomly arranged in a medium, is used instead of the information specific to the living body. This is described in "Financial Business and Artifact-Metrics" published by the Institute for Monetary and Economic Studies, the Bank of Japan (http://www.imes.bo-j.or.jp/japanese/jdps/2004/04-J-12.pdf) and "The Patterns of Artifact-Metrics in Financial Field"; 6th Information Security Symposium (http://www.imes.boj.or.jp/japanese/kinyu/2004/kk23-2-6.pdf).

In the artifact-metrics system, a light reflecting pattern of granular substances, a transmission light pattern of optical fibers, a parallax image pattern of polymer fibers, a fiber image pattern, a magnetic pattern of magnetic fibers, a random-recorded magnetic pattern, a random magnetic pattern of a magnetic stripe, a random electric charge pattern of a memory cell, a resonance pattern of electrically conductive fibers, a resonance pattern of a vibrating seal, etc., which are produced by mere chance, are used.

As the matters subject to the illegitimate use or the forgery of the card, "the information of the descriptions of the card" added when the card is issued to a user and "the information of the card" given to the card in the manufacturing process are included. ("Handbook on the Technique to Prevent Forgery on the Surface of Affiliated IC Cards", published by the National Printing Bureau, the Ministry of Finance (see: http://www.npb.go.jp/ja/info/ichb.pdf).

The information of the descriptions of the card is the information which is accorded and printed on the card body when issued to the user, and which is relating to the card issuance such as the card owner information, the period of validity, etc. Falsification, which is a typical act of the illegitimate use of the card, is an act to alter all or a part of the information of the descriptions of the card, done by erasing the genuine information and adding illegitimate information.

The information of the card is the information of the card itself, other than the information of the descriptions of the card on the issued card. It is the information relating to the card body such as the physical shape of the card, background patterns applied to the card in pre-printing process, printing layer on underlying layer and laminated protective layer, etc.

Forgery is an illegal act conducted on the card body. Design or pattern, which gives information relating to the card body, is copied or imitated, and a card, which is similar to the authentic card in external appearance, is produced. Actually, the design, patterns, etc. on the surface of the authentic card are read by the means such as a scanner, which are then, edited or altered by using the means such as a printer. Many types of techniques to prevent the forgery of the card body are known through combining the printing mode, types of ink, printing patterns, etc., only in the printing art, but no decisive technique is found yet at present.

The methods for authentication verifying to recognize and identify the forgery can be roughly classified as a method based on human sensuous ability; a method using supplementary tools; and a method by mechanical processing.

In the authentication verifying by the human sensuous ability, it is carried out by the sensuous ability such as the visual sense, the tactile sense, etc. The means to identify by the visual sense includes colors of the card itself, a watermark and a hologram, which changes the color and patterns provided on the card by changing the viewing angle. The means to identify by the tactile sense includes detecting the surface irregularities added on the card and detecting the texture of the card body itself. Actually, a logo mark, a special font, printing lines for preventing copying, special color ink, embossed hologram, an optically changing material, a latent image pattern, etc., which are difficult to copy or copy and in which the authenticity of the card can be easily identified by the visual sense are used. And embossing, surface irregularities, perforation, etc. are also used, on which the authenticity can be identified by the finger touch or by the visual sense.

FIG. 2 shows a conventional example of a card, to which an artifact-metrics chip using metal granules is mounted as disclosed in Japanese Patent Laid-Open Publication No. H10-44650. FIG. 2 (*a*) is a general view, FIG. 2 (*b*) is a cross-sectional view, and FIG. 2 (*c*) is an enlarged view of the verifying chip.

In the card 1, the artifact-metrics chip 4 in form of a thin-plate shape made of a transparent resin mixed with metal granules 5 is layered on a card base plate 7, having a non-transparent property, which has an opening 4 for an authentication verifying chip. And a non-transparent card surface plate 6 is further layered, in which a magnetic stripe 2 and an arrow mark 3 to indicate the card inserting direction are formed thereon and an opening is arranged at the same position as the opening on the card base plate 7.

Because the metal granules 5 are mixed in the transparent resin three-dimensionally without regularity, the arrangement pattern of the metal granules 5 as observed through the opening is specific to each of the artifact-metrics chip 4. By utilizing this feature, a light to pass through the artifact-metrics chip 4 is photographed via the opening, and the arrangement pattern of the metal granules 5 can be observed. Therefore, it is possible to identify each individual artifact-metrics chip 4 and then, the card.

FIG. 3 shows another conventional example of a card, to which an artifact-metrics chip using fibers is mounted as disclosed in Japanese Patent Laid-Open Publication No.

2003-29636 is mounted. FIG. 3 (a) is a general view, FIG. 3 (b) is a cross-sectional view, and FIG. 3 (c) is an enlarged view of the artifact-metrics chip.

In the card, an artifact-metrics chip 8 containing a mesh member 9 and short fibers 10 three-dimensionally mixed in a transparent resin is placed into an opening of a card base plate 1, which has a non-transparent property. On the surface of the card base plate 1, a magnetic stripe 2 and an arrow mark 3 to indicate the card inserting direction are disposed. On the artifact-metrics chip 8, an interference pattern is generated by the pattern of the mesh members 9 and by the short fibers 10.

This interference pattern is inherent in each of the artifact-metrics chip 8, i.e., specific to each card. By utilizing this feature, the pattern of the artifact-metrics chip 8 of the verifying chip is photographed through a transmitted light or a reflected light for the card to be identified.

Mechanical reading of such the pattern of biometrics or artifact-metrics is generally performed by an image-pickup device and the result is identified by a pattern-recognition technique. In this respect, there is a possibility that forgery can be made according to a copying technique.

FIG. 4 shows a basic arrangement of a card where a monochromatic embossed hologram chip is mounted as proposed by the applicant of the present invention. FIG. 4 (a) is a general view, FIG. 4 (b) is a cross-sectional view, FIG. 4 (c) is a cross-sectional view of the embossed hologram chip, FIG. 4 (d) is a drawing to explain the function of the embossed hologram chip, and FIG. 4 (e) shows a detection signal as outputted.

In a card 11, a surface plate 13 is mounted on a card base plate 14 having a non-transparent property, and an embossed hologram chip 12 is attached on it. FIG. 4 shows a basic arrangement of a card where a monochromatic embossed hologram chip is mounted as proposed by the applicant of the present invention. On the surface plate 13, a magnetic stripe 2 and an arrow mark 3 are disposed.

FIG. 4 (c) shows a basic structure of an embossed hologram chip.

On an embossed hologram chip base plate 15, a pit 16 with depth equal to ¼ wavelength of an incident light in use and a flat portion 17 where no pit is formed are arranged. A reflection layer 19 made of a material such as metal is formed on the embossed hologram chip base plate 15 and the pit 16. Reference numeral 18 represents a protective cover.

Referring to FIG. 4 (d), description will be given on the functions of the embossed hologram chip.

A light with a wavelength λ (lambda), which enters through the protective cover 18, is reflected at the flat portion 17 and a flat bottom of the pit 16, and the light with the wavelength λ as shown by solid line arrows is detected outside. On the edge of the pit 16, the light reflected at the upper end and the light reflected at the lower end are different on their phases by 180° and accordingly, negate each other. The light with the wavelength λ, shown each by a broken line arrow is not detected outside.

As illustrated in FIG. 4 (e), the reflection light detected signal dips at the boundary between the flat portion 17 and the pit 16, and this dipping occurs two times to a single pit 16. By utilizing this feature, the pit 16 can be reliably detected.

The laser beam used is an infrared laser beam with λ=780 nm (λ/4=195 nm) in case of a CD. In case of a DVD, a red laser with λ=650 nm (λ=151.25 nm) is used. In case of the next generation DVD, using a blue-violet laser with λ=405 nm, an ultraviolet laser with λ=351 nm or a far ultraviolet laser with λ=266 nm is under study. The depth of the pit, λ/4 is 101.25 nm, 87.75 nm or 66.5 nm respectively.

FIG. 5 shows a card capable of authentication verification, which the applicant of the present invention proposed in PCT/JP2006/325226. FIG. 5 (a) is a view as seen from above, FIG. 5 (b) is a cross-sectional view, and FIG. 5 (c) is an enlarged cross-sectional view. The reference numeral 31 represents a card body where a magnetic stripe 2 and an arrow mark 3 to indicate the card inserting direction are arranged. On a card base plate 35, an authentication verifying chip 32 is layered, and a surface plate 34 is layered further on the authentication verifying chip 32.

The base plate 35 is a thick synthetic resin plate as widely used in a cash card or the like, or a thin synthetic resin plate used in a prepaid card.

The authentication verifying chip 32 is made of synthetic resin, and fluorescent substance granules 33 are uniformly mixed all over the synthetic resin plate.

FIG. 6 shows a card capable of authentication verification, which the applicant of the present application proposed in PCT/JP2006/325227. FIG. 6 (a) is a view as seen from above, FIG. 6 (b) is a cross-sectional view, and FIG. 6 (c) is an enlarged cross-sectional view. The reference numeral 41 represents a card body where a magnetic stripe 2 and an arrow mark 3 to indicate the card inserting direction are arranged. On a card base plate 44, an authentication verifying chip 42 and a surface plate 45 are layered. Further, another surface plate may be layered on the authentication verifying chip 42 and the surface plate 45.

Reference numeral 84 represents a surface plate, and another surface plate may be layered on the authentication verifying chip 62 and the surface plate 64.

The card base plate 44 is a thick synthetic resin plate as widely used in a cash card or the like, or a thin synthetic resin plate used in a prepaid card. The surface plate 45 is made of synthetic resin, having an opening where the authentication verifying chip 42 is to be placed at the center. A radiation admitting material or a radiation shielding material may be used as the material of the surface plate 45. A radiation admitting material is used for a surface plate which is layered further on the authentication verifying chip 42 and the synthetic resin surface plate 45.

The authentication verifying chip 42 has such an area and thickness to be placed in the opening of the surface plate 45, and radioactive substance granules 43 are mixed therein. α-ray radioactive substance such as $^{232}$Th, $^{235}$U, $^{238}$U, β-ray radioactive substance such as $^{40}$K, $^{210}$Pb, etc. may be used as natural radioactive substance granules. α-ray radioactive substance such as $^{241}$Am, $^{244}$Cm, etc., and β-ray radioactive substance such as $^{60}$Co, $^{90}$Sr, $^{137}$Cs, etc., and γ-ray radioactive substance such as $^{22}$Na, $^{51}$Cr, $^{54}$Mn, $^{57}$Co, $^{60}$Co, $^{133}$Ba, $^{241}$Am, etc. may be used as artificial radioactive substance granules.

When considering the problems related to the exposure to radiation, it is desirable to avoid the use of γ-ray radioactive substance because the reaching distance is long and its shielding is difficult. If granules of a non-radioactive substance, which is an isomer of radioactive substance, are mixed, the mixed condition of the radioactive substance granules cannot be confirmed unless radiation detecting means is used. It is desirable that the synthetic resin, where radioactive substance granules are to be mixed, is a material, is not changed by radiation.

In Japanese Patent Laid-Open Publication No. 2004-171109, a verification device having a substance Lamé which is embedded in a base material with high transparent property and which reflects light, is disclosed. In this verification device, Lamé in form of a cylindrical shape, a quadrangular prism or a quadrangular pyramid for reflecting light on the surface is embedded at random inside a transparent resin.

[Patent Document 1] Japanese Patent Laid-Open Publication No. H10-44650

[Patent Document 2] Japanese Patent Laid-Open Publication No. 2003-29636

[Patent Document 3] Japanese Patent Laid-Open Publication No. 2004-171109

[Non-Patent Document 1] "Financial Business and Artifact-Metrics" published by the Institute for Monetary and Economic Studies, the Bank of Japan (http://www.imes.boj.or.jp/japanese/jdps/2004/04-J-12.pdf)

[Non-Patent Document 2] "The Patterns of Artifact-Metrics in Financial Field"; 6th Information Security Symposium (http://www.imes.boj.or.jp/japanese/kinyu/2004/kk23-2-6.pdf)

[Non-Patent Document 3] "Handbook on the Technique to Prevent Forgery on the Surface of Affiliated IC Cards", published by the National Printing Bureau, the Ministry of Finance (see: http://www.npb.go.jp/ja/info/ichb.pdf).

DISCLOSURE OF THE INVENTION

Object of the Invention

To overcome the above problems, it is a first object of the present invention to provide a structure of an authentication verifying chip, which has a non-reproducible and copy-unable verification pattern.

Also, it is a second object of the invention to provide a method for producing an authentication verifying chip, which has a copy-unable verification pattern.

Further, it is a third object of the invention to provide means for reading a verification pattern which is unable to copy.

Also, it is a fourth object of the invention to provide means for certifying that the verification pattern is authentic.

Means for the Object

To attain the first object of the invention, the present application provides an invention on a structure of an authentication verifying chip in which iridescence is viewed where an incident light entered into a transparent medium appeared as strengthened when the phase of the light reflected at the surface of the transparent medium concurs with the phase of the light reflected at the rear surface of the medium, and appeared as weakened when the phases of the above reflected lights differ by one-half of the wavelength.

To attain the second object of the invention, the present application provides an invention on a method to produce an authentication verifying chip in which iridescence is viewed.

To attain the third object of the invention, the present application provides an invention relating to means for reading authentication information from the authentication verifying chip in which iridescence is viewed and to confirm the validity of authentication information.

To attain the fourth object of the invention, the present application provides an invention relating to means for certifying the validity of the authentication verifying chip by an authentication verifying chip producer side by using an authentication certifying chip where the information of the authentication verifying chip is encrypted.

Effects of the Invention

It is impossible to forge and falsify a card provided with an authentication verifying chip having a substance in which iridescence appears, which is formed by mere chance and is impossible to copy.

BRIEF DESCRIPTIONS OF THE DRAWINGS

FIG. 29 shows an authentication verifying chip prepared according to random numbers;

Figure 1:
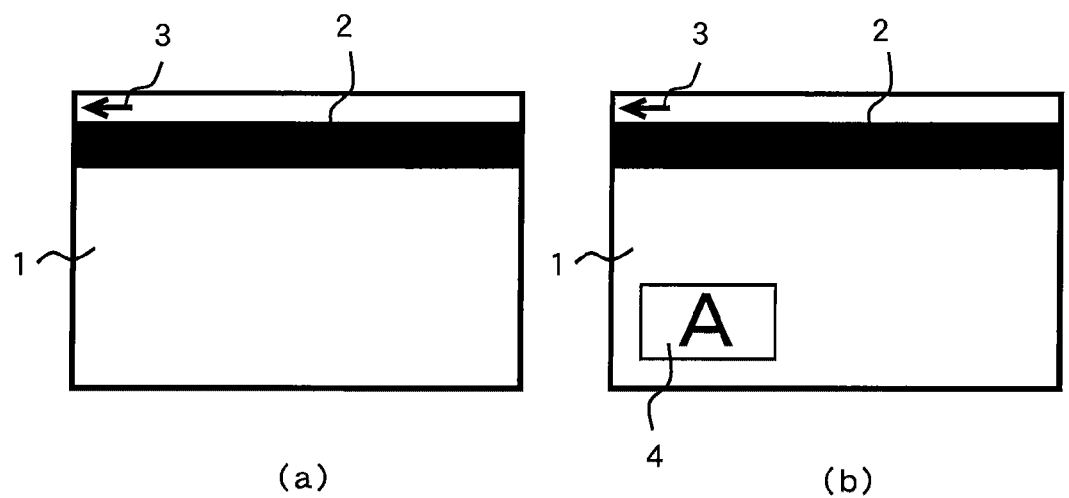
FIG. 1 shows a conventional type cash card or credit card.
Figure 2:
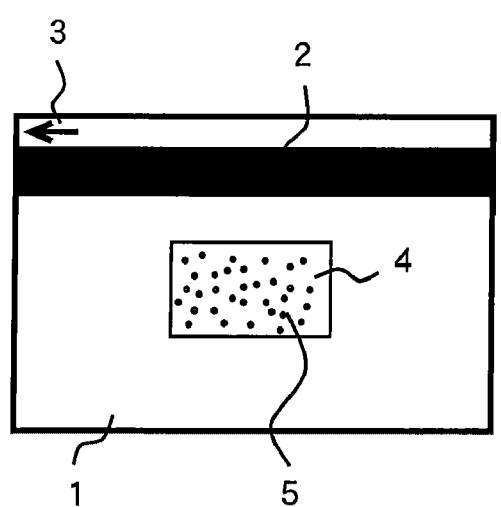
FIG. 2 shows an example of a conventional type card using artifact-metrics based on metal granules.
Figure 2:
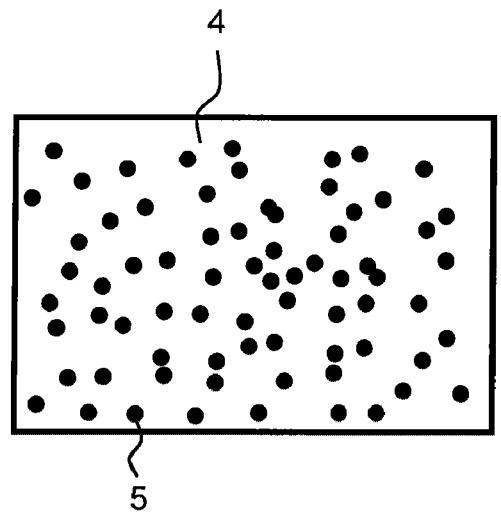
Figure 2:
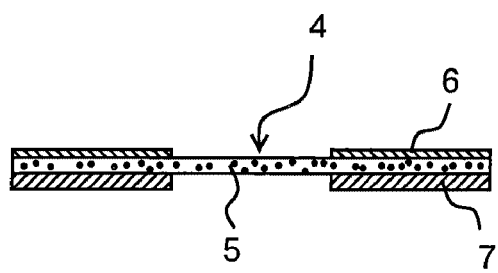
Figure 3:
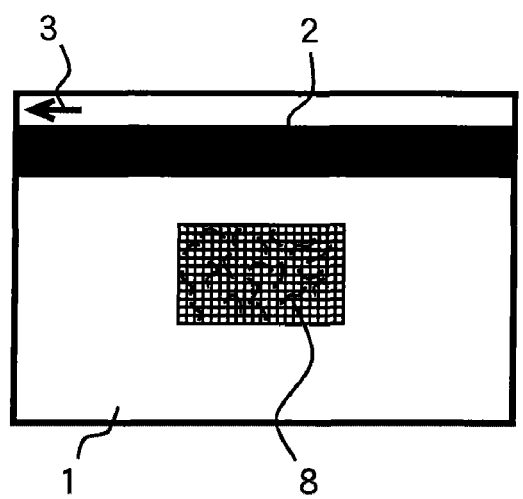
FIG. 3 shows an example of a conventional type card using artifact-metrics based on fiber pieces.
Figure 3:
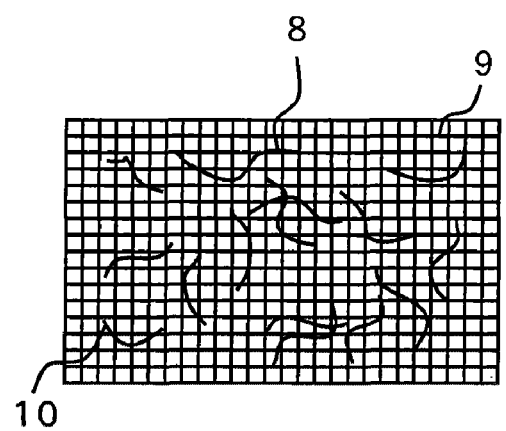
Figure 3:
Figure 3:
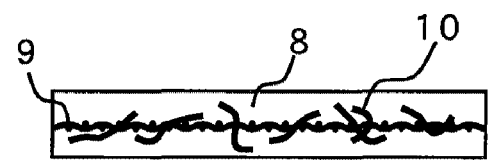

BRIEF DESCRIPTION OF THE REFERENCE NUMERALS 1, 21, 24, 11, 31, 41, 61, 81, 101, 111, 131, 151, 191, 194, 196 and 198: card
2: a magnetic stripe
3: an arrow mark
4, 8, 12, 21, 25, 65, 78, 82, 102, 112, 132, 140, 153 and 192: an authentication verifying chip
5: metal granules
6, 13, 34, 45, 64, 84, 104, 113, 133 and 154: a surface plate
7, 14, 35, 44, 63, 85, 105, 114, 134 and 152: a base plate
9: a mesh member
10: fiber piece
50, 53, 57, 68, 69, 74, 75, 83, 90, 94, 103, 118, 127 and 135: transparent medium
51, 54, 58, 59, 91, and 95: an incident surface
52, 55, 56, 60, 92, and 96: a surface for reflecting
65, 77, 78, 82, 102, 112 and 132: transparent synthetic resin
22, 66, 73, 74 and 75: a piece of iridescence
67: a layer for reflecting
70: bottom
79: a boundary surface
93, 125 and 129: synthetic resin
121 and 124: a chip base member
117: a pit
141: a position alignment mark
142: a line to start the reading in moving direction
143: a line to finish the reading in moving direction
144 and 145: a line to indicate the end portion
146: a mark for synchronization
191, 196 and 198: a card body
155 and 156: a lighting source
157: a color camera
151: R-LED
152: G-LED
153: B-LED
164: a monochrome camera
166: light emitting/detecting elements matrix
171: a red light emitting/detecting elements array
172: a green light emitting/detecting elements array
173: a blue light emitting/detecting elements array
174: light emitting/detecting elements
181, 185 and 186: a reflecting mirror having a parabolic cylinder
182: a light hole
184: a polygonal mirror
183: light emitting/detecting elements

BEST MODE FOR CARRYING OUT THE INVENTION

Description will be given below on embodiments of the present invention according to the present application.

[Authentication Verifying Chip]

Figure 7:
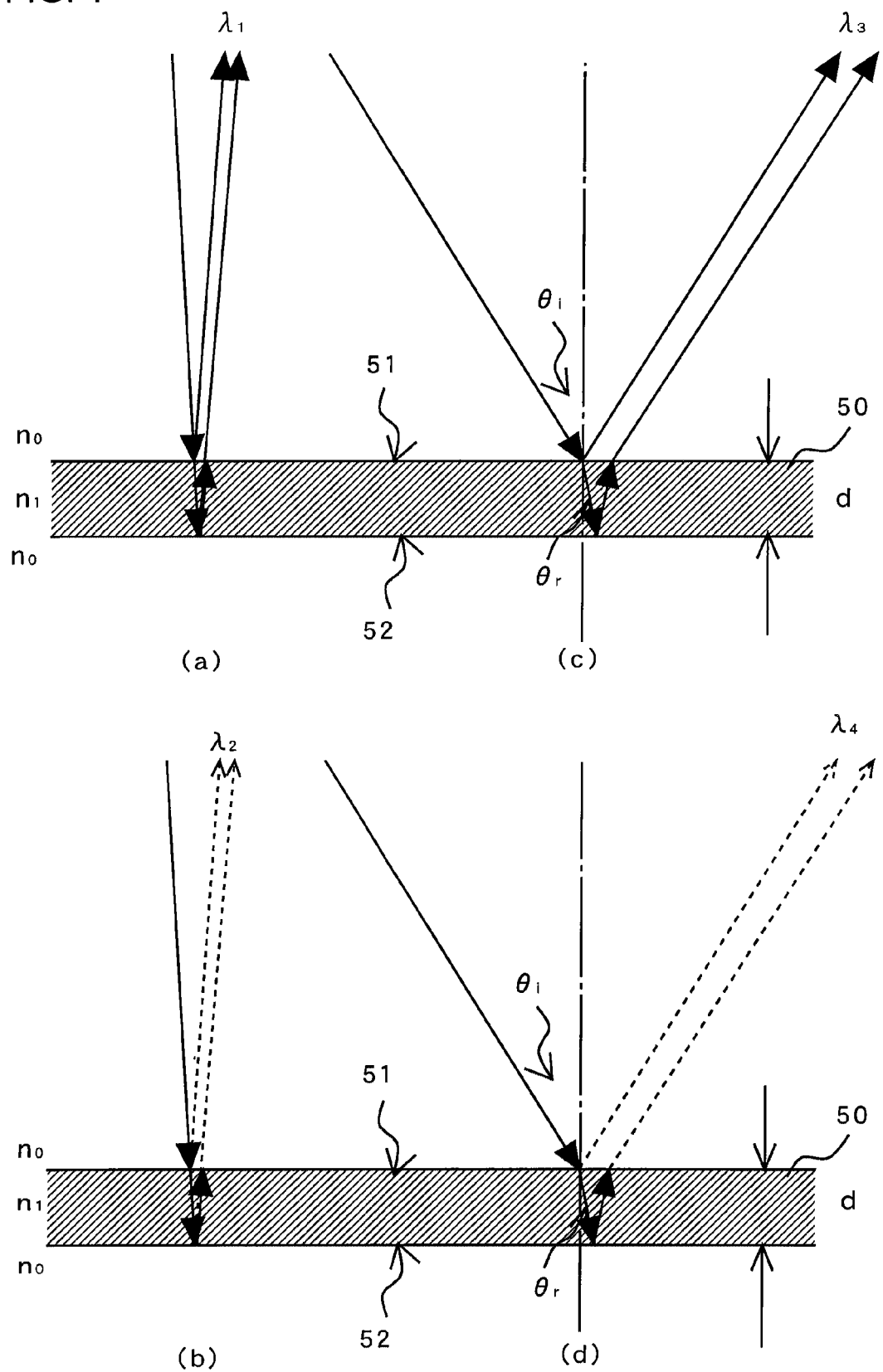
FIG. 7 illustrates a principle of the iridescence phenomenon appearing.

Referring to FIG. 7, description will be given below on a principle that the iridescence appears.

A material, where a phenomenon of iridescence appears, referred as "a hologram flake" or simply as "a hologram (flake)" is currently marketed. The hologram flake is not an actual hologram but a transparent object not colored and similarly to a case of the hologram, is seen in color according to the interference of light. In the embodiments as described below, an iridescent substance such as the hologram flake is referred as an iridescence piece.

In FIG. 7, the reference numeral 50 is a thin layer of a transparent medium, which is placed in a medium with an absolute refractive index $n_0$, e.g., a PET resin with thickness d. Its absolute refractive index is $n_1$. 51 represents an incident surface on the transparent medium 50, and 52 represents a surface for reflecting. A reflection layer made of metal or the like may be used for the reflecting surface 52.

As shown in FIG. 7 (a), when an incident light with the wavelength $\lambda_1$ perpendicularly enters the incident surface 51 of the transparent medium 50 with the absolute refractive index $n_1$ from a medium with the absolute refractive index $n_0$, a part of the incident light is reflected at the incident surface 51 of a medium with different refractive index, and the other part of the light enters the transparent medium 50.

The light with the wavelength $\lambda_1$ perpendicularly enters the transparent medium 50 at an incident angle $\theta=0°$. Here, to facilitate the explanation, it is shown that the light enters at a certain angle.

After entering the transparent medium 50, the light is reflected at the reflecting end surface 52 because the refractive index of the medium is different, and it is reflected from the transparent medium 50 with refractive index $n_1$ to the medium with absolute refractive index $n_0$.

In this case, if a condition: $d=(m+\frac{1}{2})\lambda_1/2n$, i.e., $\lambda_1=2dn/(m+\frac{1}{2})$, is satisfied where m is a positive integral number, the phase of the light reflected at the incident surface 51 is equal to the phase of the light reflected, which passes through the transparent medium 50 and is reflected at the reflecting surface 52 as shown in FIG. 7 (a). The symbol "n" represents a relative refractive index, and $n=n_1/n_0$.

As a result, the reflected light with wavelength $\lambda_1$ is strengthened.

As shown in FIG. 7 (b), when the condition $d=(m+\frac{1}{2})\lambda_2/2n$, i.e., $\lambda_2=2dn/m$, is satisfied, the phase of the light reflected at the incident surface 51 is different by one-half of the wavelength from the phase of the light reflected, which passes through the transparent medium 50 and is reflected at the reflecting surface, and the lights negate each other.

As a result, the reflected light with the wavelength $\lambda_2$ is attenuated.

As shown in FIG. 7 (c), when a light entering at an incident angle of $\theta_i$, which is not 0°, the light is refracted at a refractive angle $\theta_r$ at the incident surface 51. In this case, a relationship of "sin $\theta_i$/sin $\theta_r=n$" exists between the incident angle $\theta_i$, the refractive angle $\theta_r$ and the relative refractive index n. Based on this relationship, the light entering at the incident angle $\theta_i$ enters the reflecting surface 52 at the refractive angle $\theta_r$ and is reflected at a reflection angle $\theta_r$ and is reflected from the incident surface 51 at an angle $\theta_i$.

When a light with a wavelength $\lambda_3$ enters the incident surface 51 at the incident angle $\theta_i$ and is refracted at the refractive angle $\theta_r$, where m is a positive integral number, if a condition: $d=(m+\frac{1}{2})\lambda_3/2n \cos \theta_r$, i.e., $\lambda_3=2dn \cos \theta_r/(m+\frac{1}{2})$, is satisfied, the phase of the light reflected at the reflection angle $\theta_i$ at the incident surface 51 is equal to the phase of the light, which passes through the transparent medium 50, is reflected at the reflecting surface 52, is then reflected at the incident surface 51, and at an exit angle $\theta_i$ therefrom. As a result, the reflection of the light with the wavelength $\lambda_3$ is strengthened.

As shown in FIG. 7 (d), when a light with a wavelength $\lambda_4$ enters the incident surface 51 at an incident angle $\theta_i$ and is refracted t a refractive angle $\theta_r$, if a condition: $d=(m+\frac{1}{2})\lambda_4/2n \cos \theta_r$, i.e., $\lambda_4=2dn \cos \theta_r/m$, is satisfied, the phase of the light reflected at a reflection angle $\theta_i$ at the incident surface 51 is different by one-half of the wavelength from the phase of the light, which passes through the transparent medium 50, is reflected at the reflection surface 52, is refracted at the incident surface 51, and at an exit angle $\theta_i$ therefrom. As a result, the reflection of the light with the wavelength $\lambda_4$ is weakened.

In this way, the wavelength $\lambda_3$ of the light selectively exits or the wavelength $\lambda_4$ of the light, which does not exit, depends on the cosine of the refractive angle $\theta_r$, i.e., "cos $\theta_r$". The reflection angle $\theta_r$ depends on the incident angle $\theta_i$ and the incident angle $\theta_i$ is changed non-gradually from 0° to 90°. As a result, the wavelength of the light, which exits selectively as shown in FIG. 7 (a) and FIG. 7 (c), or the wavelength of the light, which does not exit as shown in FIG. 7 (b) and FIG. 7 (d), is changed non-gradually.

The color, which appears in this way, is called iridescence, and complicated colors with multi-layer arrangement appear. Many of such complicated colors exist in nature such as on feather of a bird, on a wing of a beetle, on scales of butterfly, on inner surface of a shellfish, etc.

Figure 8:
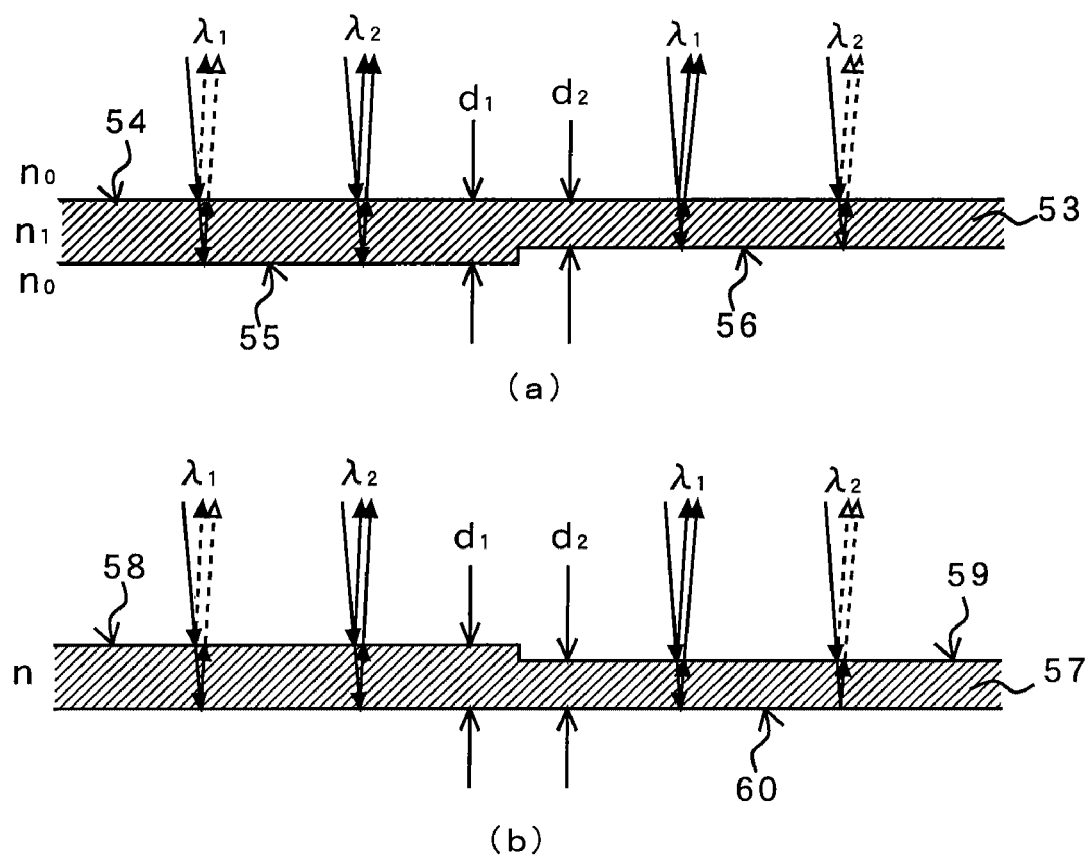
FIG. 8 illustrates another example of the principle of the iridescence phenomenon appearing.

Referring to FIG. 8, description will be given on a principle of the various iridescence appearing by a transparent medium having different thickness. Here, to facilitate the explanation, description will be given on the light, which perpendicularly enters the transparent medium.

A transparent medium 53 as shown in FIG. 8 (a) has a flat surface as an incident surface, and has irregular surfaces 55 and 56 as reflection surfaces. The transparent medium 57 as shown in FIG. 8 (b) has the incident surfaces as irregular surfaces 58 and 59, and a flat surface as the reflection surface. The reflection surfaces 55, 56 and 60 may be reflection layers made of metal or the like.

Absolute refractive index of the transparent medium 53 is $n_1$. Relative refractive index to a medium, which has absolute refractive index $n_0$, is n. Its thickness is not uniform, and it is partially with thickness of $d_1$ and partially with thickness of $d_2$.

This transparent medium 53 is flat on a front surface 54, while, on a rear surface, it has 55 with thickness of $d_i$ and 56 with thickness of $d_2$.

On the portion 55 where the thickness of the transparent medium 53 is $d_1$, when a condition $d_1=(m+\frac{1}{2})\lambda_2/2n$ is satisfied, i.e., when the light satisfies the wavelength condition $\lambda_2=2d_1 n/(m+\frac{1}{2})$, the phase of the light reflected at the front surface 54 is the same as the phase of the light, which passes through the transparent medium 53 and is reflected at the rear surface 55. In this case, m is an arbitrary integral number.

As a result, the light with wavelength $\lambda_2$ is reflected strengthened.

In case of the light, which satisfies the condition $d_1=(m+\frac{1}{2})\lambda_1/2n$, i.e., when the light satisfies the wavelength condition $\lambda_1=2d_1 n/m$, the phase of the light reflected at the front surface 54 is different by one-half of the wavelength from the phase of the light, which passes through the transparent medium 53 and is reflected at the rear surface 55.

As a result, the light with the wavelength $\lambda_1$ is reflected weakened.

When the light satisfies the condition $d_2=(m+\frac{1}{2})\lambda_1/2n$, i.e., when it satisfies the wavelength condition $\lambda_1=2d_2 n/(m+\frac{1}{2})$, where the thickness of the transparent medium 53 is $d_2$, the phase of the light reflected at the front surface 54 is the same as the phase of the light, which passes through the transparent medium 53 and is reflected at the rear surface 56.

As a result, the light with the wavelength $\lambda_1$ is reflected strengthened.

Also, in case of the light, which satisfies the condition $d_2=(m+\frac{1}{2})\lambda_2/2n$, i.e., when the light satisfies the wavelength condition $\lambda_2=2d_2 n/m$, the phase of the light reflected at the front surface 54 is different by one-half of the wavelength from the phase of the light, which passes through the transparent medium 53 and is reflected at the rear surface 56.

As a result, the light with the wavelength $\lambda_2$ is reflected weakened.

This phenomenon is the principle that various colors are viewed on a colorless and transparent soap bubble in the air or on a colorless and transparent oil slick on the water.

When the light satisfies the condition $d_1=(m+\frac{1}{2})\lambda_1/2n$, i.e., when it satisfies the wavelength condition $\lambda_1=2d_1 n/m$, where the thickness of the transparent medium 57 is $d_1$, the phase of the light reflected at the front surface 58 is different by one-half of the wavelength from the phase of the light, which passes through the transparent medium 57 and is reflected at the rear surface 60.

As a result, the light with the wavelength $\lambda_1$ is reflected weakened.

In case of the light, which satisfies the condition $d_1=(m+\frac{1}{2})\lambda_2/2n$, i.e., when the light satisfies the wavelength condition $\lambda_2=2d_1n/(m+\frac{1}{2})$, the phase of the light reflected at the front surface 58 is the same as the phase of the light, which passes through the transparent medium 57 and is reflected at the rear surface 60. As a result, the light with the wavelength $\lambda_2$ is reflected strengthened.

When the light satisfies the condition $d_2=(m+\frac{1}{2})\lambda_1/2n$, i.e., when it satisfies the wavelength condition $\lambda_1=2d_2n/(m+\frac{1}{2})$, where the thickness of the transparent medium 57 is $d_2$, the phase of the light reflected at the front surface 59 is the same as the phase of the light, which passes through the transparent medium 57 and is reflected at the rear surface 60.

As a result, the light with the wavelength $\lambda_1$ is detected.

Also, in case of the light, which satisfies the condition $d_2=(m+\frac{1}{2})\lambda_2/2n$, i.e., when the light satisfies the wavelength condition $\lambda_2=2d_2n/m$, the phase of the light reflected at the front surface 59 is different by one-half of the wavelength from the phase of the light, which passes through the transparent medium 57 and is reflected at the rear surface 60.

As a result, the light with the wavelength $\lambda_2$ is not detected.

Needless to say, in the explanation of the mechanism of iridescence in FIG. 7 and FIG. 8, only the incident light is detected, and the light, which does not enter, cannot be detected.

EMBODIMENTS

Authentication Verifying Chip

Embodiment 1

Figure 9:
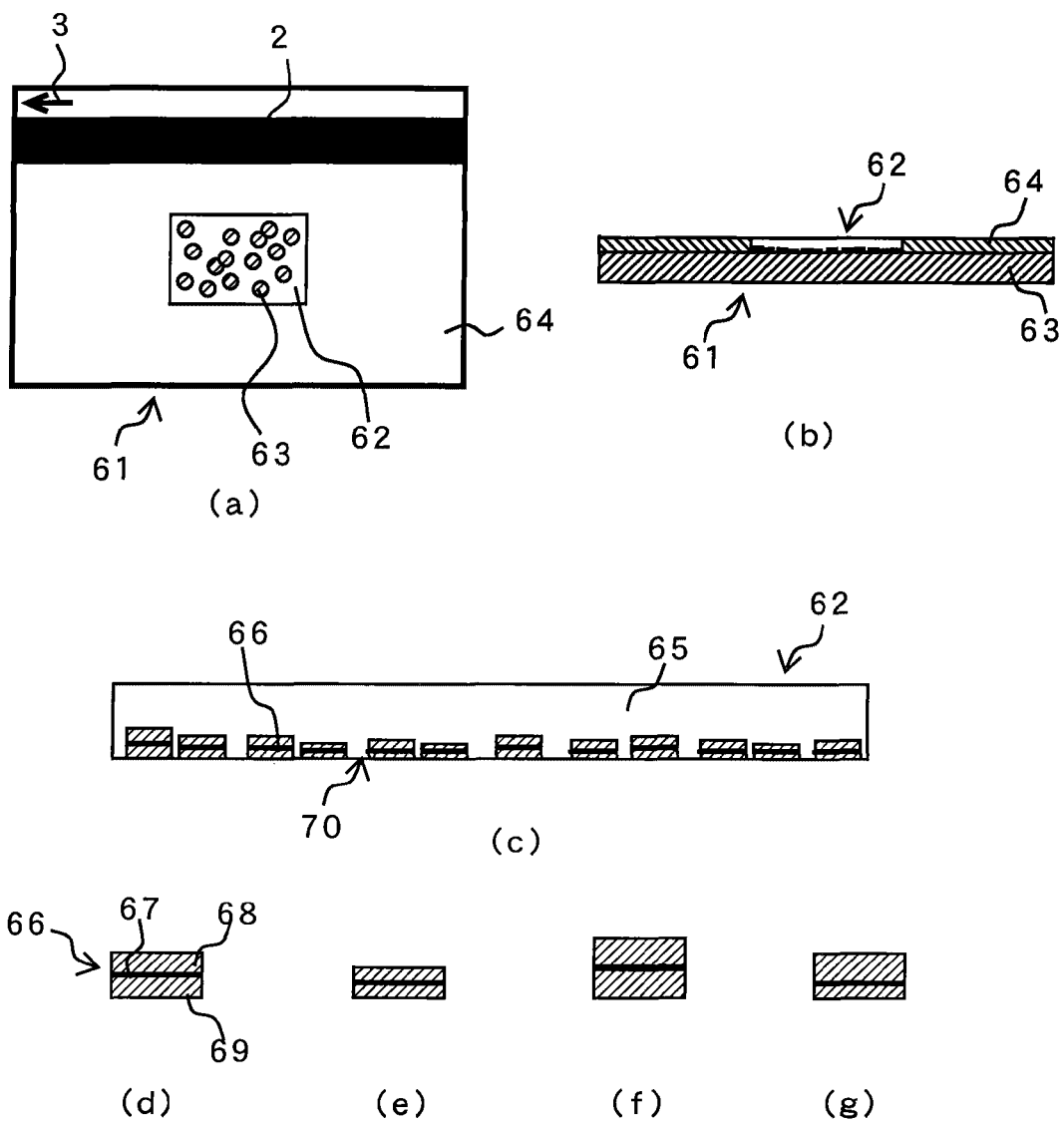
FIG. 9 shows an embodiment of a card provided with an authentication verifying chip of iridescence based on the principle of FIG. 7.

FIG. 9 shows an authentication verifying chip of Embodiment 1.

In this authentication verifying chip, only the perpendicularly entering lights are used as shown in FIG. 7 (a) and FIG. 7 (b).

FIG. 9 (a) is a view of a card as seen from above, FIG. 9 (b) is a cross-sectional view, FIG. 9 (c) is an enlarged cross-sectional view, and FIG. 9 (d) shows an example of an iridescence piece structure. In these figures, the reference numeral 61 represents a card body, which has a magnetic stripe 2 and an arrow mark 3 to indicate a card-inserting direction where an authentication verifying chip 62 is layered on a card base plate 63. The reference numeral 64 represents a surface plate, and other surface plates can be layered on the authentication verifying chip 62 and on the surface plate 64.

The base plate 63 is a thick synthetic resin plate as widely used in the cash card or the like, or a thin non-transparent synthetic resin plate used in the prepaid card. For the purpose of protecting the authentication verifying chip 62, a cover made of a hard material such as glass may be used.

The matters described in connection with FIG. 9 (a) and FIG. 9 (b) will be the same as in the description of the subsequent embodiments, and detailed description may not be repeated to facilitate the explanation.

The authentication verifying chip 62 is made of synthetic resin where iridescence pieces 66 different from each other in thickness are arranged in parallel to the surface of the authentication verifying chip 62, in other words, horizontally, and are fixed on the whole by a transparent synthetic resin 65.

As shown in FIG. 9 (d), the iridescence piece 66 is formed by transparent media 68 and 69, each made of PET resin or the like arranged on both surfaces of a reflection layer 67. The thickness of the iridescence piece is diverse as shown in FIGS. 9 (e), (f) and (g). As shown in FIG. 9 (g), the transparent medium 68 and the transparent medium 69 sandwiching the reflection layer 67 may be different in thickness.

In the iridescence piece 66 with the structure as described above, a light reflected at the upper surface of the transparent medium 68 and a light which enters the transparent medium 68 and is reflected at the reflection layer 67 interfere with each other. Through the processes as described in connection with FIGS. 7 (a) and (b) and in FIG. 8, the light exits stronger or weaker than others in the light components where iridescence appears as the light is selected in the incident light.

When black color with light absorbing property is used on the upper surface of the card base plate 63 where the iridescence piece 66 comes into contact, it will be made easier to detect the reflected lights.

When the incident light is reflected at the surface of the transparent synthetic resin 65 and this hinders the iridescence detection, anti-luster processing may be performed on the surface of the transparent synthetic resin 65, or a reflection preventive film may be arranged.

The iridescence appeared by the lights, which enters perpendicularly, varies corresponding to the number of thickness differences of the transparent media 68 and 69 and in response to $\lambda_1$ and $\lambda_2$ shown in FIG. 8.

The positions of the mixed iridescence pieces 66 are determined by mere chance. Thus, the arrangement pattern is randomly changed and infinite numbers of arrangement patterns are possible.

Figure 10:
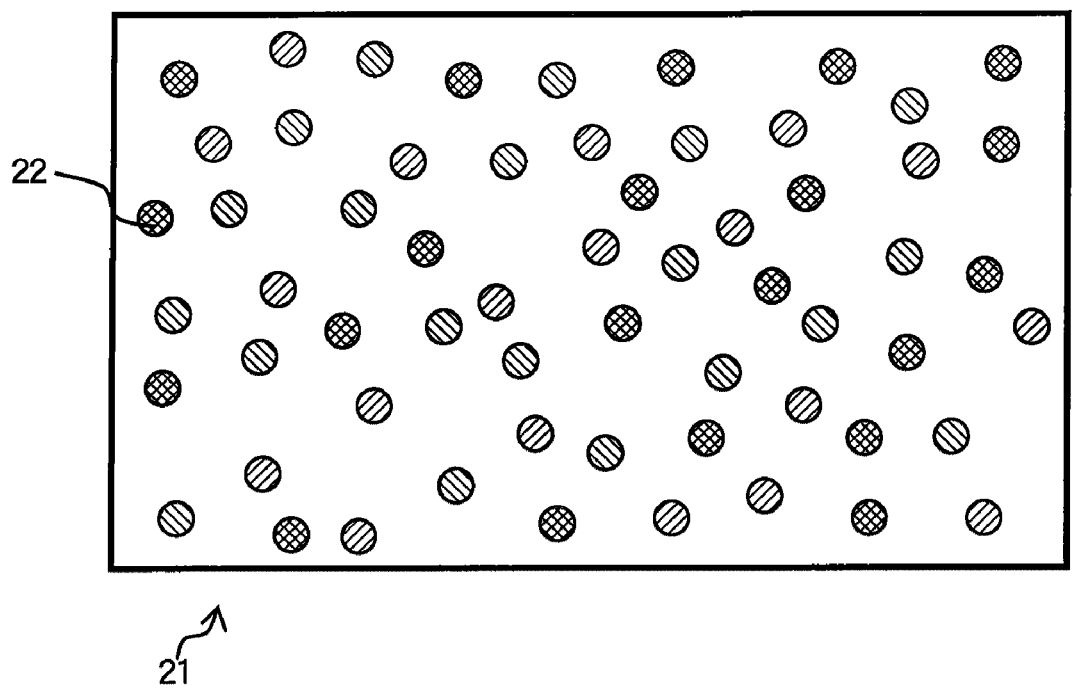
FIG. 10 is an enlarged view of an authentication verifying chip of iridescence.

To produce the authentication verifying chip, the iridescence pieces 66 as shown in FIGS. 9 (e)-(g) are scattered at random as shown by the numeral 22 in FIG. 10 and are fixed on the whole by using transparent resin 65. An authentication verifying chip 21 can be produced individually.

Figure 11:
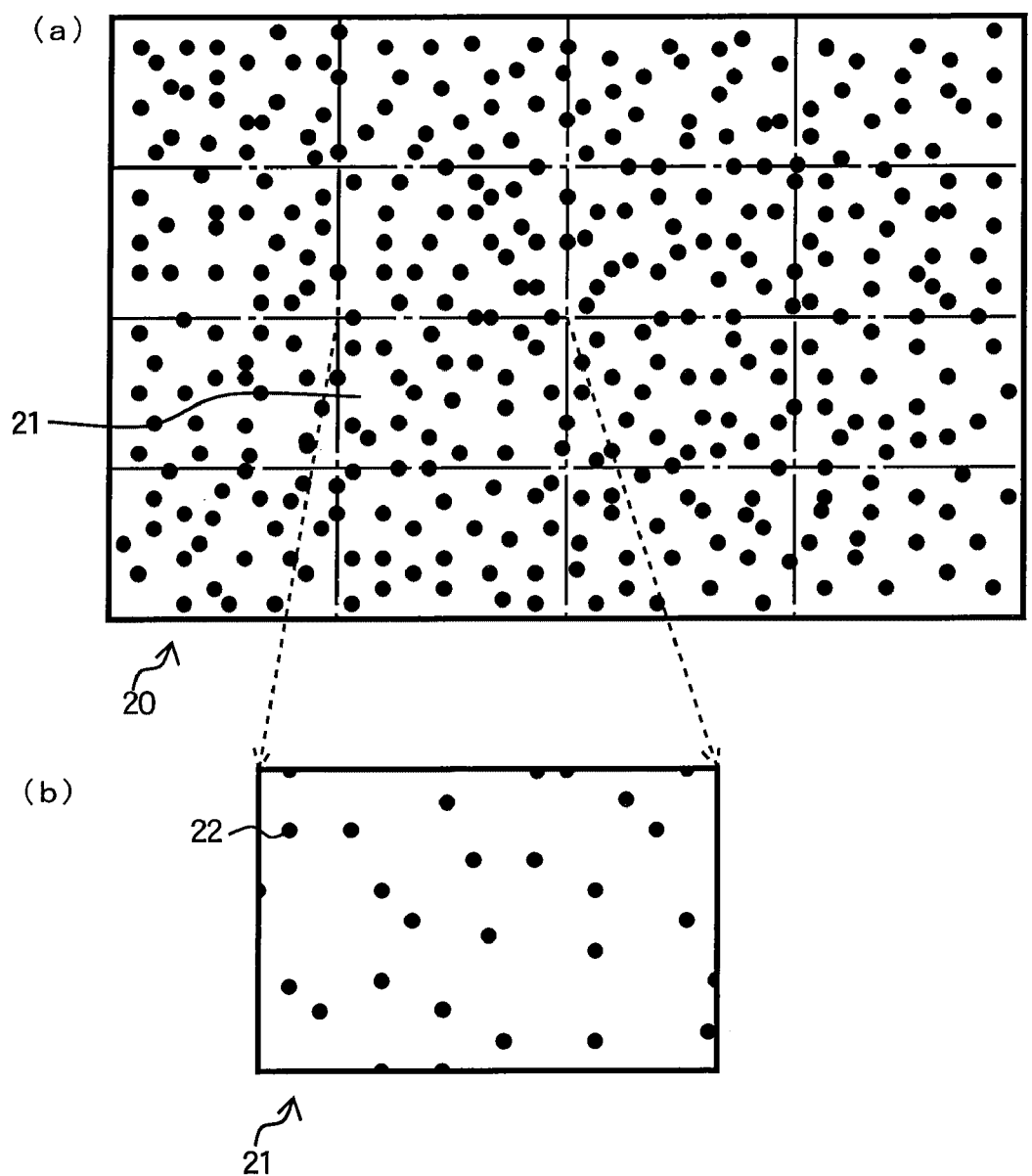
FIG. 11 shows an embodiment of a method for manufacturing an authentication verifying chip of iridescence.

Further, as shown in FIG. 11 (a), iridescence pieces are scattered on a large base plate 20 in order to be cut out to a multiple number of authentication verifying chips. After fixed by the transparent resin, a multiple number of authentication verifying chips 21 where the iridescence pieces 22 are scattered respectively can be cut out as shown in FIG. 11 (b) and be produced at the same time.

Figure 12:
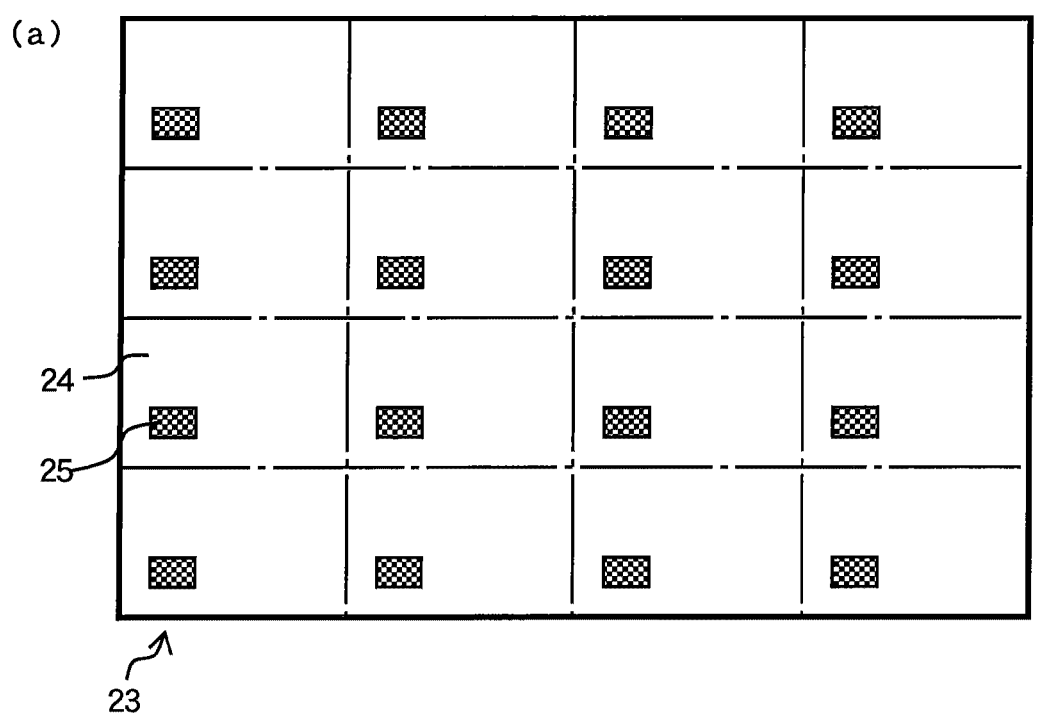
FIG. 12 shows an embodiment of a method for manufacturing the card provided with an authentication verifying chip of iridescence.
Figure 12:
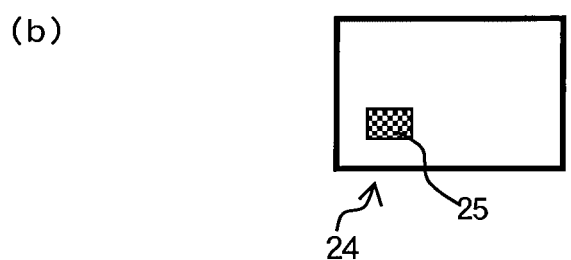

Further, as shown in FIG. 12 (a), the iridescence pieces are scattered only on the portions of the base plate 23, which has such a large size of a plurality of cards 24 which the authenticity is to be verified, each portion being turned to an authentication verifying chip 25, and cards 24 each with an authentication verifying chip can be cut out.

Embodiment 2

Figure 13:
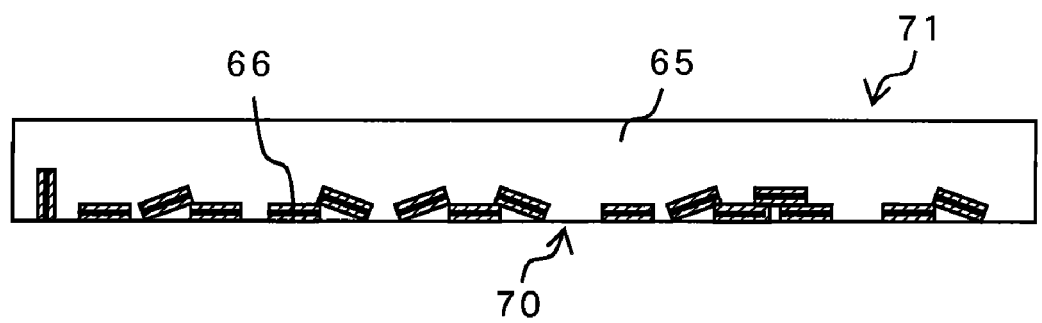
FIG. 13 shows a structure of an authentication verifying chip of iridescence based on the principle of FIG. 7.

FIG. 13 shows an authentication verifying chip of Embodiment 2. In the authentication verifying chip, in addition to the perpendicularly entering incident lights as shown in FIG. 7 (a) and FIG. 7 (b), inclined incident lights of $\lambda_3$ or $\lambda_4$ as shown in FIGS. 7 (c) and (d) are used.

In the authentication verifying chip 62 of the Embodiment 1, the iridescence pieces 66 are arranged only horizontally. In the authentication verifying chip 71 of the Embodiment 2, the iridescence pieces 66 are disposed in various different postures. In the authentication verifying chips 62 of the Embodiment 1, therefore, the iridescence pieces 66 different in thickness are needed for lights with different colors appearing, while the iridescence pieces 66 may have a single thickness in the Embodiment 2 authentication verifying chip 71.

In the authentication verifying chip 71, the incident lights to the iridescence pieces horizontally arranged are reflected in the same manner as in the Embodiment 1 as shown in FIGS. 7 (a) and (b). The incident lights to the iridescence pieces arranged inclined enter the iridescence pieces with an inclination and exit as shown in FIGS. 7 (c) and (d).

The iridescence appeared by the lights, which enters perpendicularly, varies corresponding to the number of thickness differences of the transparent media 68 and 69 in response to $\lambda_1$ and $\lambda_2$ of FIG. 7.

The iridescence appeared by the inclined incident lights varies infinitely in correspondence with $\lambda_3$ and $\lambda_4$ in refractive angle $\theta_r$ (incident angle $\theta_1$).

The positions of the mixed iridescence pieces 66 are determined by mere chance, and the arrangement pattern thus obtained is randomly changed, and there is an infinite variety of arrangement patterns.

The structure to adopt black color with light absorbing property on the upper surface of the card base plate 70 where the iridescence pieces 66 come into contact, to perform anti-luster processing or to form a reflection preventive film on the surface of the transparent synthetic resin 65 is the same as in the case of the Embodiment 1.

To produce the authentication verifying chip of the Embodiment 2, the procedure as described in connection with FIG. 10 and FIG. 11 in the Embodiment 1 can be adopted. To produce the card with the authentication verifying chip, the procedure as described in connection with FIG. 12 in the Embodiment 1 can be adopted for the Embodiment 2.

The iridescence pieces arranged inclined are also included.

Embodiment 3

Figure 14:
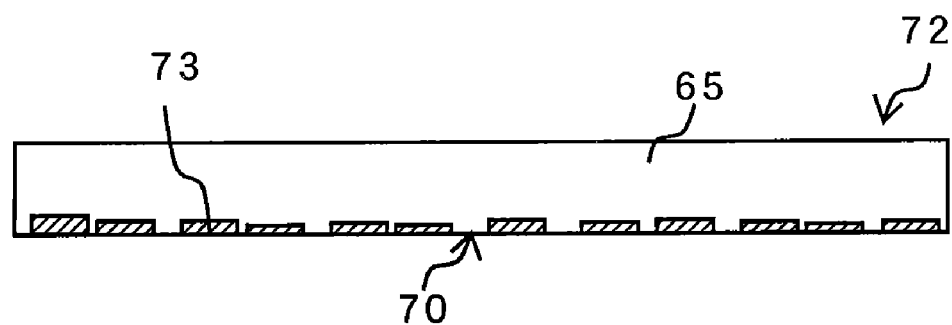
FIG. 14 shows an embodiment of the authentication verifying chip based on the principle of FIG. 8.
Figure 14:

FIG. 14 shows an authentication verifying chip of Embodiment 3.

In the Embodiment 3, instead of the Embodiment 1 as shown in FIG. 9 and the Embodiment 2 as shown in FIG. 13 where iridescence pieces formed by PET resins or the like with a light reflection layer placed each in between are used, iridescence pieces formed by transparent media with the different thickness without a light reflection layer therein are used.

In the authentication verifying chip 72 as shown in FIG. 14 (a), iridescence pieces 73 made of a transparent medium and being different in thickness as shown by numerals 74 and 75 in FIG. 14 (b) are scattered at a bottom 70. A transparent resin 65 covers on the whole.

When a light enters the iridescence pieces 73, a part of it enters the iridescence pieces 73, and is then reflected at a reflection surface, i.e., at the opposite surface, and the light exits from the incident surface.

As a result, in this authentication verifying chip 72, the light reflected at the upper surface of the iridescence piece 73 interferes with the light, which enters the iridescence piece 73 and is reflected at the bottom surface, and the light in the incident light exits selected therefrom and iridescence appears.

A reflection layer such as a metal layer may be formed on the bottom 70.

The structure to provide light-absorbing black color on the upper surface of the card base plate where the iridescence pieces 73 come into contact, to perform anti-luster processing, or to form a reflection preventive film on the surface of the transparent synthetic resin 65 is the same as in the case of the Embodiment 1.

To produce the authentication verifying chip 72, the iridescence pieces 73 are scattered at random and are fixed on the whole by using transparent resin 65. The authentication verifying chips can be produced individually.

Or, the iridescence pieces 73 are scattered over a large surface where a multiple number of authentication verifying chips can be cut out. After fixed by the transparent resin 65 on the whole, the chips can be cut out individually.

To produce the authentication verifying chip of the Embodiment 3, the procedure as described in connection with FIG. 10 and FIG. 11 in the Embodiment 1 can be adopted. To produce the card with the authentication verifying chip, the procedure as described in connection with FIG. 12 in the Embodiment 1 can be adopted for the Embodiment 3.

Embodiment 4

Figure 15:
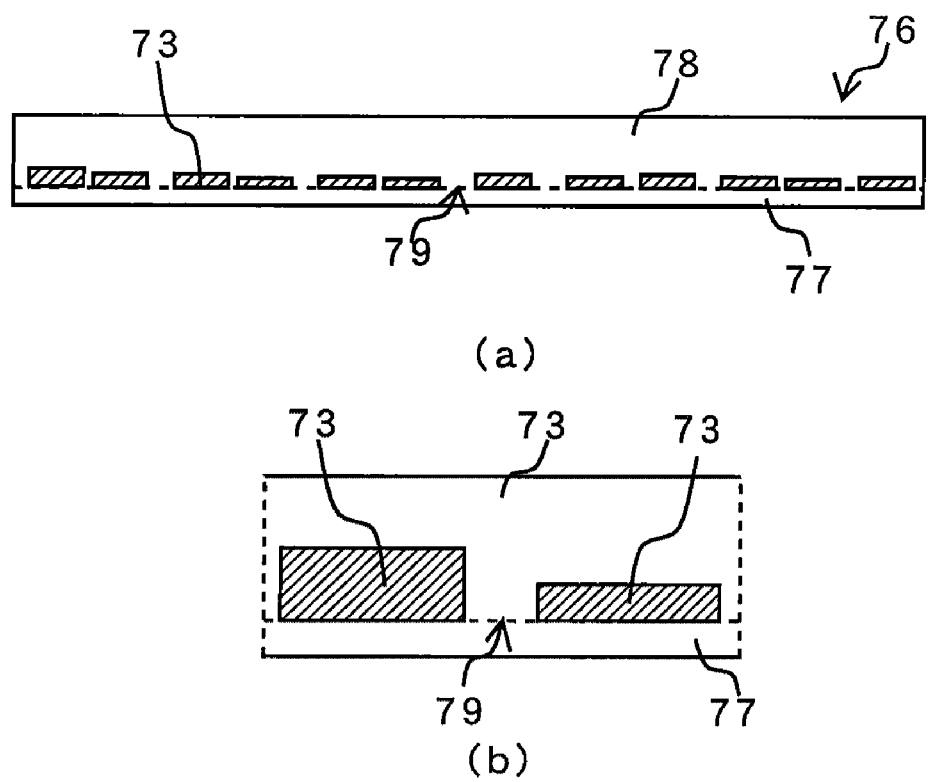
FIG. 15 shows another embodiment of the authentication verifying chip based on the principle of FIG. 8.

FIG. 15 shows an authentication verifying chip of Embodiment 4.

Unlike the authentication verifying chips of the Embodiments 1 to 3, in the authentication verifying chip 76 of the Embodiment 4, the transparent resin to fix the entire region consists of two layers. These two layers function optically as a single layer.

In the authentication verifying chip 76 as shown in FIG. 15 (a), iridescence pieces 73 being transparent media 74 and 75 different in thickness, are scattered on a flat transparent synthetic resin 77, which forms a bottom, and a transparent resin 78 having the same optical property as the transparent synthetic resin 77 forming the bottom, covers the entire surface.

A boundary surface 79 between the transparent synthetic resin 77 and the transparent resin 78 is made of synthetic resin having the same optical property, and this causes no special optical effect.

In this authentication verifying chip 76, the transparent synthetic resins 77 and 78 holding the iridescence pieces 73 between them function similarly to the medium with the absolute refractive index $n_0$ as shown in FIG. 7. A part of the light entering the iridescence piece 73 is reflected at its surface, and a part of the light enters the iridescence piece 73 which then, is reflected at a surface where the iridescence piece 73 and the transparent synthetic resin 77 come into contact with each other functioning as a reflection surface, and exits from the incident surface.

As a result, in this authentication verifying chip 76, the light reflected at the upper surface of the iridescence piece 73 interferes with the light, which enters the iridescence piece 73 and is reflected at its bottom. Then, the light in the incident light selectively exits, and iridescence appears.

The structure to provide light-absorbing black color on the upper surface of the card base plate where the authentication verifying chip 76 comes into contact, to perform anti-luster processing or to form a reflection preventive film on the surface of the transparent synthetic resin 78 is the same as in the case of Embodiment 1.

To produce the authentication verifying chip 76, the iridescence pieces 73 are scattered at random on the transparent synthetic resin 77 provisionally disposed. Then, the transparent resin 78 covers and fixes on the whole, and the chips can be produced individually.

Or, the transparent synthetic resin 77 is provisionally arranged on a large surface where a multiple number of authentication verifying chips can be cut out. Then, the iridescence pieces 73 are adequately scattered according to the procedures described in connection with FIG. 10 and FIG. 11 in the Embodiment 1. After fixed by the transparent resin 78 on the whole, the chips can be cut out individually.

Further, the card with the authentication verifying chip can also be produced by the procedure of FIG. 12 in the Embodiment 1.

Embodiment 5

Figure 16:
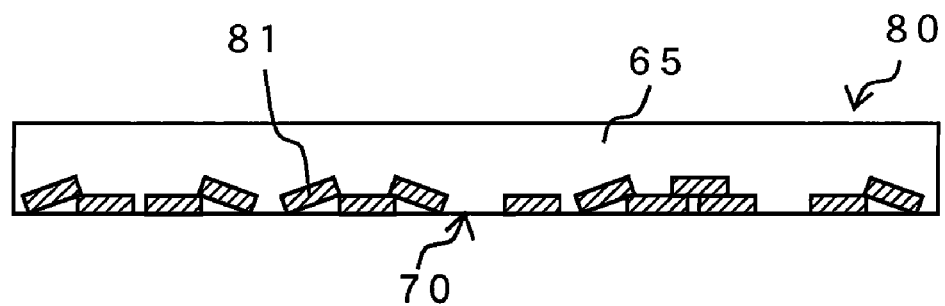
FIG. 16 shows still another embodiment of the authentication verifying chip based on the principle of FIG. 8.

FIG. 16 shows an authentication verifying chip of Embodiment 5.

In this authentication verifying chip, in addition to the perpendicularly entering incident lights as shown in FIG. 7 (a) and FIG. 7 (b), inclined incident lights of $\lambda_3$ or $\lambda_4$ as shown in FIG. 7 (c) and FIG. 7 (d) are used.

In the authentication verifying chips 72 and 76 of the Embodiments 3 and 15, the iridescence pieces 73 are arranged only horizontally, while, in the authentication verifying chip 80 of the Embodiment 5 shown in FIG. 16, the iridescence pieces 81 are arranged in various different postures. In the authentication verifying chips 72 and 76 in the Embodiments 3 and 4, therefore, the iridescence pieces 73 different in thickness are needed for lights with different colors appearing. In the Embodiment 5, the iridescence pieces 81 needed in the authentication verifying chip 80 may have a single thickness.

In the authentication verifying chip 80, the incident lights entering the iridescence pieces arranged horizontally are reflected in the same manner as in the Embodiment 1 as shown in FIGS. 7 (a) and (b). The incident lights to the iridescence pieces arranged inclined enter the iridescence pieces with an inclination and exit as shown in FIGS. 7 (c) and (d).

The iridescence appeared by the perpendicularly entering light varies corresponding to the number of inclination differences of the transparent medium 81 in response to $\lambda_1$ and $\lambda_2$ of FIG. 7. Therefore, the iridescence appeared by the inclined incident lights varies infinitely in correspondence with $\lambda_3$ or $\lambda_4$ at the refractive angle $\theta_r$ (incident angle $\theta_1$) shown in FIG. 7.

The positions of the mixed iridescence pieces 81 are determined by mere chance, and the arrangement pattern thus obtained is randomly changed, and there is an infinite variety of arrangement patterns.

The structure to provide light-absorbing black color on the upper surface of the card base plate where the iridescence pieces 81 come into contact, to perform anti-luster processing or to form a reflection preventive film on the surface of the transparent synthetic resin is the same as in the case of the Embodiment 1.

To produce the authentication verifying chip 80, the iridescence pieces 73 including those inclined are scattered at random on the bottom 70 and fixed on the whole by the transparent resin 65.

The authentication verifying chips 80 can be produced individually as described above, while the chips may be produced by scattering the iridescence pieces 73 including those inclined over a large surface where a multiple number of authentication verifying chips can be cut out. After fixed by the transparent resin 65 on the whole, chips can be cut out individually.

Further, it is also possible to form the authentication verifying chips directly on cards according to the procedure shown in FIG. 12.

Embodiment 6

Figure 17:
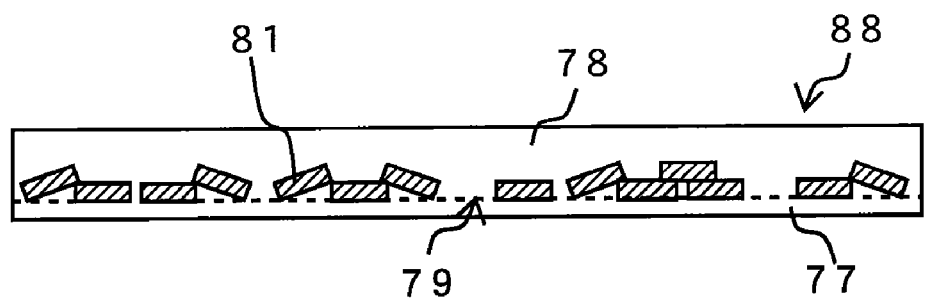
FIG. 17 shows yet still another embodiment of the authentication verifying chip based on the principle of FIG. 8.

FIG. 17 shows an authentication verifying chip of Embodiment 6.

Unlike the authentication verifying chip of the Embodiment 5, in the authentication verifying chip 88 of the Embodiment 6, the transparent resin to fix the entire region consists of two layers. These two layers function optically as a single layer.

In the authentication verifying chip 88, iridescence pieces 81 of the same thickness are scattered on a flat transparent resin 77, which forms a bottom, and a transparent resin 78 having the same optical property as the transparent synthetic resin 77 forming the bottom covers the entire surface.

A boundary surface 79 between the transparent synthetic resin 77 and the transparent resin 78 is made of synthetic resin having the same optical property, and this causes no special optical effect.

In the authentication verifying chip thus arranged, the transparent synthetic resins 77 and 78 holding the iridescence pieces 81 between them function similarly to the medium with the absolute refractive index $n_0$ as shown in FIG. 7. A part of the light entering the iridescence piece 81 is reflected at its surface, and a part of the light enters the iridescence piece 81. The surface where the iridescence piece 81 and the transparent synthetic resin 77 come into contact with each other functions as a reflection surface, and the light exits from the incident surface.

As a result, in this authentication verifying chip 86, the light reflected at the upper surface of the iridescence piece 81 interferes with the light, which enters the iridescence piece 81 and is reflected at the bottom. Then, the light in the incident light selectively exits, and iridescence appears.

The structure to provide light-absorbing black color on the upper surface of the card base plate where the authentication verifying chip 88 comes into contact, to perform anti-luster processing or to form a reflection preventive film on the surface of the transparent synthetic resin 78 is the same as in the case of Embodiment 1.

To produce the authentication verifying chips 86, the iridescence pieces 81 are scattered at random on the transparent synthetic resin 77 provisionally disposed. Then, the transparent resin 78 covers and fixes on the whole, and the chips can be produced individually.

Also, the transparent synthetic resin is provisionally arranged on a surface where a multiple number of authentication verifying chips can be cut out. Then, the iridescence pieces 81 are adequately scattered on it. After fixed by the transparent resin 78 on the whole, the chips can be produced individually by cutting them out.

Further, the authentication verifying chips can be formed directly on cards according to the procedure as shown in FIG. 12.

Embodiment 7

Figure 18:
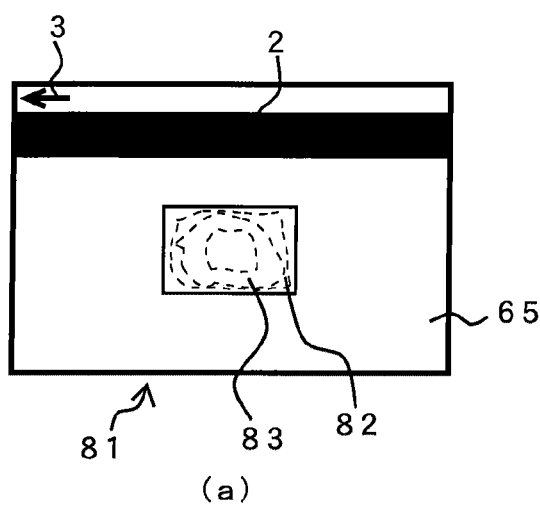
FIG. 18 shows an embodiment of a card provided with an authentication verifying chip of iridescence of another structure based on the principle of FIG. 8.
Figure 18:
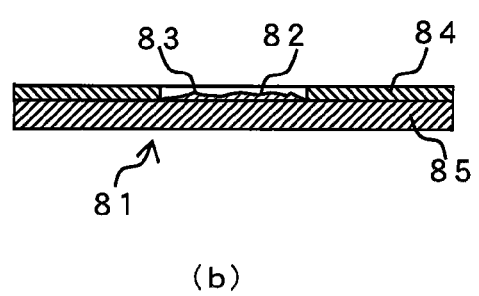
Figure 18:
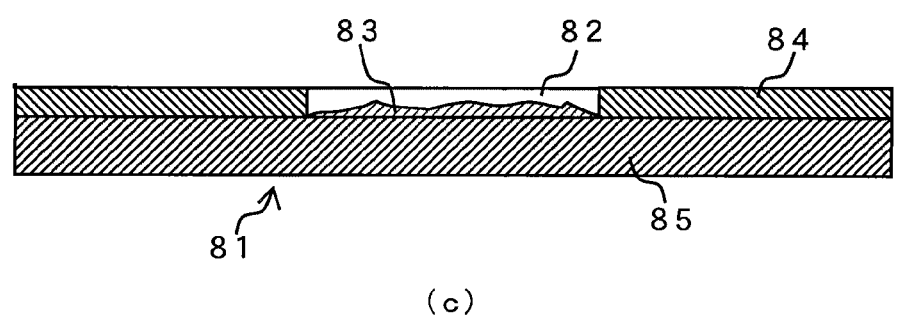

FIG. 18 shows a card capable of authentication verification of Embodiment 7 where the principle shown in FIG. 8 is applied.

FIG. 18 (a) is a view of a card capable of authentication verification as seen from above, FIG. 18 (b) is a cross-sectional view, and FIG. 18 (c) is an enlarged cross-sectional view. The reference numeral 81 represents a card body, which has a magnetic stripe 2 and an arrow mark 3 to indicate the card-inserting direction. On a card base plate 85, authentication verifying chip 82 is layered. Numeral 84 represents a surface plate. Another surface plate can be layered further on the authentication verifying chip 82 and the surface plate 84.

The base plate 85 is a thick synthetic resin plate as widely used in a cash card or the like, or a synthetic plate usually non-transparent resin used in a prepaid card. Unlike the authentication verifying chip of the Embodiment 1 or the Embodiment 2, no hologram flake is used in the authentication verifying chip 82. Instead, a transparent resin film 83 adequately coated is used. This resin 83 does not have uniform thickness, and has non-uniform thickness.

In order to protect the authentication verifying chip 82, a cover made of a hard material such as glass may be provided.

Now, referring to FIG. 19, description will be given on a principle of iridescence appearing by using a transparent medium having non-uniform thickness instead of the iridescence piece.

Figure 19:
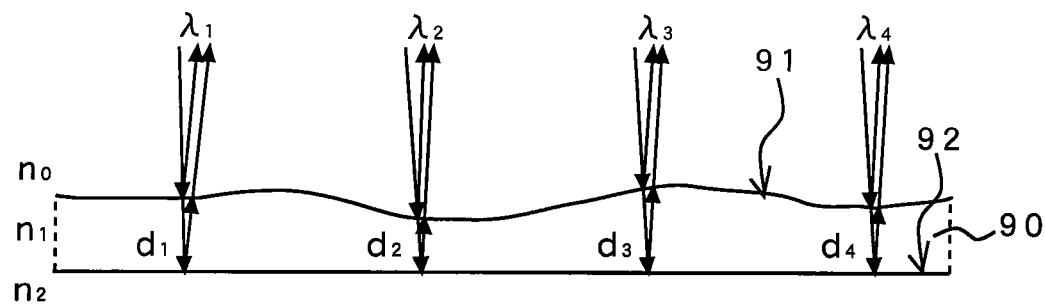
FIG. 19 illustrates a principle of the iridescence phenomenon appearing on the authentication verifying chip of iridescence of FIG. 18.
Figure 19:
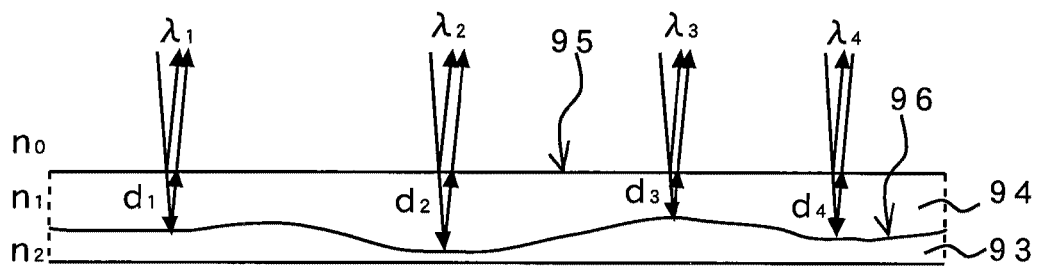

In an example shown in FIG. 19 (a), a transparent resin used is illustrated by the reference numeral 90. In an example shown in FIG. 19 (b), the transparent resin used is illustrated by the reference numeral 94.

To facilitate explanation, description will be given here only on an incident light, which perpendicularly enters the transparent medium.

In the transparent medium 90 shown in FIG. 19 (a), an incident surface 91 is a curved surface, and a reflection surface 92 is a flat surface. This transparent medium 90 is formed by an adequate method such as coating or spraying. The reflection surface 92 may be a reflection layer made of metal or the like.

Absolute refractive index of the transparent medium 90 is $n_1$, and relative refractive index to a medium with absolute refractive index $n_0$ is n. The reflection surface 92 of the transparent medium 90 is flat, but the distance between the reflection surface 92 and the incident surface 91, i.e., the thickness is not uniform. There are portions where the thickness is $d_1$, $d_2$, $d_3$ or $d_4$.

In the transparent medium 94 as shown in FIG. 19 (b), an incident surface 95 is a flat surface, and a reflection surface 96 is a curved surface.

A base 93 having this curved surface can be formed by an adequate method such as coating or spraying. A transparent medium is coated on the base 93 to form a flat surface, and the transparent medium 94 can be prepared.

The reflection surface 96 may be a reflective film made of metal or the like.

The reflection surface 96 can also be prepared by differing the base 93 and the transparent medium 94 in each refractive index.

Absolute refractive index of the transparent medium 94 is $n_1$, and relative refractive index to a medium with absolute refractive index $n_0$ is n. The incident surface 95 of the transparent medium 94 is flat, but the distance between the incident surface 95 and the reflection surface 96, i.e., the thickness is not uniform, and there are portions where the thickness is $d_1$, $d_2$, $d_3$ or $d_4$.

The transparent media 90 and 94 having such the structure function similarly to the transparent media 53 and 57 as described in connection with FIG. 8, and the light having the wavelength of $\lambda_1$, $\lambda_2$, $\lambda_3$ or $\lambda_4$ exits stronger or weaker.

As described in connection with FIG. 7, the light with an inclination, when the reflection angle $\theta_r$ satisfies the condition: $\lambda = 2dn \cos \theta_r/(m+\frac{1}{2})$, exits stronger and when satisfies the condition: $\lambda = 2dn \cos \theta_r/m$, exits weaker, and accordingly, the light selectively exits.

When the reflection angle $\theta_r$ is 10°, cos 10°≈0.94. When the reflection angle $\theta_r$ is 20°, cos 20°≈0.93, and when the reflection angle $\theta_r$ is 30°, cos 30°≈0.921. The wavelength of the iridescence appeared is influenced little from the reflection angle and is depending much on the thickness of the transparent medium.

Embodiment 8

Figure 20:
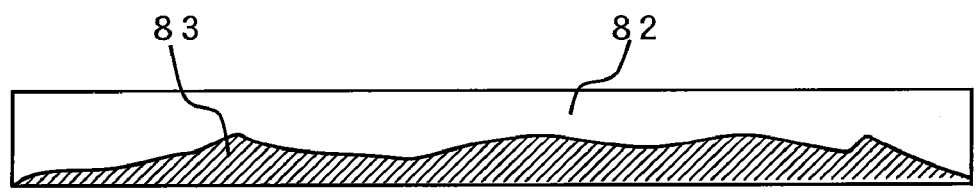
FIG. 20 is an enlarged cross-sectional view of the authentication verifying chip of iridescence of FIG. 19.

FIG. 20 shows an arrangement of an authentication verifying chip shown in FIG. 18, the Embodiment 8.

Unlike the authentication verifying chips of the Embodiments 1 to 6, in the authentication verifying chip of the Embodiment 8, no iridescence piece is used. Instead, a transparent medium 83 is coated in adequate thickness on the base plate 85 of FIG. 18. The thickness of the transparent medium 83 is not uniform, and it is covered with a transparent resin 82.

The thickness of the transparent medium 83 to be coated is not uniform and its thickness randomness is determined by mere chance. As a result, the pattern and wavelength of iridescence to be appeared vary non-gradually due to the random thickness.

The structure to provide light-absorbing black color on the upper surface of the card base plate 85 where the authentication verifying chip comes into contact, to perform anti-luster processing or to form a reflection preventive film on the surface of the transparent synthetic resin 82 is the same as in the case of Embodiment 1.

The authentication verifying chip with the structure as above can be prepared by adequately applying the transparent medium 83 on the base plate 85.

Also, by using the transparent synthetic resin 82, which is flat on both surfaces, and by preparing surface irregularities on the rear surface by means such as etching, and further, by coupling the surface irregularities with the transparent medium 83, the authentication verifying chip with the structure as described above can be prepared.

In addition to producing the chip individually, a transparent medium is coated on a large surface, and by cutting out the chips individually, the chips can be prepared. Further, the authentication verifying chips can be formed directly on cards according to the procedure as described in connection with FIG. 12.

Embodiment 9

Figure 21:
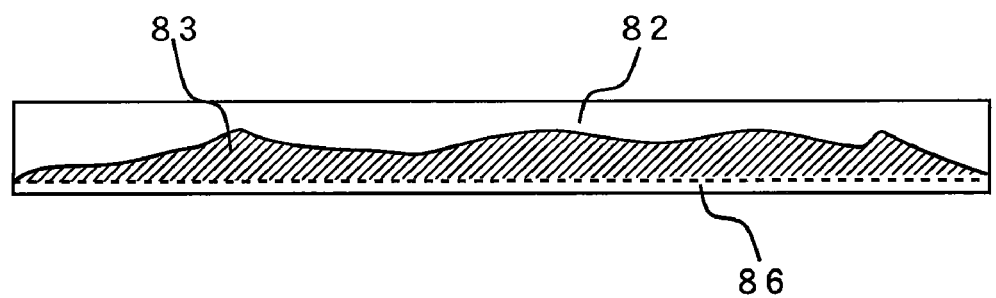
FIG. 21 is an enlarged cross-sectional view of an authentication verifying chip of iridescence with a structure different from that of FIG. 20.

FIG. 21 shows another arrangement Embodiment 9 of the authentication verifying chip shown in FIG. 18.

Unlike the authentication verifying chip of the Embodiment 8, in the authentication verifying chip of the Embodiment 9, a flat transparent synthetic resin 86 forming a bottom is disposed on the base plate 85 of FIG. 18. A transparent medium 83 is coated with an adequate thickness on the transparent synthetic resin 86. The thickness of the transparent medium 83 is not uniform, and it has random thickness, and is covered by the transparent resin 82.

In the authentication verifying chip with the arrangement as described above, the transparent synthetic resins 86 and 82 holding the transparent medium 83 between them function similarly to the medium, which has absolute refractive index of $n_0$ as shown in FIG. 7. A part of the light entering the transparent medium 83 is reflected at its surface. And a part of the light enters the transparent medium 83, and is reflected, as the surface where the transparent medium 83 and the transparent synthetic resin 86 come into contact functions as a reflection surface, and exits from the incident surface.

As a result, in this authentication verifying chip, the light reflected at the upper surface of the transparent medium 83 interferes with the light, which enters the transparent medium 83 and is reflected at the bottom surface, and the light in the incident light is selected, and iridescence appears.

The thickness randomness of the transparent medium 83 applied is determined by mere chance, and the pattern and wavelength of the iridescence appeared due to the random thickness vary non-gradually.

The structure to provide light-absorbing black color on the upper surface of the card base plate 85 where the authentication verifying chip comes into contact, to perform anti-luster processing or to form a reflection preventive film on the surface of the transparent synthetic resin 82 is the same as in the case of Embodiment 8.

The authentication verifying chip with the structure as described above can be prepared by adequately applying the transparent medium 83 on the transparent synthetic resin 86.

Also, by using the transparent synthetic resin, which is flat on both surfaces, and by preparing surface irregularities on the rear surface by means such as etching, and further, by coupling the surface irregularities with the transparent medium 83, the authentication verifying chip with the structure as described above can be prepared.

In addition to producing the chip individually, a transparent medium is coated on a large surface, and by cutting out the chips individually, the chips can be prepared. Further, the authentication verifying chips can be formed directly on cards according to the procedure as described in connection with FIG. 12.

Embodiment 10

Figure 22:
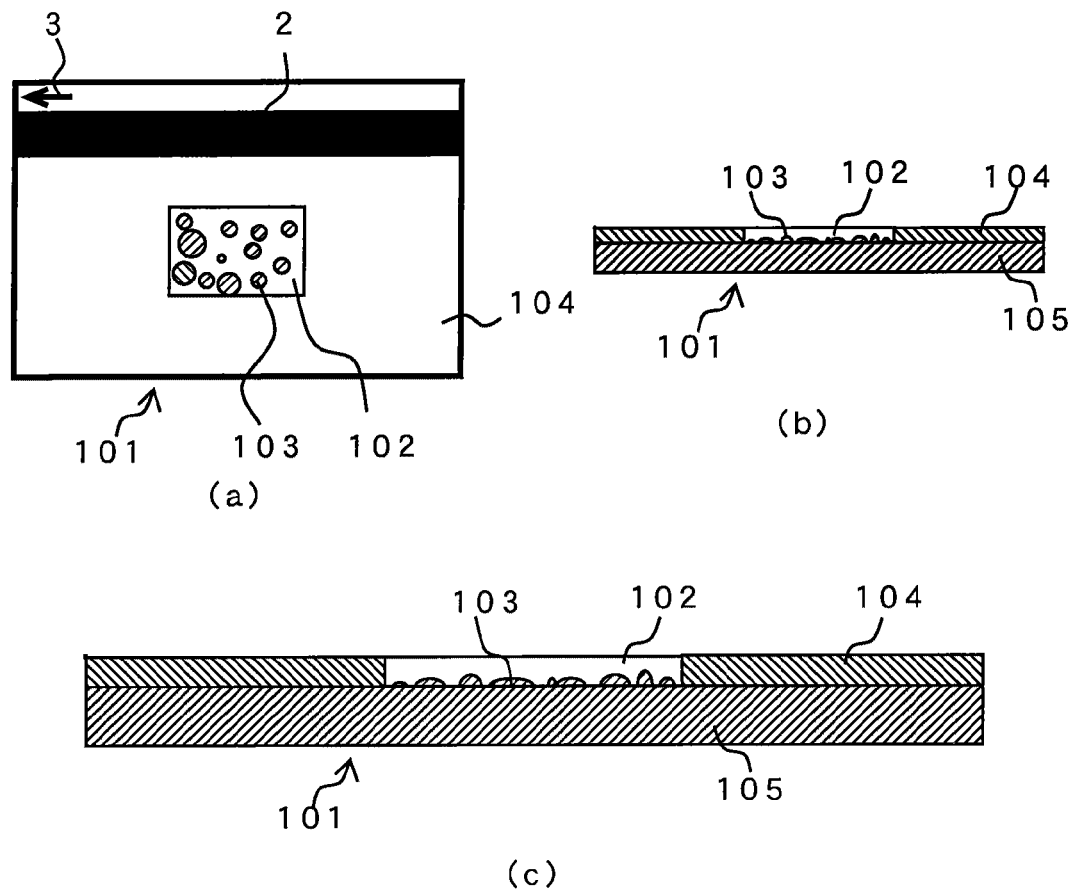
FIG. 22 shows a differently arranged embodiment of the authentication verifying chip based on the principle of FIG. 8.

FIG. 22 shows an authentication verifying chip of Embodiment 10.

While the transparent medium is formed on the entire surface of the authentication verifying chip of the Embodiments 7 to 9 respectively, in the Embodiment 10, there are substances of "iridescence" appearing scattered similarly to the iridescent chip of the Embodiment 3 as shown in FIG. 14. This arrangement can be prepared by allowing the transparent medium material to drip to be scattered.

FIG. 22 (a) is a view of a card capable of authentication verifying as seen from above, FIG. 22 (b) is a cross sectional view, and FIG. 22 (c) is an enlarged cross-sectional view. In these figures, the reference numeral 101 represents a card body having a magnetic stripe 2 and an arrow mark 3 to indicate a card-inserting direction. An authentication verifying chip 102 is layered on a card base plate 105. The reference numeral 104 represents a surface plate, and another surface plate can be layered further on the authentication verifying chip 102 and the surface plate 104.

The base plate 105 is a thick synthetic resin plate as widely used in the cash card or the like, or a thin plate usually-non-transparent synthetic resin as used in the prepaid card.

Unlike the authentication verifying chip of the Embodiment 1 or the Embodiment 2, no hologram flake is used in the authentication verifying chip 102. Instead, resin substances 103 randomly sprayed are used. The resin substances 103 do not have uniform thickness and have non-uniform thickness in non-uniform scattering.

Embodiment 11

Figure 23:
FIG. 23 is an enlarged cross-sectional view of the iridescence chip of FIG. 22.

FIG. 23 shows an authentication verifying chip of Embodiment 11.

While the transparent medium is formed on the entire surface of the authentication verifying chip of the Embodiment 9, in the Embodiment 11, there are substances of "iridescence" appearing scattered similarly to the authentication verifying chip of the Embodiment 2 as shown in FIG. 13 and the authentication verifying chip of the Embodiment 3 as shown in FIG. 14. Such the arrangement can be prepared by allowing the transparent medium material to drip to be scattered.

In the authentication verifying chip, drops of the transparent medium material are sprayed, and transparent media 103 thus prepared are formed on a card base plate 105, and the entire surface is covered by a transparent synthetic resin 102.

Because the scattering and thickness of the transparent medium 103 are determined by mere chance, the arrangement pattern and wavelength of iridescence to be appeared vary non-gradually due to the random scattering and thickness.

The authentication verifying chip with the structure as described above can be prepared by adequately spraying the transparent medium material drops.

In addition to producing the chips individually, the chips can be prepared by spraying the transparent medium material drops over a large surface and by cutting out the chips individually.

Further, the authentication verifying chips can be formed directly on cards according to the procedure as described in connection with FIG. 12.

Embodiment 12

Figure 24:
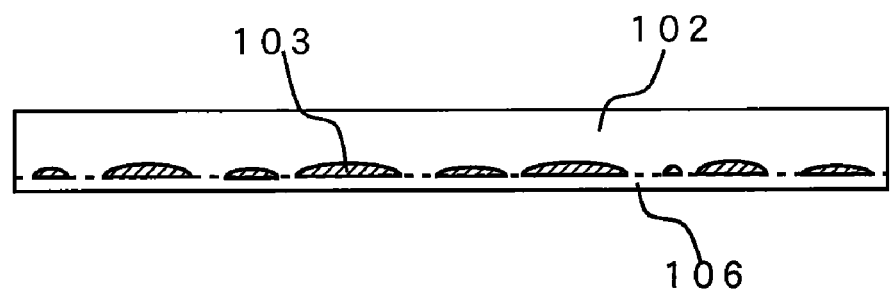
FIG. 24 is an enlarged cross-sectional view of an iridescence chip with the other structure shown in FIG. 22.

FIG. 24 shows an authentication verifying chip of Embodiment 12.

Unlike the Embodiment 11, in the authentication verifying chip of the Embodiment 12 as shown in FIG. 24, the transparent resin to fix the entire chip consists of two layers. These two layers function optically as a single layer.

In the authentication verifying chip, transparent media 103 are adequately sprayed on a flat transparent synthetic resin 106 arranged on the card base plate 105. The transparent media 103 are not uniform in the thickness and in the scattering arrangement, and a transparent resin 102 covers thereon.

A boundary surface between the transparent synthetic resin 106 and the transparent resin 102 is made of synthetic resin having the same optical property, and this causes no special optical effect.

In the authentication verifying chip with the arrangement as described above, the transparent synthetic resins 106 and 102 holding the transparent media 103 between them function similarly to the medium with the absolute refractive index of $n_0$ as shown in FIG. 7. A part of the light entering the transparent medium 103 is reflected at its surface, and a part of the light enters the transparent medium 103. Then, it is reflected at a surface where the transparent medium 103 and the transparent synthetic resin 106 come into contact with each other functioning as a reflection surface, and the light exits from the incident surface.

As a result, in this authentication verifying chip, the light reflected at the upper surface of the transparent medium 103 interferes with the light, which enters the transparent medium 103 and is reflected at its bottom. Then, the light in the incident light exits selectively, and iridescence appears.

Because the thickness of the transparent media 103 to be sprayed is determined by mere chance, the arrangement pattern and wavelength of the iridescence to be appeared vary non-gradually due to the random thickness.

The structure to provide light-absorbing black color on the upper surface of the card base plate where the authentication verifying chip comes into contact, to perform anti-luster processing or to form a reflection preventive film on the surface of the transparent synthetic resin 102 is the same as the aforementioned cases in the embodiments.

The authentication verifying chip is prepared by random spraying of the transparent media 103 on the transparent synthetic resin 106 provisionally disposed. Then, the transparent resin 102 covers and fixes on the whole, and the chips can be produced individually.

In addition to producing the chips individually, the chips can be prepared by spraying the transparent medium material drops over a large surface, the chips can be cut out individually.

Further, the authentication verifying chips can be directly formed on cards according to the procedure as described in connection with FIG. 12.

Embodiment 13

Figure 4:
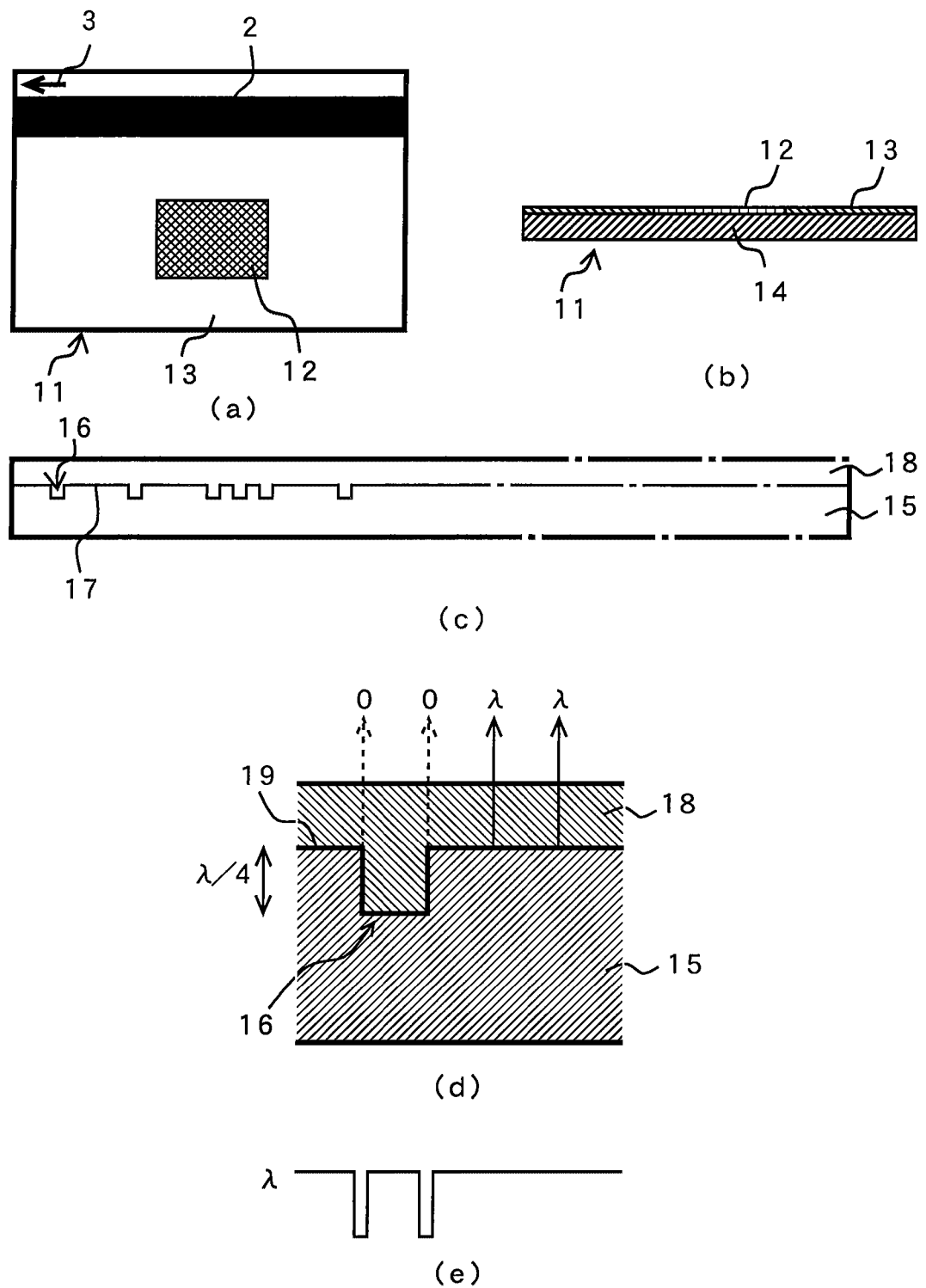
FIG. 4 shows an example of a card provided with an embossed hologram authentication verifying chip of an invention according to a prior application.
Figure 5:
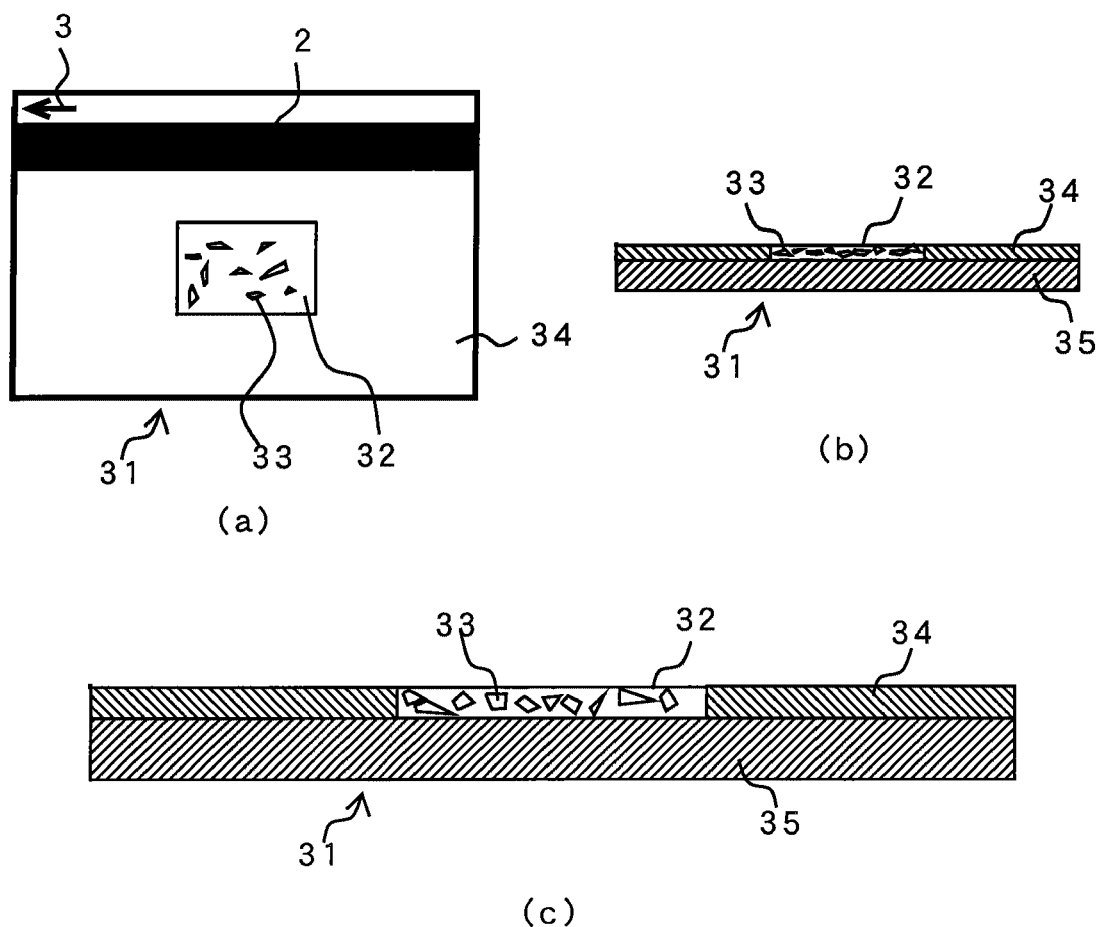
FIG. 5 shows an example of a card provided with an authentication verifying chip of an invention according to a prior application.
Figure 6:
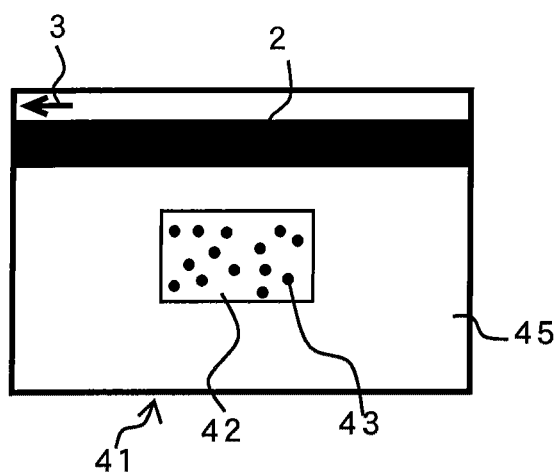
FIG. 6 shows an example of a card provided with an authentication verifying chip of an invention according to a prior application.
Figure 6:
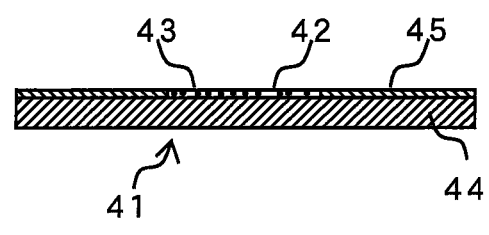
Figure 6:
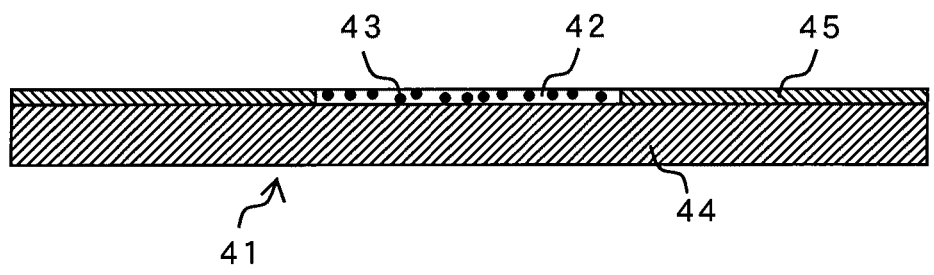
Figure 25:
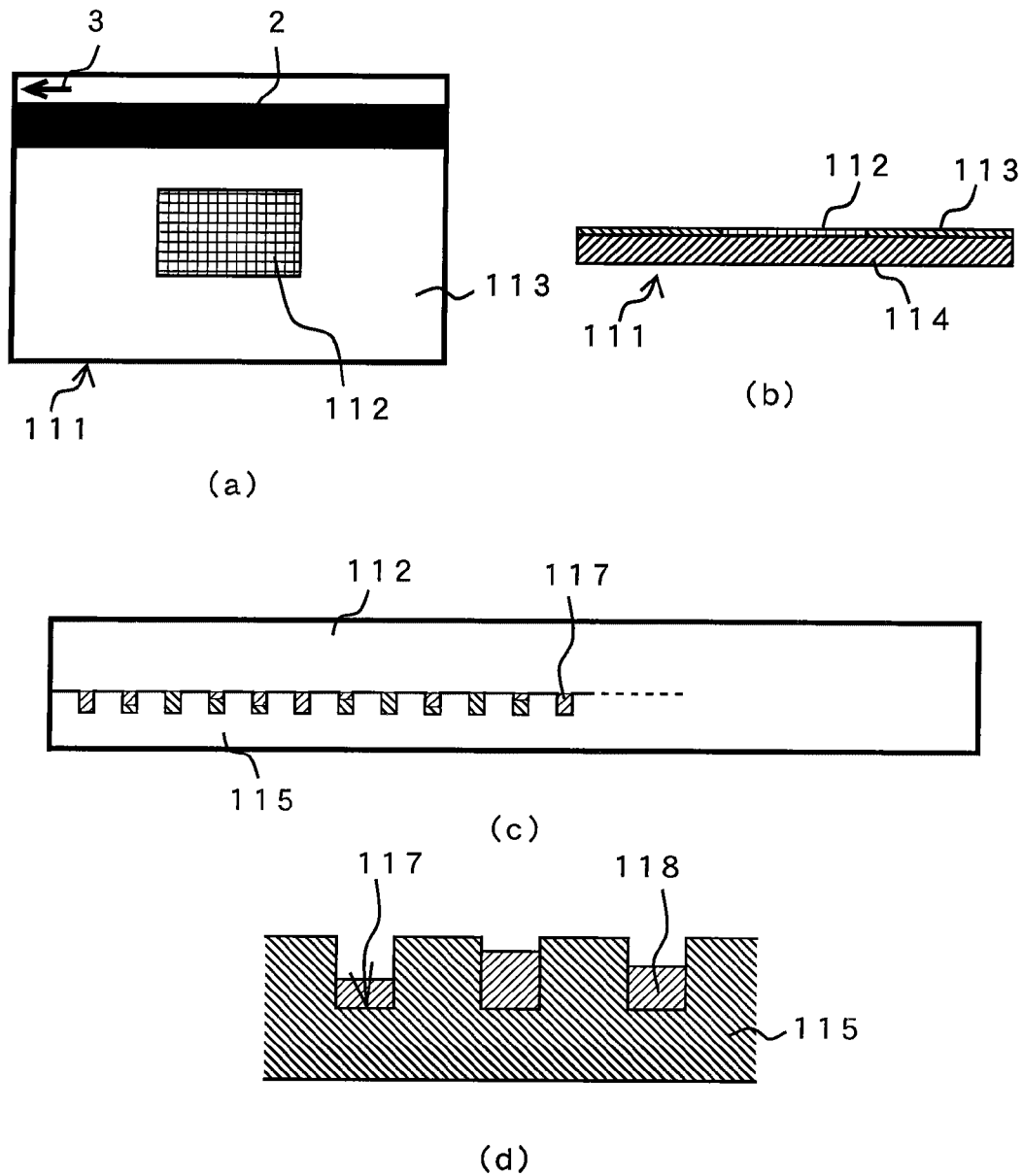
FIG. 25 shows an embodiment of a card provided with an authentication verifying chip having an iridescence substance regularly arranged.

FIG. 25 shows iridescence pits of an authentication verifying chip of Embodiment 13. In the embodiments as described above, iridescence pieces are in irregular arrangements. It is also possible to arrange regularly the iridescence pieces similarly to the arrangement of the embossed hologram shown in FIG. 4.

FIG. 25 (*a*) is a view of a card capable of authentication verification as seen from above, FIG. 25 (*b*) is a cross-sectional view, FIG. 25 (*c*) is an enlarged cross-sectional view of an authentication verifying chip, and FIG. 25 (*d*) is a further enlarged cross-sectional view of it.

In these figures, the reference numeral 111 represents a card body, which has a magnetic stripe 2 and an arrow mark 3 to indicate a card-inserting direction. An authentication verifying chip 112 is layered on a card base plate 114.

The card base plate 114 is a thick synthetic resin plate as widely used in the cash card or the like, or a thin plate usually non-transparent synthetic resin as used in the prepaid card or the like.

In order to protect the authentication verifying chip 112, a cover made of a hard material such as glass may be provided.

A multiple of pits 117 are regularly disposed on a chip base plate 115 of the authentication verifying chip 112, transparent media 118 in different quantities are filled into the pits 117 and iridescence substances different in thickness are arranged regularly.

The wavelength of the iridescence as detected in the authentication verifying chip 112 is depending on the thickness of the transparent media 118 filled in the pits 117.

The structure as described above can be prepared by spraying the transparent medium material on the base plate 115 where the regularly arranged pits 117 are formed.

In addition to producing the chips individually, the transparent medium material drops are sprayed over a large surface, and the chips can be produced by cutting them out individually.

Further, the authentication verifying chips can be directly formed on cards capable of authentication verification according to the procedure as shown in FIG. 12.

Embodiment 14

Figure 26:
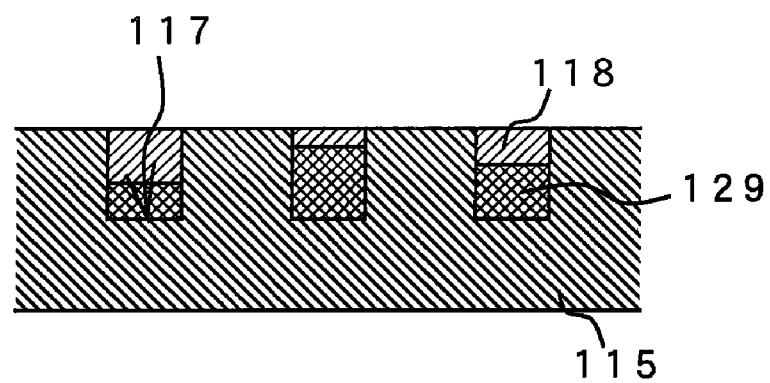
FIG. 26 is an enlarged cross-sectional view of an authentication verifying chip having an iridescence substance with another structural feature.

FIG. 26 shows iridescence pits of Embodiment 14.

This embodiment is a variation of the Embodiment 13. A filling resin 129 as appropriate is filled into the pits 117 regularly disposed on a chip base plate 115, and a transparent medium 118 is further filled in them.

The iridescence as detected in the authentication verifying chip is determined depending on the thickness of the transparent medium 118.

A reflection layer may be prepared between the filling resin 129 and the transparent medium 118. However, the reflection layer is not necessarily required, and differing the filling resin 129 and the transparent medium 118 in their reflective indices may be used for the reflection function.

The structure as described above can be prepared by spraying and filling adequate resin on the authentication verifying chip where pits are formed, and by further filling the transparent medium material thereon.

In addition to producing the chips individually, the chips can be produced by spraying the filling resin 129 on a large surface where pits are formed and further by filling the transparent medium material, and by cut out chips individually.

Further, the authentication verifying chips can be directly formed on cards capable of authentication verification according to the procedure as shown in FIG. 12.

Embodiment 15

Figure 27:
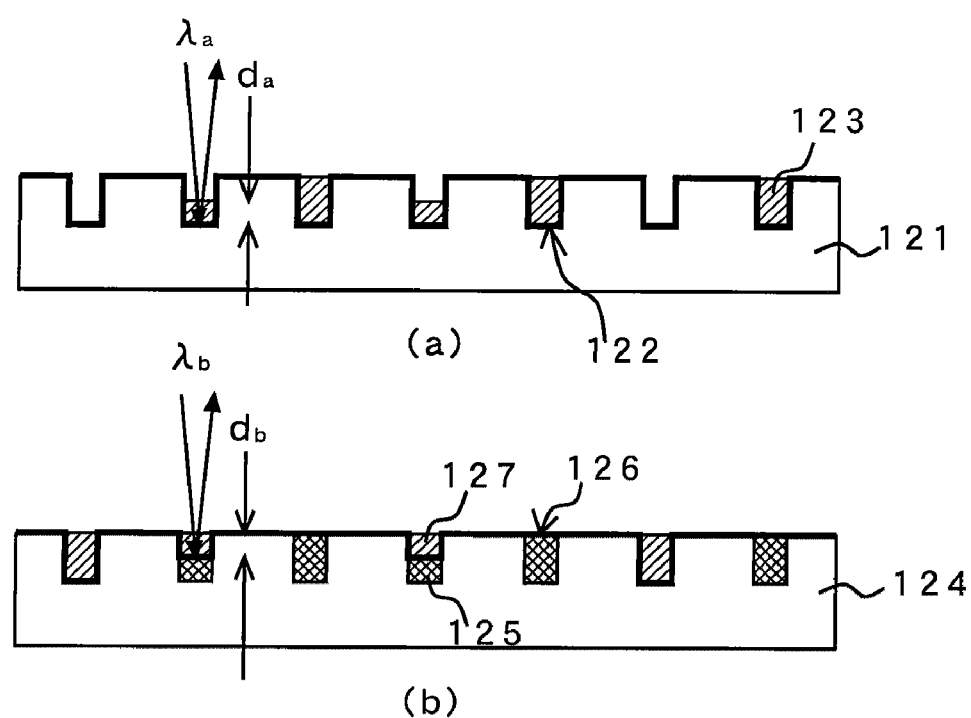
FIG. 27 shows a structure of the iridescence substance of FIG. 25 and the principle of the iridescence substance of FIG. 26.

FIG. 27 shows two types of arrangements of iridescence pits of Embodiment 15. On an authentication verifying chip 121 as shown in FIG. 27 (*a*), the transparent medium 123 is disposed in pits 122, which are arranged regularly.

The iridescence as detected on the authentication verifying chip 121 is depending on thickness $d_a$ of the transparent medium 123.

The structure as described above can be prepared by spraying the transparent medium material on the authentication verifying chip where the pits are formed.

On an authentication verifying chip 124 as shown in FIG. 27 (*b*), a resin as appropriate is disposed in the pits regularly arranged, and a transparent medium 127 is further disposed thereon. The iridescence as detected on the authentication verifying chip 124 is depending on thickness $d_b$ of the transparent medium 127.

Embodiment 16

Figure 28:
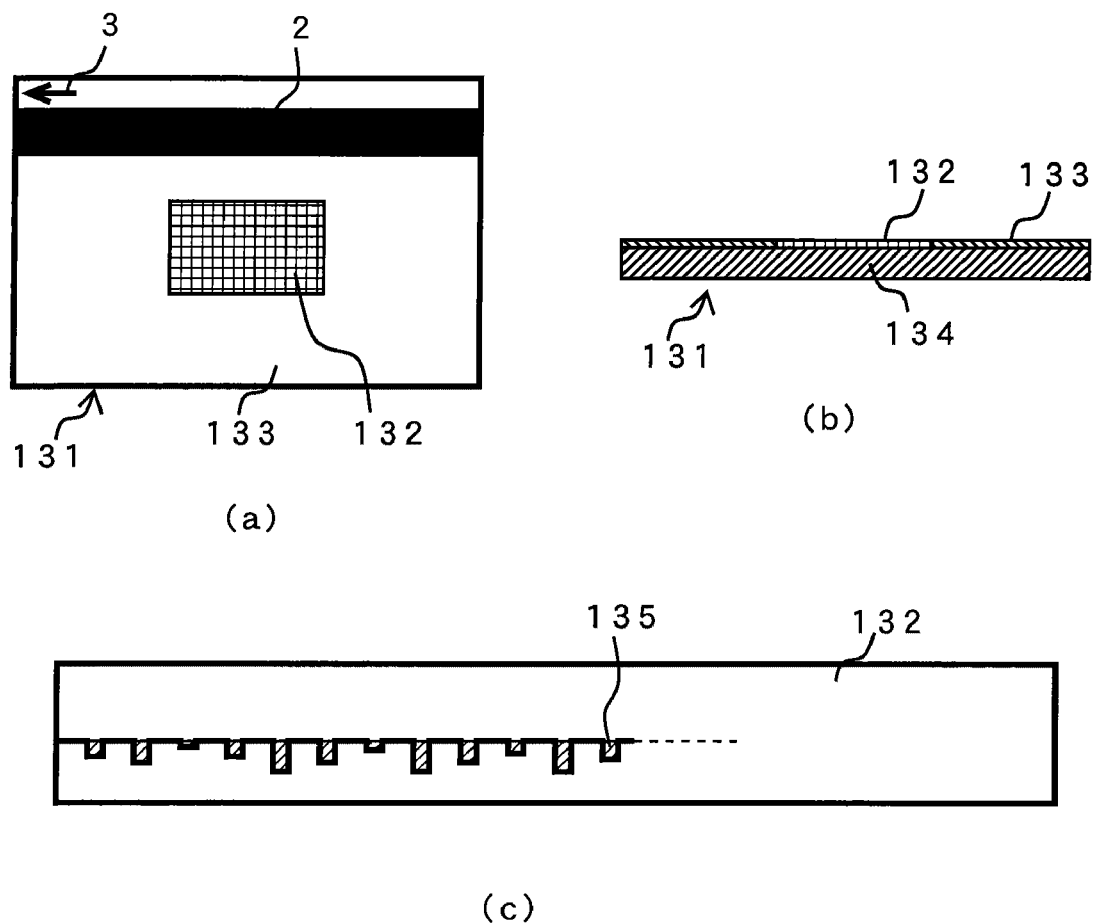
FIG. 28 shows an embodiment of a card provided with an authentication verifying chip having an iridescence substance with another structural feature regularly arranged.

FIG. 28 shows Embodiment 16 where a regular arrangement is adopted.

FIG. 28 (*a*) is a view of a card capable of authentication verification as seen from above, FIG. 28 (*b*) is a cross-sectional view, and FIG. 28 (*c*) is an enlarged cross-sectional view of the authentication verifying chip.

In these figures, the reference numeral 131 represents a card body, which has a magnetic stripe 2 and an arrow mark 3 to indicate a card-inserting direction. An authentication verifying chip 132 is layered on a card base plate 134.

The card base plate 134 is a thick synthetic resin plate as widely used in the cash card or the like, or a thin plate usually non-transparent synthetic resin as used in the prepaid card or the like.

In order to protect the authentication verifying chip 132, a cover made of a hard material such as glass may be provided.

A multiple of pits 135 different in depth are regularly disposed on a base plate of the authentication verifying chip 132. The transparent medium is filled into the pits 135 so that iridescent substances different in thickness are regularly arranged.

The wavelength $\lambda$ of the iridescence as detected in the authentication verifying chip 132 is depending on the thickness of the transparent medium filled in the pits 135.

The structure as described above can be prepared individually by regularly forming the pits different in depth by means such as etching and by filling the transparent medium in the pits thus formed.

In addition to producing the chip individually, pits different in depth are regularly formed by means such as etching on a large surface, and the transparent medium material is filled into the pits thus formed, and then, by cutting out individually, the chips can be produced.

Also, the authentication verifying chips can be directly formed on cards capable of authentication verification according to the procedure as shown in FIG. 12.

Embodiment 17

Figure 29:
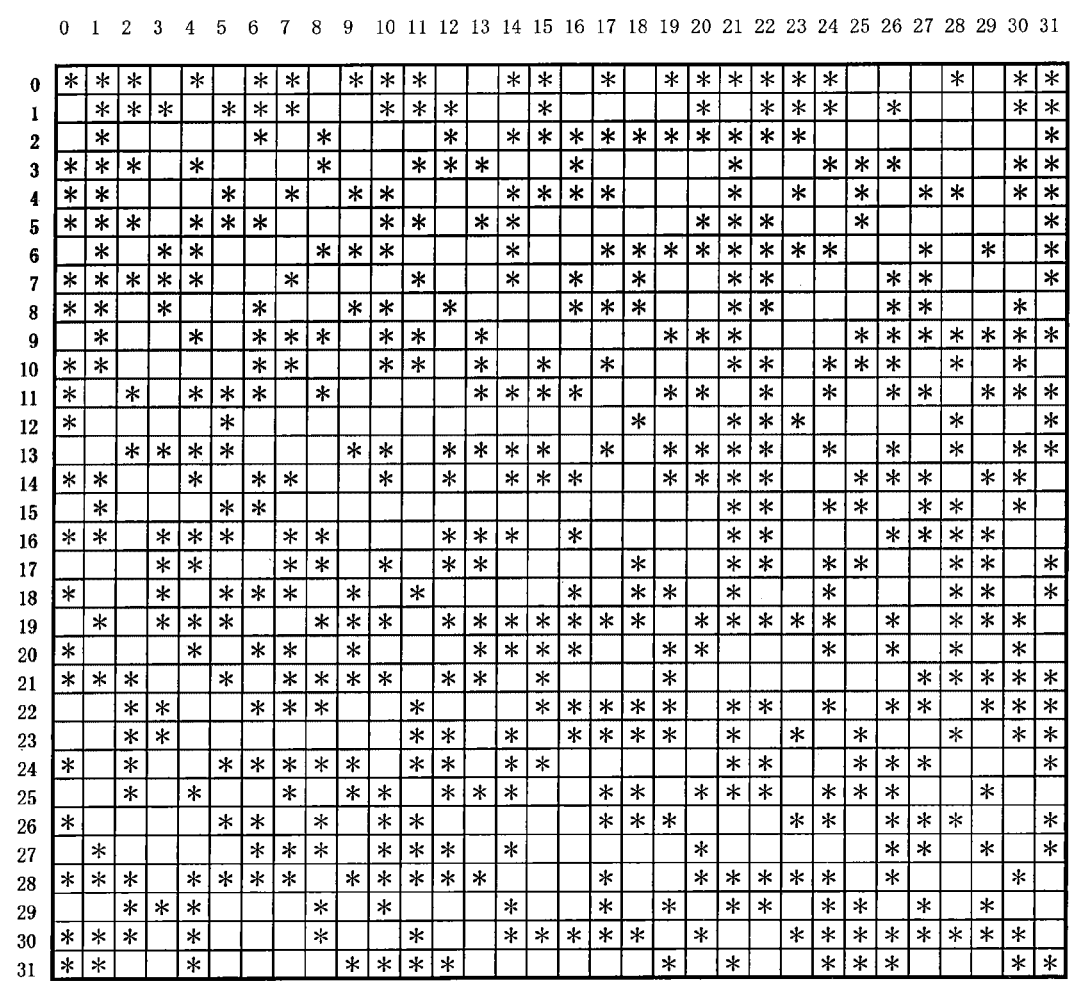

Referring to FIG. 29, description will be given below on a method to prepare an authentication verifying chip by using random numbers in Embodiment 17. The random numbers of binary numbers or hexadecimal numbers can be easily replaced with quaternary numbers, octal numbers, etc. In general, colors can be expressed as three primary colors of R, G and B and black color, i.e., four colors and by replacing with quaternary numbers.

By controlling thickness of the transparent medium in the pits so as to obtain desirable iridescence, iridescence with 4 colors or more than 4 colors can be prepared.

Controlling the thickness of the transparent medium can be carried out by adequate printing means such as an ink jet printer.

The use of binary random numbers and quaternary random numbers is described in each of the prior patent applications of the present inventors: PCT/JP2006/325224, PCT/JP2006/325225, PCT/JP2006/325226 and PCT/JP2006/325227.

Embodiment 18

Figure 30:
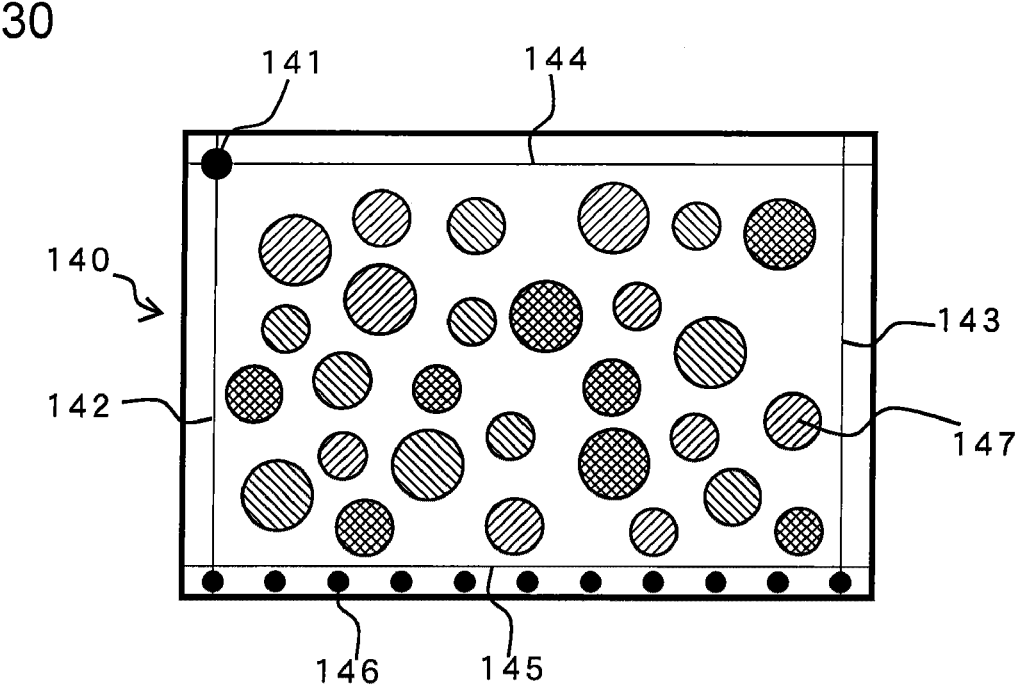
FIG. 30 shows an example of a position alignment mark.

FIG. 30 shows Embodiment 18, an arrangement to accurately read an authentication verifying chip.

Physical standards of a cash card and a credit card are strictly provided from the viewpoint of the practical use. Accordingly, physical standards on those mounted on such cards are also naturally strictly provided. However, it is likely that deformation may occur due to excessive use.

To cope with such the problem, it is desirable to arrange a position alignment mark 141 as shown in FIG. 30 on the authentication verifying chip. In the simplest case, only one position alignment mark may be used. However, to ensure the more reliable position alignment, a plurality of position alignment marks should be provided. The position alignment mark is useful not only in linear reading but also in planar reading using an image pickup device.

To ensure more accurate reading, it would be desirable to arrange some other marks at positions to start the reading and to finish the reading of the authentication verifying chip, together with the position alignment mark. For instance, a line 142 to start the reading in moving direction and a line 143 to finish the reading in moving direction and further, lines 144 and 145 to indicate the end portions may be arranged.

The reading of information on the authentication verifying chip is carried out by the relative movement of the authentication verifying chip and the reading device. Accordingly, in order to ensure the reliable reading, it is necessary to synchronize the movement of the authentication verifying chip with that of the reading device. If a mark for synchronization signal 146 is placed on the authentication verifying chip, the movement of the reading device can be synchronized according to the reading of the mark.

The reading start and finish lines and/or the mark for synchronization signal can be also used for signal normalization in the signal processing. The position alignment mark and the reading start/finish lines and/or the mark for synchronization signal are prepared by using fluorescent substance granules. For instance, these can be prepared by adequate printing means such as an ink jet printer.

[Reading Device]

Referring to FIGS. 31-39, description will be given below on reading of the authentication verifying chip using iridescence.

Embodiment 19

Figure 31:
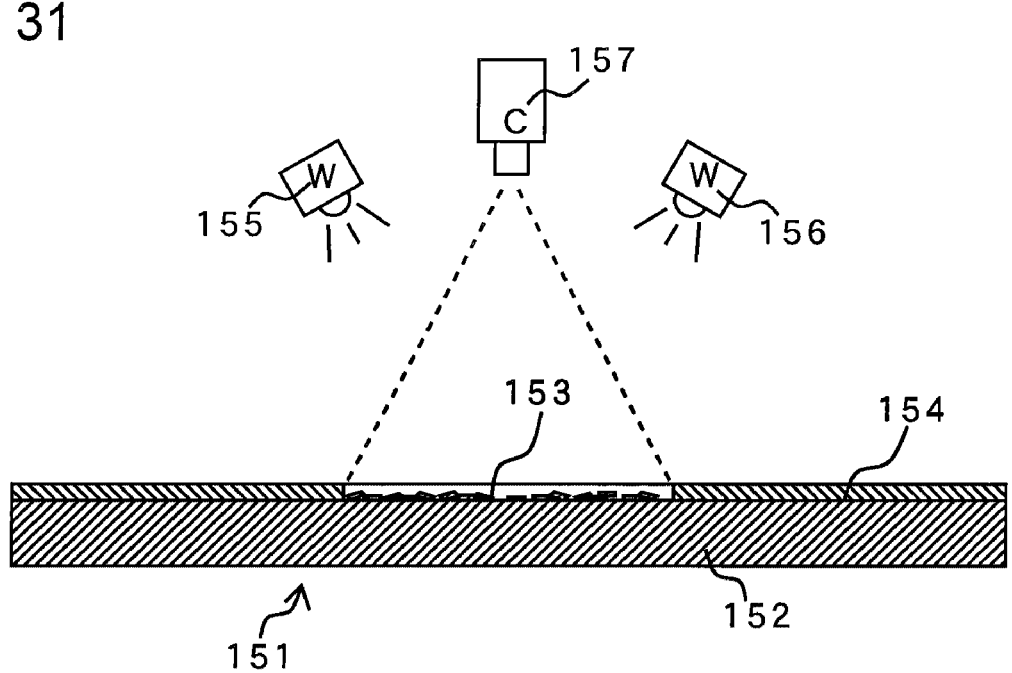
FIG. 31 shows an embodiment of a reading device using an image pickup device.

FIG. 31 shows Embodiment 19, an example using an image pickup device of the most basic arrangement in a method to read the authentication verifying chip as a plane.

The reference numeral 151 represents a card body; 152 a card base plate; 154 a card upper surface plate; 153 an authentication verifying chip; 155 and 156 each a light source for photographing the authentication verifying chip 153; and 157 a camera.

When the card 151 is taken into a card reading apparatus and it is stopped, the authentication verifying chip 153 is lighted by the light sources 155 and 156 and is photographed by the camera 157.

As the camera for image pickup, a color camera such as a CCD camera is used. In this case, a white LED is used as the light source.

The type and the number of the light source are not limited to one white LED.

The white LED gives quasi-white color through the combination of ultra-violet LED with fluorescence of R (red), G (green) and B (blue), through the combination of color LED of R, G and B, or through the combination of blue LED with the yellow fluorescence. On the other hand, colors are separated by using a color filter in the color camera.

Accordingly, the detection of a light according to a combination of the white LED and the color camera is limited to the color, which can be detected through the combination in use of the light emitting color and the color filter.

Embodiment 20

Figure 32:
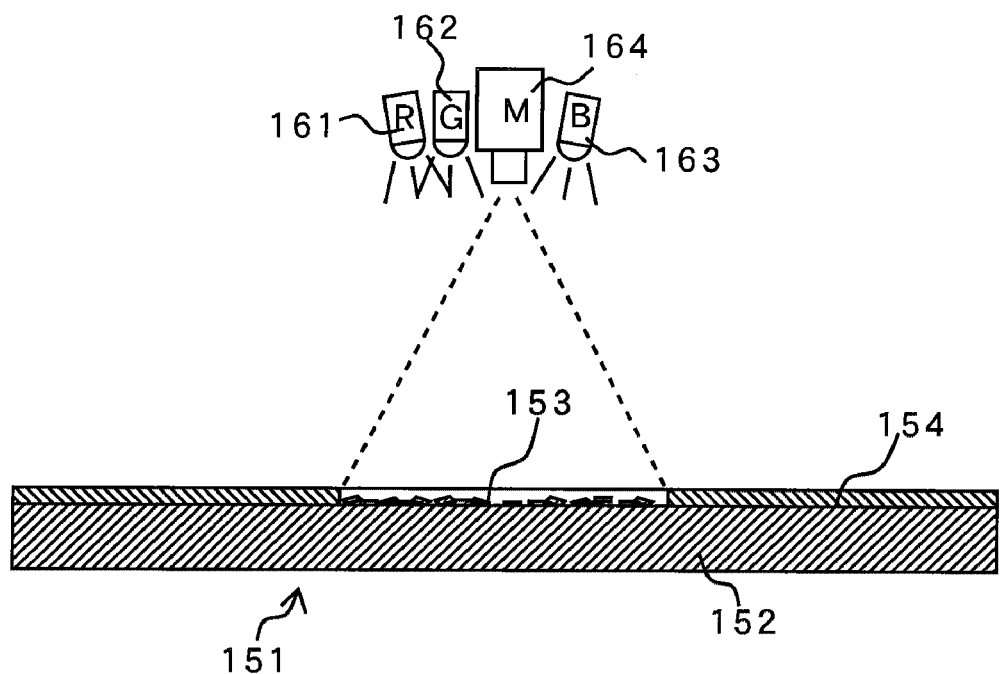
FIG. 32 shows another embodiment of a reading device using an image pickup device.

FIG. 32 shows Embodiment 20, which is a variation of the Embodiment 19. This reading device uses a red LED 161, a green LED 162, and a blue LED 163 instead of the white LED, and a monochrome camera 164 instead of the color camera.

The type and the number of the light sources are not limited to the three red, green and blue LEDs.

When the monochrome camera is used, the LEDs do not emit lights at the same time, but a field-sequential-color system is adopted where lights are emitted alternately.

By adopting this method, it would be unnecessary to pay attention as to which type of white LED should be used, or which type of color camera should be used.

In the Embodiments 19 and 20, the region to be lighted is not limited, but the region to be detected is limited. In addition, it is possible to design that the lighted region is limited and the detection region is not limited.

Also, for the detection of iridescence, a photodiode or a phototransistor can be used instead of a camera.

Embodiment 21

Figure 33:
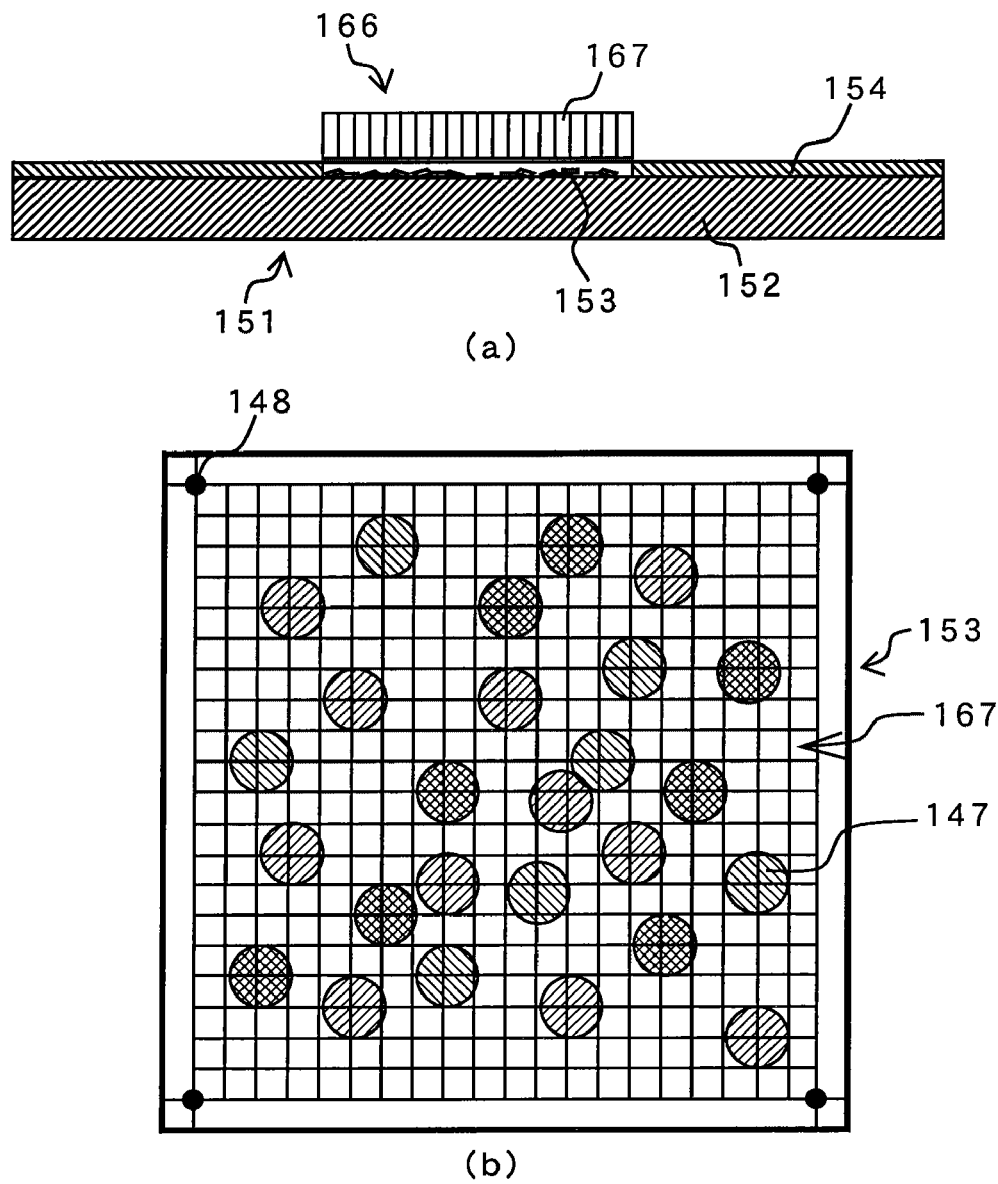
FIG. 33 shows an embodiment of a chip reading device using reading elements in a matrix form.

FIG. 33 shows a reading device for reading an authentication verifying chip as a plane in Embodiment 21.

FIG. 33 (a) shows a general arrangement of a detection unit of a reading device for verifying a card, and FIG. 33 (b) is an enlarged view to show the relation between the card and the reading device of the planar card reading for verification.

In FIG. 33 (a), the reference numeral 151 represents a card body; 152 a base plate; 154 a card upper plate; and 153 an authentication verifying chip.

Also, the numeral 166 represents a light emitting/detecting elements matrix where light emitting/detecting elements 167 based on a combination of light sources including red LED, green LED, blue LED, etc. combined with a small type light detection element such as the photodiode, phototransistor, CCD, CMOS, etc. are configured in a planar shape and in such a size to cover up the authentication verifying chip 153.

The type and the number of the light sources are not limited to the three red, green and blue LEDs.

In FIG. 33 (b), a plurality of iridescence pieces 147 are spread on the authentication verifying chip 153 and position alignment mark 148 are formed. Light emitting/detecting elements 167 of the light emitting/detecting elements matrix 166 face the authentication verifying chip 153.

When the card 151 is taken into a reading apparatus and is stopped, the authentication verifying chip 153 is positioned under the planar shape light emitting/detecting elements matrix 166. Then, the light emitting/detecting elements in the planar arrangement, which form the light emitting/detecting elements matrix 166, detect the light reflected from the iridescence piece disposed in the authentication verifying chip 153 as shown in FIG. 33 (b), and the present position of the iridescence piece is taken up as an electric signal.

The pattern of the electric signals depends on the arrangement condition of the iridescence pieces. By comparing the information thus obtained, it is possible to verify each individual authentication verifying chip 153, i.e., each individual card 151.

The accuracy of the reading of the iridescence pieces arrangement pattern on the authentication verifying chip 153 depends on the resolving capability of the light emitting/ detecting elements matrix 166 disposed in the planar shape.

By adopting a field-sequential-color system where elements emit the light per color in sequence, the number of the light detecting elements can be reduced extensively.

Embodiment 22

Figure 34:
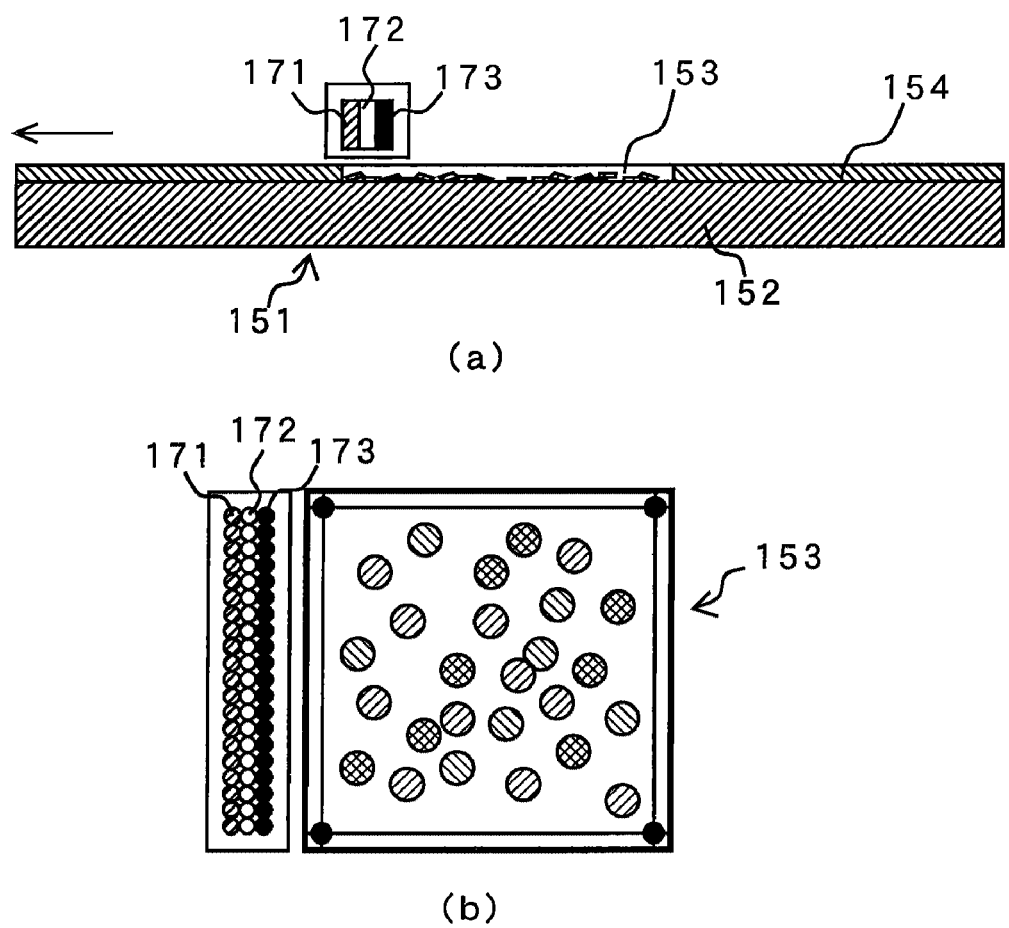
FIG. 34 shows an embodiment of a chip reading device using reading elements in array.

FIG. 34 shows a reading device for reading a plane of the authentication verifying chip as an assembly of lines in Embodiment 22.

FIG. 34 (a) shows a general arrangement of a detecting unit of a reading device for an authentication verifying chip, and FIG. 34 (b) is a drawing to show the corresponding relation between a card and a linear type light detecting unit. The card 151 is the same as the card shown in the Embodiment 20, and detailed description on the card is not given here.

In FIG. 34 (a), a red color light emitting/detecting elements array 171, a green color light emitting/detecting elements array 172 and a blue color light emitting/detecting elements array 173 are placed in a container, which has a width slightly wider than the width in moving direction of the authentication verifying chip 153.

These red color light emitting/detecting elements array, green color light emitting/detecting elements array 172, and blue color light emitting/detecting elements array 173 are given here as examples, and it is needless to say that any combination of colors can be used.

Unlike the authentication verifying chip reading device as shown in the Embodiment 19, 20 or 21, in the reading device of the Embodiment 22, the arrangement condition of the iridescent substance on the authentication verifying chip 153 is read ? not after the card is taken into the card reading apparatus and is stopped—but during the time when the card is taken into the card reading apparatus.

When the card 151 is taken into the card reading apparatus, it passes under the light emitting/detecting elements arrays 171, 172 and 173. At this moment, the linearly arranged array of the light emitting/detecting elements detects the light reflected by the iridescent substances disposed in the authentication verifying chip 153. Electric signals generated in association with the movement of the authentication verifying chip 153 are detected continuously in analog manner by each light detecting element or discontinuously in digital manner, or scanned as an image like using a facsimile machine or a scanner, and then, the authentication verifying chip 153 is verified and the card 151 is verified.

The pattern of the information thus obtained depends on the arrangement condition of the iridescent substances. By comparing the information, it is possible to verify each individual authentication verifying chip 153, i.e., each card 151.

The accuracy of the reading of the arrangement pattern of the iridescent substances in the authentication verifying chip 153 depends on the resolving capability of the light emitting/ detecting elements arrays 171, 172 and 173.

By adopting a field-sequential-color system where elements emit the light per color in sequence, the number of the light detecting elements can be reduced extensively.

Embodiment 23

Figure 35:
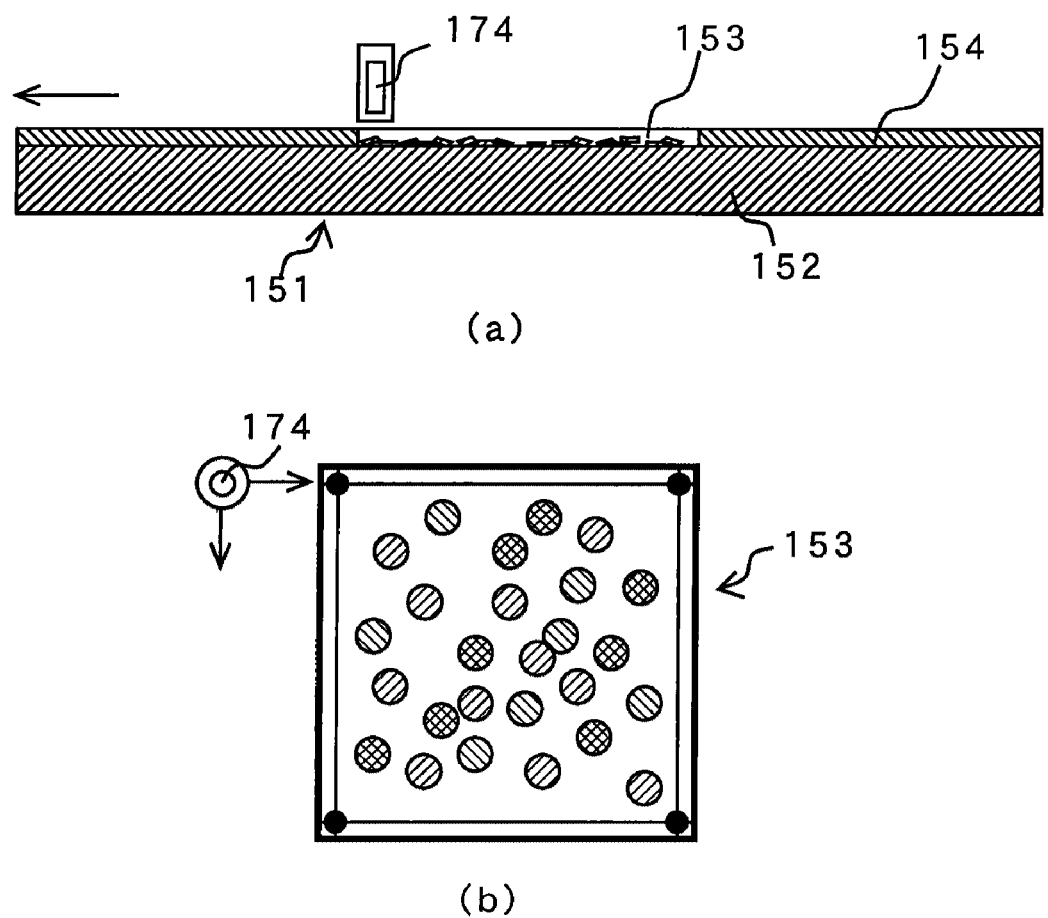
FIG. 35 shows an embodiment of a reading device using a single reading element.

FIG. 35 shows a reading device for reading a plane of an authentication verifying chip as an assembly of dots in Embodiment 23.

FIG. 35 (a) shows a general arrangement of the relation between a card and an authentication verifying chip reading device, and FIG. 35 (b) is a drawing to explain a reading method.

The reference numeral 151 represents a card body; 152 a base plate; 154 a card upper plate; 153 an authentication verifying chip; and 174 a light emitting/detecting element. The light emitting/detecting element 174 moves in a direction which perpendicularly crosses the direction that the card 151 is taken into the reading apparatus.

For the movement in the direction, which perpendicularly crosses the direction that the card 151 is taken into the apparatus, either of appropriate methods, for instance, a pseudo-linear movement based on the rotation on one point as a fulcrum, a linear movement based on the conversion from rotary movement to linear movement and a linear movement by means of a linear motor can be adopted.

Embodiment 24

Figure 36:
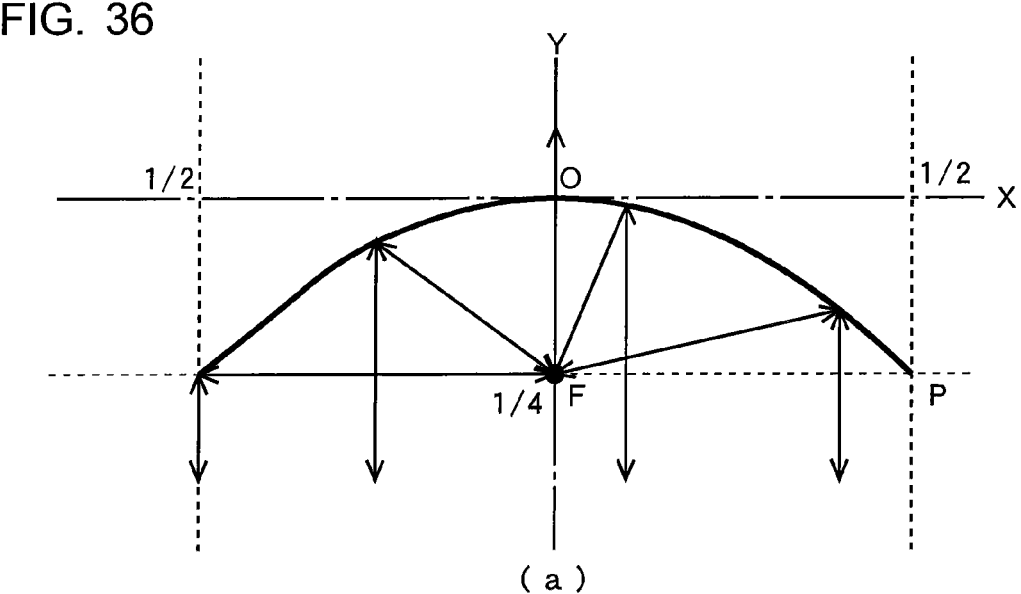
FIG. 36 shows a verifying chip reading device designed with a paraboloid mirror and a polygonal mirror combined.
Figure 36:
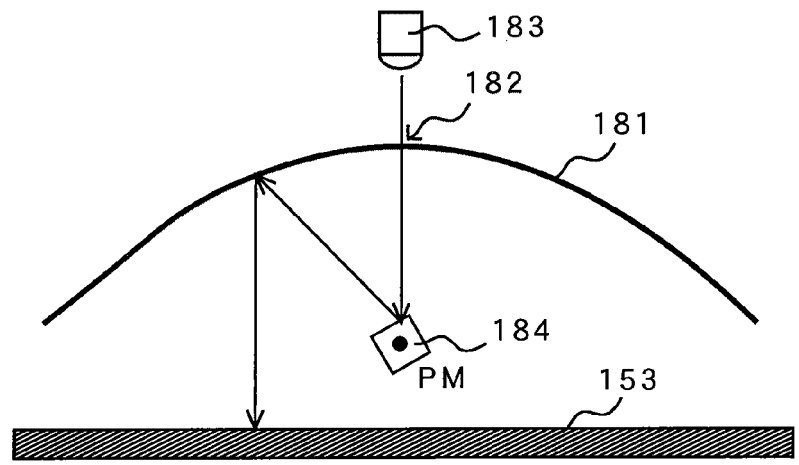
Figure 36:
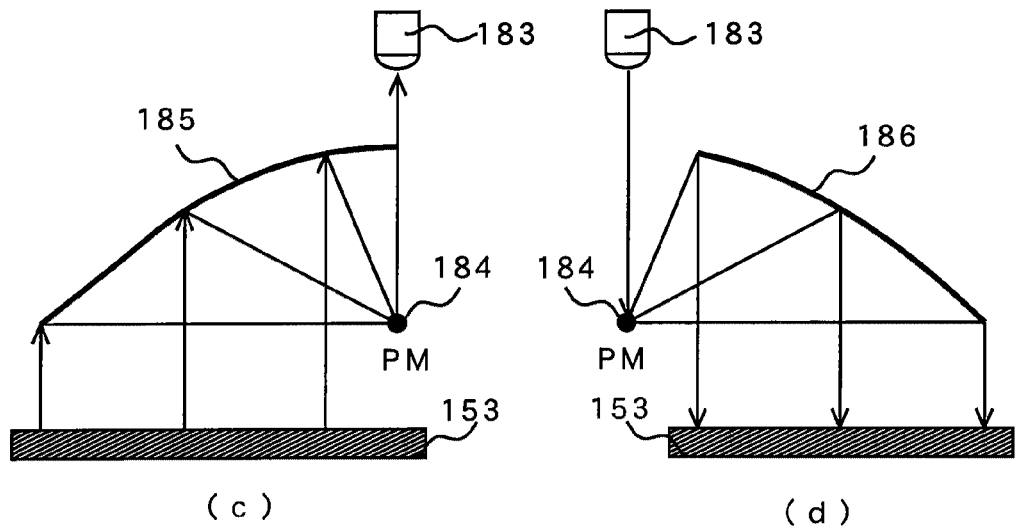

FIG. 36 shows an authentication verifying chip reading device of a new arrangement of Embodiment 24.

Optical scanning means to use the reflection of the laser beam by a rotating polygonal pillar mirror is adopted in the device such as a laser beam printer. In this scanning means, optical scanning can be performed only by the rotating movement of the polygonal pillar mirror.

As means for obtaining parallel beams, paraboloid is used in a reflecting telescope and a parabola antenna.

FIG. 36 (a) shows the relation between the paraboloid and parallel beams. In this figure, the symbol X represents X-axis, and the symbol Y is Y-axis, which is orthogonal to X-axis and the symbol O represents the origin. The symbol P represents a parabola, which is expressed as: $Y=-X^2$. This parabola has a focal point F at a position where $X=0$ and $Y=-\frac{1}{4}$. All the straight lines running in parallel to Y-axis are concentrated to the focal point F when reflected by the parabola P. On the contrary, the straight lines starting from the focal point F runs in parallel to Y-axis when reflected by the parabola P.

FIG. 36 (b) shows a basic arrangement of the reading device where this principle is applied. In this figure, the reference numeral 181 is a reflecting mirror in form of a paraboloid. It is designed in a semi-cylindrical shape with its length running in a direction perpendicularly crossing the drawing surface. Also, at a position to correspond to the origin of FIG. 36 (a), a light hole 182, which allows the light to pass through, is formed. Further, at the focal point of the reflecting parabolic cylinder mirror 181, a polygonal mirror 184 is disposed, which has a rotation axis in parallel to an axis in extending direction of the reflecting parabolic cylinder mirror 181 and has a polygonal reflecting surface. The reference numeral 183 represents a light emitting/detecting element; and 153 an authentication verifying chip, which is an object of the reading.

The light emitted in parallel to Y-axis in FIG. 36 (*a*) from the light emitting/detecting element 183 as shown by a solid line passes through the light hole 182 and enters the polygonal mirror 184, which is disposed at the focal point of the reflecting parabolic cylinder mirror 181. After entering the polygonal mirror 184, the light enters the reflecting parabolic cylinder mirror 181 in association with the rotation of the polygonal mirror 184. Then, it is reflected in a direction, which is in parallel to Y-axis and incidents the authentication verifying chip 153.

The light shown by a solid line in a direction in parallel to Y-axis in FIG. 36 (*a*) from the authentication verifying chip 153 is reflected by the reflecting parabolic cylinder mirror 181 and enters the polygonal mirror 184 disposed at the focal point. The light, thus entered the polygonal mirror 184 is reflected, passes through the light hole 182, and enters the light emitting/detecting element 183. In contrast, the light reflected in a direction different from Y-axis from the authentication verifying chip 153 does not enter the polygonal mirror even reflected at the reflecting parabolic cylinder mirror 181.

As it can be understood from the description as given above, among the light components reflected from the authentication verifying chip 153, only the light running in parallel to Y-axis enters the polygonal mirror 184. Accordingly, by rotating the polygonal mirror 184, the light entering the light emitting/detecting element is selected, and the light reflected condition on the authentication verifying chip 153 can be identified.

In the reading device shown in FIG. 36 (*b*), the light from the authentication verifying chip, which is on rear side of the polygonal mirror 184 as seen from the light emitting/detecting element 183, cannot be read. It can be so designed that necessary information is not written on this portion or that unnecessary information is written on this portion. According to the arrangement as shown in FIG. 36 (*c*) and FIG. 36 (*d*), there is no portion which corresponds to the rear side of the polygonal mirror 184, and all of the information as written can be read out.

FIG. 36 (*c*) shows a basic arrangement for this purpose, and one-half of the reflecting parabolic cylinder mirror is used. In this figure, the reference numeral 185 represents a reflecting mirror in form of a paraboloid. It is formed in semi-cylindrical shape having its length in a direction, which runs perpendicularly to the drawing surface only on the portion where the value of X is negative in FIG. 36 (*a*). The light hole 182 shown in FIG. 36 (*b*) is not formed here because it is not necessary. Further, a polygonal mirror 184, which has a rotation axis running in parallel to the axis in extending direction of the reflecting half-parabolic cylinder mirror 185 and has a polygonal reflecting surface, is disposed at the focal point of the reflecting half-parabolic cylinder mirror 185. The reference numeral 183 represents a light emitting/detecting element; and 153 an authentication verifying chip.

The light shown by a solid line as emitted in a direction in parallel to Y-axis in FIG. 36 (*a*) from the light emitting/detecting element 183 enters the polygonal mirror 184 disposed at the focal point of the reflecting half-parabolic cylinder mirror 185. After entering the polygonal mirror 184, the light enters the reflecting half-parabolic cylinder mirror 185 in association with the rotation of the polygonal mirror 184. Then, it is reflected in the direction in parallel to Y-axis and incidents the authentication verifying chip 153.

The light reflected in a direction in parallel to Y-axis in FIG. 36 (*a*) at the authentication verifying chip 153 is reflected at the reflecting half-parabolic cylinder mirror 185 and enters the polygonal mirror 184 disposed at the focal point. After entering the polygonal mirror 184, the light is reflected and enters the light emitting/detecting element 183.

In this reading device, the portion of the authentication verifying chip 153 to correspond to the rear side of the polygonal mirror 185 as seen from the light emitting/detecting element 183 is only its end portion. Accordingly, the portion which cannot be read has little influence.

Further, as shown in FIG. 36 (*d*), by adopting an offset arrangement to reduce the central portion of the reflecting partial paraboloid cylindrical mirror 185, the portion not readable by the polygonal mirror 184 can be totally eliminated, and all the information as written in all portions of the authentication verifying chip 153 can be read out.

[Authentication Judging Method]

Embodiment 25

Figure 37:
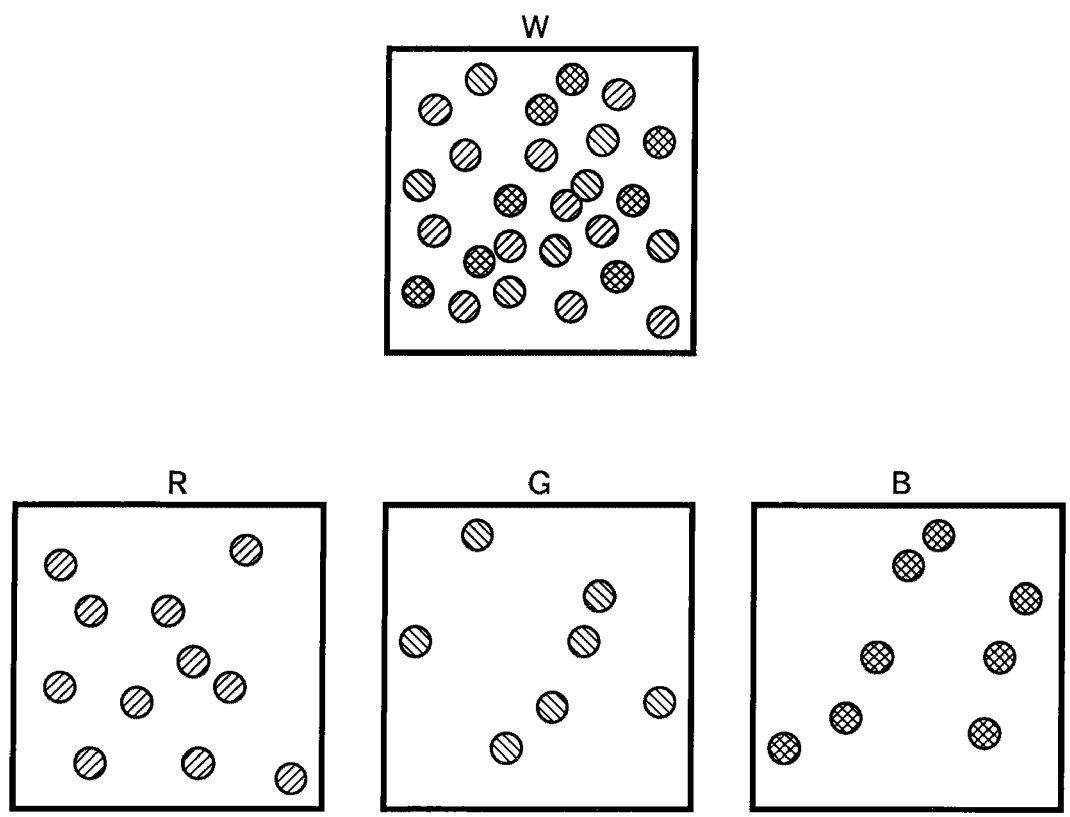
FIG. 37 shows an example of a reading method.
Figure 38:
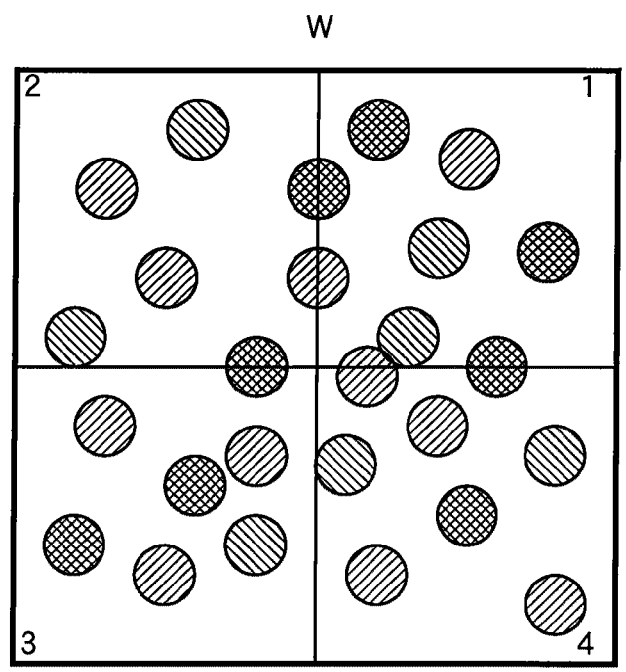
FIG. 38 shows an example explaining the reading method of FIG. 37.
Figure 38:
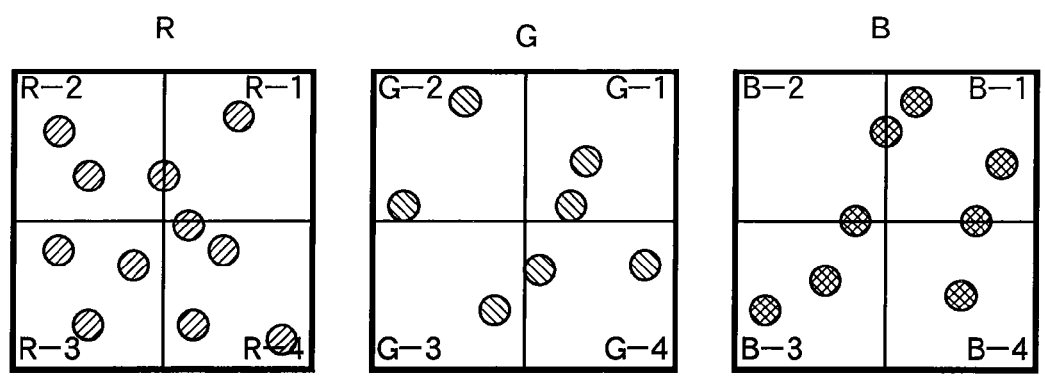
Figure 39:
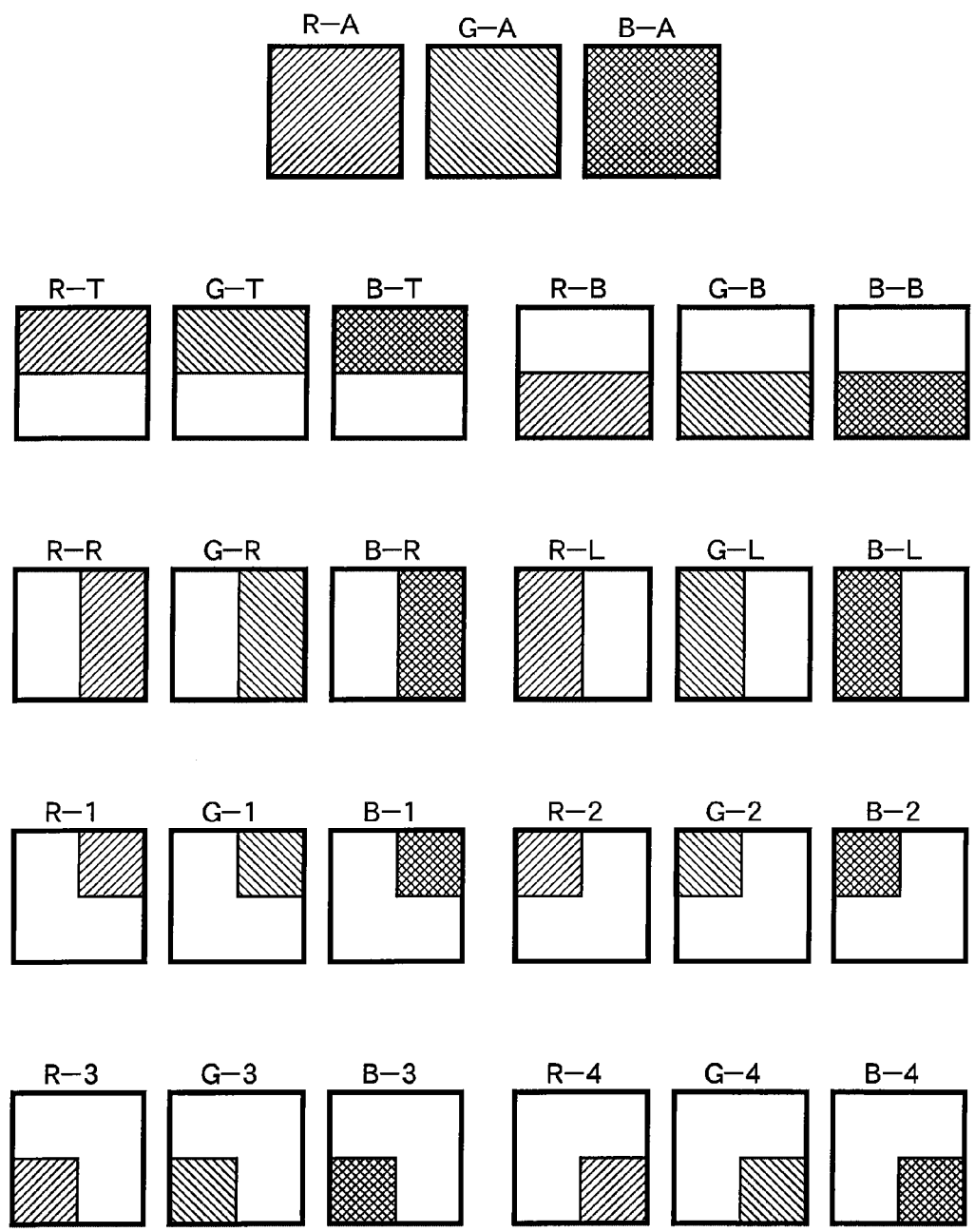
FIG. 39 shows another example explaining the reading method of FIG. 37.

Referring to FIGS. 37 ? 39, description will be given below on an authentication judging method using the reading device of FIG. 31 as an example in Embodiment 25.

The drawing indicated by the symbol W (White) in FIG. 37 shows an example where the authentication verifying chip 153 is photographed through the combination of a white LED and a color camera and where iridescent substances of all colors including R, G and B are detected. The drawings indicated by R, G and B underneath show conditions of iridescent substances, showing each of the colors separated by means of a color filter of the camera.

In these figures, the symbols W, R, G and B correspond to W, R, G and B of FIG. 37 respectively. In each figure, the image is divided in four portions: the first quadrant is referred by a numeral 1; the second quadrant is referred by a numeral 2; the third quadrant by a numeral 3; and the fourth quadrant by a numeral 4.

As the other manner of dividing, divided by a diagonal line may be adopted, or further, subdivisions can be conceived when necessary.

In this method, a pattern of the images divided is not detected. Instead, an average light intensity of the iridescence, i.e., a total light intensity, is detected. In these figures, the symbol [−A] indicates the total light intensity of the color in all portions of the authentication verifying chip. The symbol [−T] indicates the total light intensity of the color in the upper half of the authentication verifying chip, the symbol [−B] indicates a total light intensity of the light of the color in the lower half of the authentication verifying chip, the symbol [−R] indicates a total light intensity of the light of the color in the right half of the authentication verifying chip, the symbol [−L] indicates a total light intensity of the color in the left half of the authentication verifying chip, and the symbols [−1] to [−4] each indicates a total light intensity of the color in each of quadrants of the authentication verifying chip.

By the procedure as described above, it is possible to identify information of the total light intensity, i.e., 9 types of information for each of the colors R, G and B, and 27 types of information in total can be identified.

Through the comparison of the total light intensity information as obtained from the authentication verifying chip at the time of manufacturing the card and the total light intensity information as obtained from the authentication verifying chip when the card is used, the authentication of the card, i.e., the authenticity of the authentication verifying chip can be determined.

The white color obtained by the white LED is a pseudo-white color. Also, the white color detected by the color camera is a pseudo-white color because a color filter is used.

Accordingly, the detection of the light through the combination of the white LED and the color camera is limited only to the light, which can be detected by the combination of the light emitting color and the color filter. In this respect, care must be taken as to which type of white LED is used or which type of color camera is used.

To satisfy and define the strictness of the color used, it is desirable to use color information, not as a type of information based on visual sense, but as a physical color information, i.e., information based on the wavelength.

In addition to a visible light LED used as an LED for a light source, when an ultra-violet LED and an infrared LED are used in combination or selectively, illegitimate reading can be excluded.

Further, laser beams with different wavelengths or a non-linear device may be used, and the light of the frequency, which is obtained as a difference between frequencies or a sum of frequencies, can be used.

As other items to be used for the judgment, there are the value of the highest luminance in each area, number of pixels where luminance is higher than a predefined value, number of assemblies of bright pixels, length of contour of bright pixel, characteristics of bright pixel, weighted point of dispersed bright points, peak position and peak value in longitudinal and lateral histogram on an binarized image, and histogram of each pixel through weighting of luminance information.

[Certification of the Authentication Verifying Chip]

Referring to FIG. 40 to FIG. 47, description will be given below on an arrangement of a card and an arrangement of judging steps for certifying the validity of the card by using the card itself.

Embodiment 26

Figure 40:
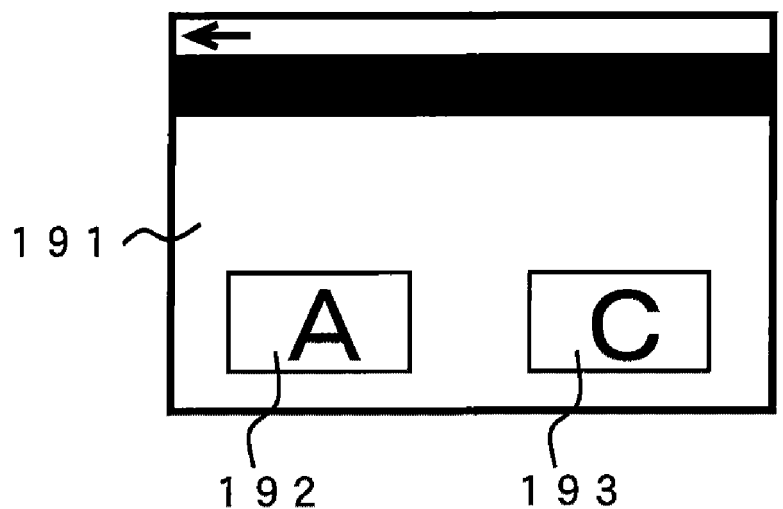
FIG. 40 shows an example of a card provided with an authentication verifying chip and an authentication certifying chip.
Figure 41:
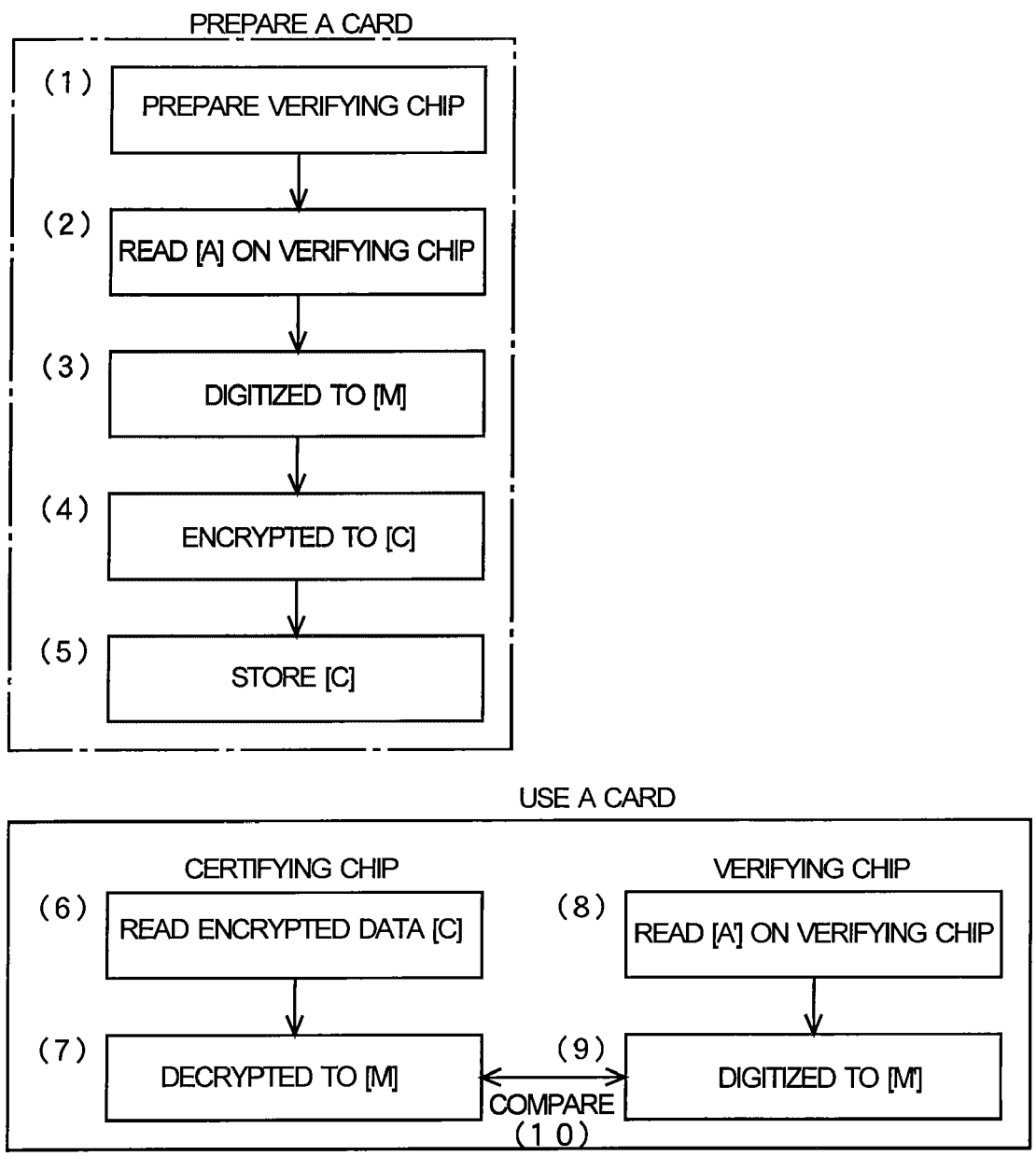
FIG. 41 is a flowchart to explain authentication certification of the card shown in FIG. 40.

FIG. 40 and FIG. 41 show authentication certifying steps in Embodiment 26.

FIG. 40 shows a structure of the card and FIG. 41 illustrates a process to certify the validity of the card itself.

On a card body 191 there are provided an authentication verifying chip 192 where the card Authentication verifying information [A] such as artifact-metrics is stored; and an authentication certifying chip 193 where digitized data [M] (Message) of the authentication verifying information [A] is encrypted to encrypted data [C], and is stored; and both are mounted non-separably from the card body.

The authentication verifying chip 192 and the authentication certifying chip 193 may be disposed at different positions as shown in this figure, while these may be positioned adjacent to each other or may be integrated together.

Now, referring to FIG. 41, functions are explained on the authentication verifying chip 192 and the authentication certifying chip 193 on the card body 191 shown in FIG. 40. In FIG. 41, the steps (1) to (5) give descriptions when the card is prepared by a card issuer, and the steps (6) to (10) give descriptions when a user uses the card through a terminal apparatus such as an ATM.

(1) The authentication verifying chip 192 where the authentication verifying information [A] is stored is prepared.

Every artifact-metrics is different from each other, and each authentication verifying chip 192 having the artifact-metrics is different. In particular, it is not possible to copy the artifact-metrics in three-dimensional arrangement, and it cannot be forged.

(2) Information on the authentication verifying chip 192 is read by analog or digital means. In order to perform the accurate reading when the card is used, it is desirable to do the reading after the authentication verifying chip 192 is mounted on the card body 191.

(3) An analog image of the authentication verifying chip 192 thus read is digitized to digital data [M]. In a case where the data stored in the authentication verifying chip 192 to be read is digital data, digitization is unnecessary.

(4) The digital data [M] is encrypted, and encrypted data [C] is obtained. As an encrypting system, a secret-key cryptosystem or a public-key cryptosystem can be used.

A crypt key used in the secret-key cryptosystem is called a secret-key. In recent years, with the propagation of the public-key cryptosystem, more and more people refer a private-key used in the public-key cryptosystem as a secret-key. In this respect, it is also called a common-key to avoid the confusion.

According to "Modern Cryptography" published by the Institute of Electronics, Information and Communication Engineers (Japan), the process to obtain the enCrypted data [C] by Encrypting the Message [M] by using a crypt Key [K] is expressed as C=E (K, M), and the process to obtain decrypted data by Decrypting the enCrypted data by using a crypt Key [K] is expressed as M=D (K, C).

Here, by following this expression, the process to Encrypt the digital data [M] by a Secret-key [Ks] of the secret-key cryptosystem to obtain the enCrypted data [Cs] is expressed as Cs=E (Ks, M), and the process to Decrypt the encrypted data [Cs] by the Secret-key Ks to obtain the digital data [M] is expressed as M=D (Ks, Cs).

The process to Encrypt the digital data [M] by a Pulic-key [Kp] of the public-key cryptosystem to obtain the encrypted data [Cp] is expressed as Cp=E (Kp, M). The process to Decrypt the encrypted data [Cp] by a priVate-key [Kv] to obtain digital data [M] is expressed as M=D (Kv, Cp). These are transmission of crypt keys.

The process to Encrypt the digital data [M] by the priVate-key [Kv] of the public-key cryptosystem to obtain the enCrypted data Cv is expressed as Cv=E (Kv, M). The process to Decrypt the encrypted data [Cv] by the public-key [Kp] to obtain the digital data [M] is expressed as M=D (Kp, Cv). These are the digital signature.

(5) The encrypted data [Cs], [Cp] or [Cv] is recorded and stored in the certifying chip 193, which is non-separably mounted on the card body 191. For recording and storing the encrypted data, adequate means such as the optical reading and recording method, the magnetic recording, etc. for barcode or two-dimensional barcode, etc. may be adopted.

In a case where the card 191 is an IC card with an IC chip mounted on it, the encrypted data may be stored in the IC chip. To be a non-separable structure, they are integrated or a method such as welding may be adopted. Also, the encrypted data may be recorded on the card itself instead of mounting the certifying chip on the card.

(6) When the card is used, the encrypted data [C] stored in the authentication certifying chip 193 is read.

(7) The encrypted data [C] is decrypted by using a predetermined cryptography algorithm and a crypt key, and decrypted data [M] is obtained.

(8) At the same time, information [A'] of the authentication verifying chip 192 is read. As the reading means, a camera is generally used, while a reading head device or a scanner or the like may be used instead of the camera.

(9) The information [A'] of the verifying chip thus read is digitized, and digital data [M'] is obtained.

(10) The decrypted data [M] is compared with the digitized data [M']. If these are equal to each other, it is judged that the combination of the authentication verifying chip 192 and the authentication certifying chip 193 is legitimate. If these are different from each other, it is judged that the combination of the authentication verifying chip 192 and the authentication certifying chip 193 is not legitimate, and the card is judged as illegitimate. In this way, the authenticity of the authentication verifying chip 192 is certified by the authentication certifying chip 193, which is together with present on the card.

In this example, the data [M'] read from the authentication verifying chip 192 is compared with the data [M] obtained and decrypted from the authentication certifying chip 193. It may be so designed that the encrypted data [C'], which is obtained by encrypting the data [M'] read from the authentication verifying chip 192, is compared with the encrypted data [C], which is read from the authentication certifying chip 193.

The data on the authentication certifying chip 193 is encrypted. In this cryptosystem, either cryptosystem, the secret-key (or the common-key) cryptosystem using a single crypt key or the public-key cryptosystem using two crypt keys may be adopted. In the public-key cryptosystem, a combination of the public-key and the private-key (the secret-key) or a combination of the private-key and the public-key may be adopted when used for the encryption and decryption.

When a user uses the card by means of a terminal apparatus, a crypt key for decryption is used. The crypt key is stored within a server or within the terminal apparatus. If it is so designed that the crypt key is stored within the server and when authentication verifying of the card is needed, the crypt key needed then, is delivered to the terminal apparatus each time, it can be a method with high security on on-line basis. If the crypt key is stored within the terminal apparatus, authentication verifying of the card can be executed only on the terminal apparatus on off-line basis. However, if the terminal apparatus is stolen, the crypt key is also stolen. If it is so designed that the crypt key is stored in a DRAM in the terminal apparatus and the crypt key stored in DRAM will be lost when the power to the terminal apparatus is cut off because the terminal apparatus is destroyed or stolen, the stealing of the crypt key can be prevented.

When the data stored for confirming the authenticity of the card is transmitted from the host server to the terminal apparatus and the authenticity is verified on the terminal apparatus, or when the data of the card is read and transmitted to the server and the authenticity is verified on the server, the storage data volume in the server and the transmitting data volume become large because the digital data volume of the authentication verifying chip 192 is large.

To cope with such the situation, if MD5 (Message Digest 5), which is the typical hash algorithm, or other hash algorithm such as SAH-1 (Secure Hash Algorithm-1) or SAH-2 is used, the data can be converted to the 16-byte hash value regardless of how large the data may be, and falsification of the original data is always reflected in the hash value. If utilizing these characteristics, the storage data volume in the server and the data transmission volume may not be so large. To alleviate the burden for encryption/decryption, hash algorithm is used.

Embodiment 27

Figure 42:
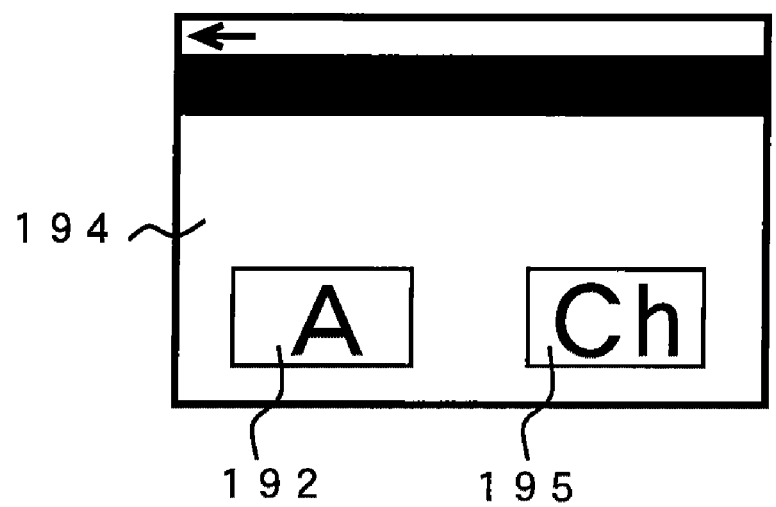
FIG. 42 shows another example of a card provided with an authentication verifying chip and an authentication certifying chip.
Figure 43:
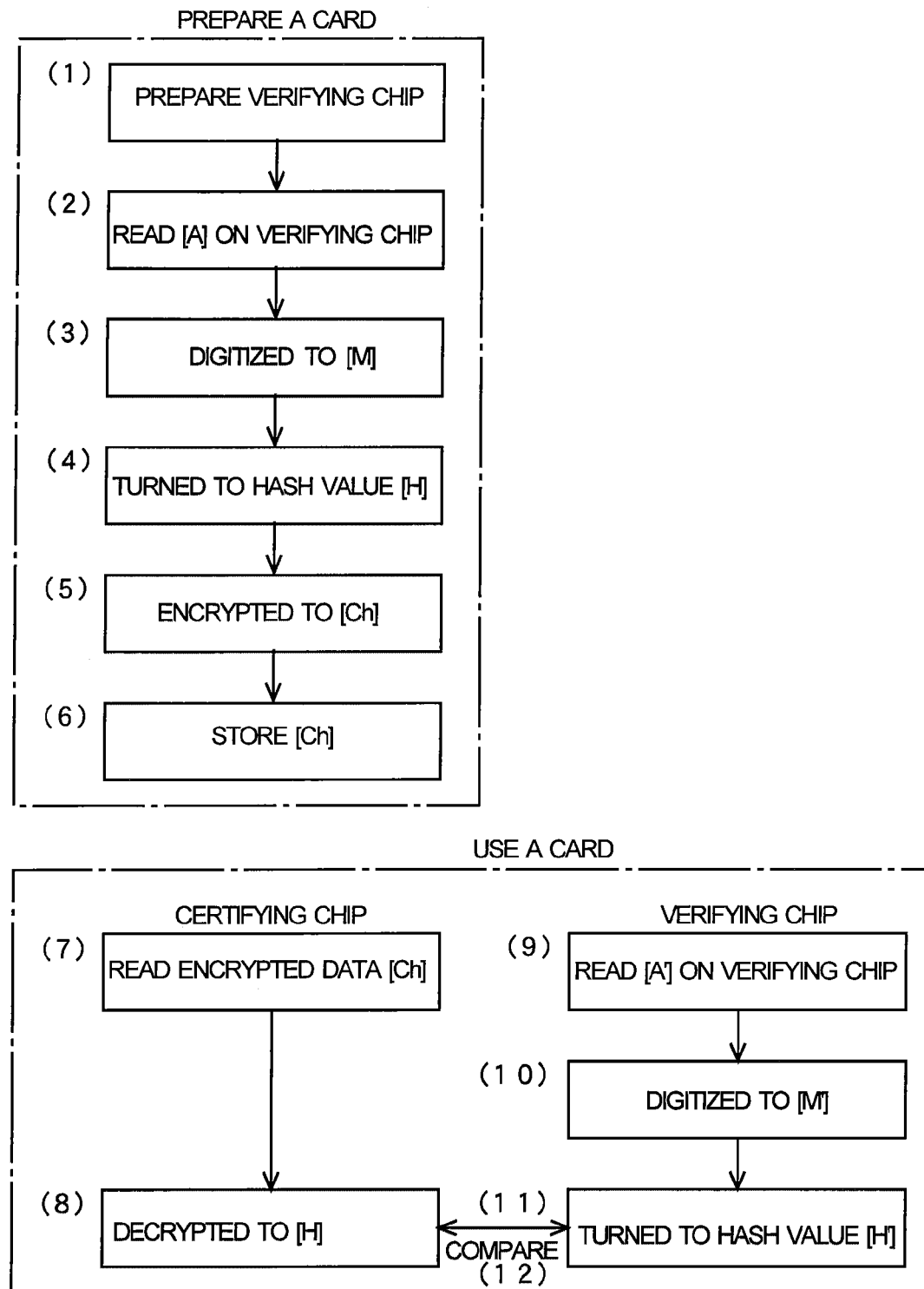
FIG. 43 is a flowchart to explain authentication certification of the card shown in FIG. 42.

FIG. 42 and FIG. 43 show an example of the case to certify the card itself by using the hash algorithm in Embodiment 27.

FIG. 42 shows an arrangement of the card and FIG. 43 the process to certify the validity of the card itself.

On a card body 194, there are provided an authentication verifying chip 192 where card Authentication verifying information [A] such as artifact-metrics is stored; and an authentication certifying chip 195 where the authentication verifying information [A] is digitized to the digitized data Message [M], turned to the hash value [H], and [H] is encrypted to the encrypted data [Ch] and is stored; and both are mounted non-separably from the card body. The authentication verifying chip 192 and the authentication certifying chip 195 may be disposed at different positions as shown in FIG. 42, while these may be disposed at the positions adjacent to each other or may be integrated together.

Referring to FIG. 43, functions are explained on the authentication verifying chip 192 and the authentication certifying chip 195 on the card body 194 shown in FIG. 42. In FIG. 43, the steps (1) to (6) give descriptions on the preparation of the card by a card issuer. The steps (7) to (18) give descriptions when a user uses the card by means of a terminal apparatus such as an ATM.

(1) The authentication verifying chip 192 where authentication verifying information [A] is stored is prepared.

Every artifact-metrics is different from each other, and each authentication verifying chip 192 having artifact-metrics is also different. In particular, it is not possible to copy artifact-metrics with three-dimensional arrangement, and it cannot be forged.

(2) Information of the authentication verifying chip 192 is read by analog or digital means. To perform the reading accurately when the card is used, it is desirable to do the reading after the authentication verifying chip 192 is mounted on the card 194.

(3) An analog image of the authentication verifying chip 192 thus read is digitized to the digital data [M]. In a case where the data stored in the authentication verifying chip 192 to be read is digital data, digitalization is unnecessary.

(4) The digital data [M] is turned to the hash value [H]. The hash value obtained when using the MD5 algorithm as widely used, is of 16-byte (=128 bits).

(5) The hash value [H] is encrypted, and the encrypted data [Ch] is obtained. As the cryptosystem, the secret-key cryptosystem or the public-key cryptosystem can be adopted.

(6) The encrypted data [Ch] is recorded and stored in the authentication certifying chip 195, which is mounted non-separably on the card body 194. To record and store the encrypted data, adequate means such as the optical reading and recording, the magnetic recording, etc., for barcode or two-dimensional barcode may be adopted.

In a case where the card 194 is an IC card with an IC chip mounted on it, the encrypted data may be stored in the IC chip. It is designed integrally in a non-separable structure, or a method such as welding may be adopted. The data may be recorded in the card itself instead of mounting the chip on it.

(7) When the card is used, the encrypted data [Ch] stored in the authentication certifying chip 195 is read.

(8) The encrypted data [Ch] is decrypted by using a predefined cryptography algorithm and the crypt key, and the decrypted data [H] is obtained.

(9) At the same time, information [A'] of the authentication verifying chip 192 is read.

A camera is generally used as the reading means, while other means such as a reading head device or a scanner may be used instead of the camera.

(10) The information [A'] of the verifying chip thus read is digitized, and the digital data [M'] is obtained.

(11) The digital data [M'] is hashed, and the hash value [H'] is obtained.

(12) The decrypted data [H] is compared with the hash value [H'].

If these are equal to each other, it is judged that the combination of the authentication verifying chip 192 and the authentication certifying chip 195 is legitimate. If these are different from each other, it is judged that the combination of the authentication verifying chip 192 and the authentication certifying chip 195 is not legitimate, and the card is judged as illegitimate. In this way, authenticity of the authentication verifying chip 192, i.e., the authenticity of the card body 194 is certified by the authentication certifying chip 195, which is present together with the authentication verifying chip 192 on the card.

In this example, the hash value [H'] obtained by the hashing of the data [M'] as read from the authentication verifying chip 192 is compared with the hash value [H] decrypted from the encrypted hash value [Ch] as read from the authentication certifying chip 195. It may be so designed that the encrypted hash value [Ch'], which is obtained by encrypting the hash value [H'] by hashing the data [M'] as read from the authentication verifying chip 192, is compared with the encrypted data [Ch], which is read from the authentication certifying chip 195.

The cryptosystem and the method to use and manage crypt keys used in this embodiment are not different from the cases of the embodiments as given above, and new description is not given here.

The authentication verifying chip may be broken or may be stained, and it may be impossible to read the authentication information, depending on the case. In such the case, the card cannot be used even when it is a valid one. Description will be given below on an arrangement to cope with such the situation.

Embodiment 28

Figure 44:
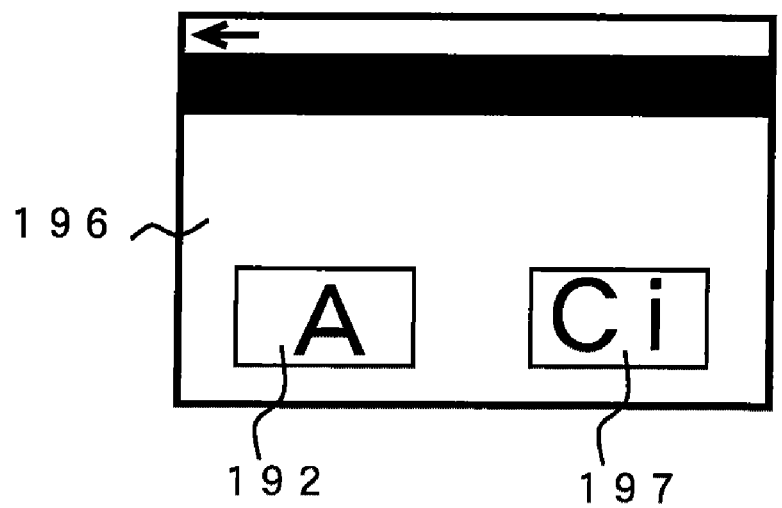
FIG. 44 shows another example of a card provided with an authentication verifying chip and an authentication certifying chip.
Figure 45:
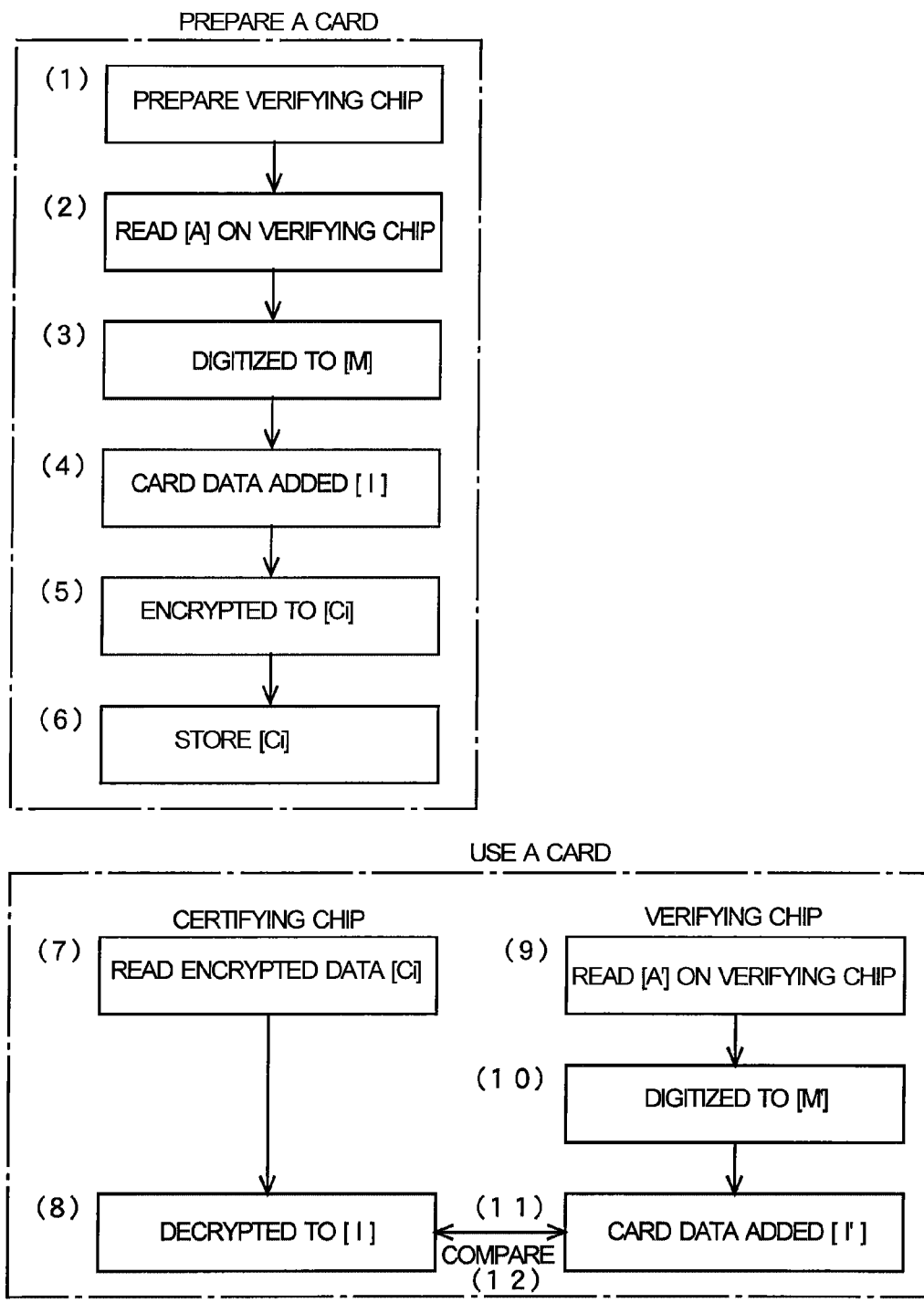
FIG. 45 is a flowchart to explain authentication certification of the card shown in FIG. 44.

FIG. 44 and FIG. 45 show an example to certify authenticity of a card using an ID of a card in Embodiment 28. FIG. 44 shows the card, and referring to FIG. 45, description will be given on the function to certify the validity of an authentication verifying chip using an authentication certifying chip.

On this card body 196, there are provided an authentication verifying chip 192 where card Authentication information [A] such as artifact-metrics is stored; and an authentication certifying chip 197 where the authentication verifying information [A] is digitized to the digitized data Message [M], turned to ID-added data [I] by adding data such as the ID of the card, and [I] is encrypted to the encrypted data [Ci] and is stored; and both are mounted non-separably from the card body.

The authentication verifying chip 192 and the authentication certifying chip 197 are mounted in a structure non-inseparable from the card main unit. The authentication verifying chip 192 and the authentication verifying chip 197 may be disposed at different positions, while these may be disposed at the positions adjacent to each other or may be integrated together.

Referring to FIG. 45, description will be given on functions of the authentication verifying chip 192 and the authentication certifying chip 197 on the card body 196 shown in FIG. 44. In FIG. 45, the steps (1) to (6) give descriptions on the preparation of the card by a card issuer, and the steps (7) to (12) give descriptions when a user uses the card by means of a terminal apparatus such as an ATM.

(1) An authentication verifying chip 192 where the authentication verifying information [A] is stored is prepared.

Every artifact-metrics is different from each other, and each authentication verifying chip 192 having artifact-metrics is different. In particular, it is impossible to copy the artifact-metrics in a three-dimensional arrangement, and it cannot be forged.

(2) The information on the authentication verifying chip 192 is read by analog or digital means. To perform the reading accurately when the card is used, it is desirable to do the reading after the authentication verifying chip 192 is mounted on the card 196.

(3) The analog image of the authentication verifying chip 192 thus read is digitized to the digital data [M]. In a case where the data stored in the authentication verifying chip 192 to be read is digital data, the digitalization is unnecessary.

(4) Data such as the ID of the card is added to the digital data [M], and ID-added data [I] is obtained.

(5) The ID-added data [I] is encrypted and encrypted data [Ci] is obtained. As the cryptosystem, the secret-key cryptosystem or the public-key cryptosystem can be adopted.

(6) The encrypted data [Ci] is recorded and stored in the authentication certifying chip 197, which is non-separably mounted on the card body 196. For recording and storing the encrypted data, adequate means such as the optical reading and recording method, the magnetic recording, etc., for barcord, two-dimensional barcode can be adopted.

In a case where the card 196 is an IC card with an IC chip mounted on it, the encrypted data can be stored in the IC chip. It is designed integrally in a non-separable structure, or a method such as welding may be adopted. The data may be recorded in the card itself instead of mounting the chip on the card.

(7) When the card is used, the encrypted data [Ci] stored in the authentication certifying chip 197 is read.

(8) The encrypted data [Ci] is decrypted by using a predefined cryptography algorithm and the crypt key, and decrypted data [I] is obtained.

(9) At the same time, information [A'] of the authentication verifying chip 192 is read. A camera is generally used as the reading means, while other means such as a reading head device or a scanner may be used instead of the camera.

(10) The information [A'] of the authentication verifying chip 192 thus read is digitized, and the digital data [M'] is obtained.

(11) Data such as the ID of the card is added to the digital data [M'] and ID-added data [I'] is obtained.

(12) The decrypted data [I] is compared with the ID-added data [I']. If these are equal to each other, it is judged that the combination of the authentication verifying chip 192 and the authentication certifying chip 197 is legitimate. If these are different from each other, it is judged that the combination of the authentication verifying chip 192 and the authentication certifying chip 197 is not legitimate, and the card is judged as illegitimate.

In this way, the authenticity of the authentication verifying chip 192 is certified by the authentication certifying chip 197, which is together with present on the card.

The data recorded on the authentication certifying chip 197 is the encrypted data which is obtained by adding the ID to the data based on the information of the authentication verifying chip 192, and is encrypted. In order to confirm the authenticity of the authentication verifying chip 192, it is necessary to add the ID to the data obtained from the authentication certifying chip 197 before comparing the data. If this ID is kept in secret, anyone who does not know the ID cannot cryptanalyze to know the crypt key.

In this example, the information [A'] as read from the authentication verifying chip 192 is digitized to the digital data [M'], further added the card information, and thus obtained data [I'] is compared with the decrypted data [I] obtained by decrypting the encrypted data [Ci] as read from the authentication certifying chip 197. It may be so designed that the digital data [M], which is obtained by removing the card information from the data [I] decrypted from the data [Ci] as read from the authentication certifying chip 197, is compared with the digital data [M'], which is obtained by digitizing the information [A'] as read from the authentication verifying chip 192.

A card where both the authentication verifying chip and the authentication certifying chip are present is under the control of the user. In the authentication verifying chip, the authentication verifying information subject to the encryption is present not in secret. In the authentication certifying chip, the encrypted data of the authentication verifying information is present. Under such circumstances, if the card falls in the hands of a person, who has malicious intention, or if the user is a person with malicious intention, the encryption may be cryptanalyzed, and the crypt key may be known to such person. Description will be given below on the procedure to prevent such the situation.

Embodiment 29

Figure 46:
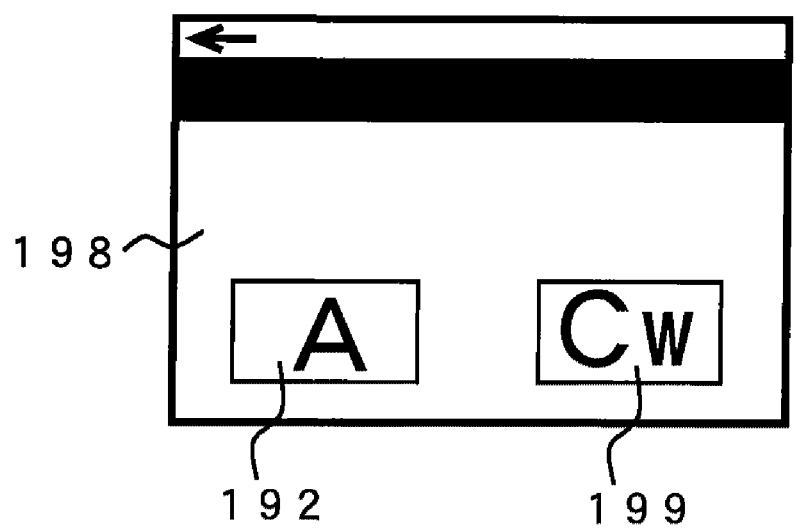
FIG. 46 shows still another example of a card provided with an authentication verifying chip and an authentication certifying chip.
Figure 47:
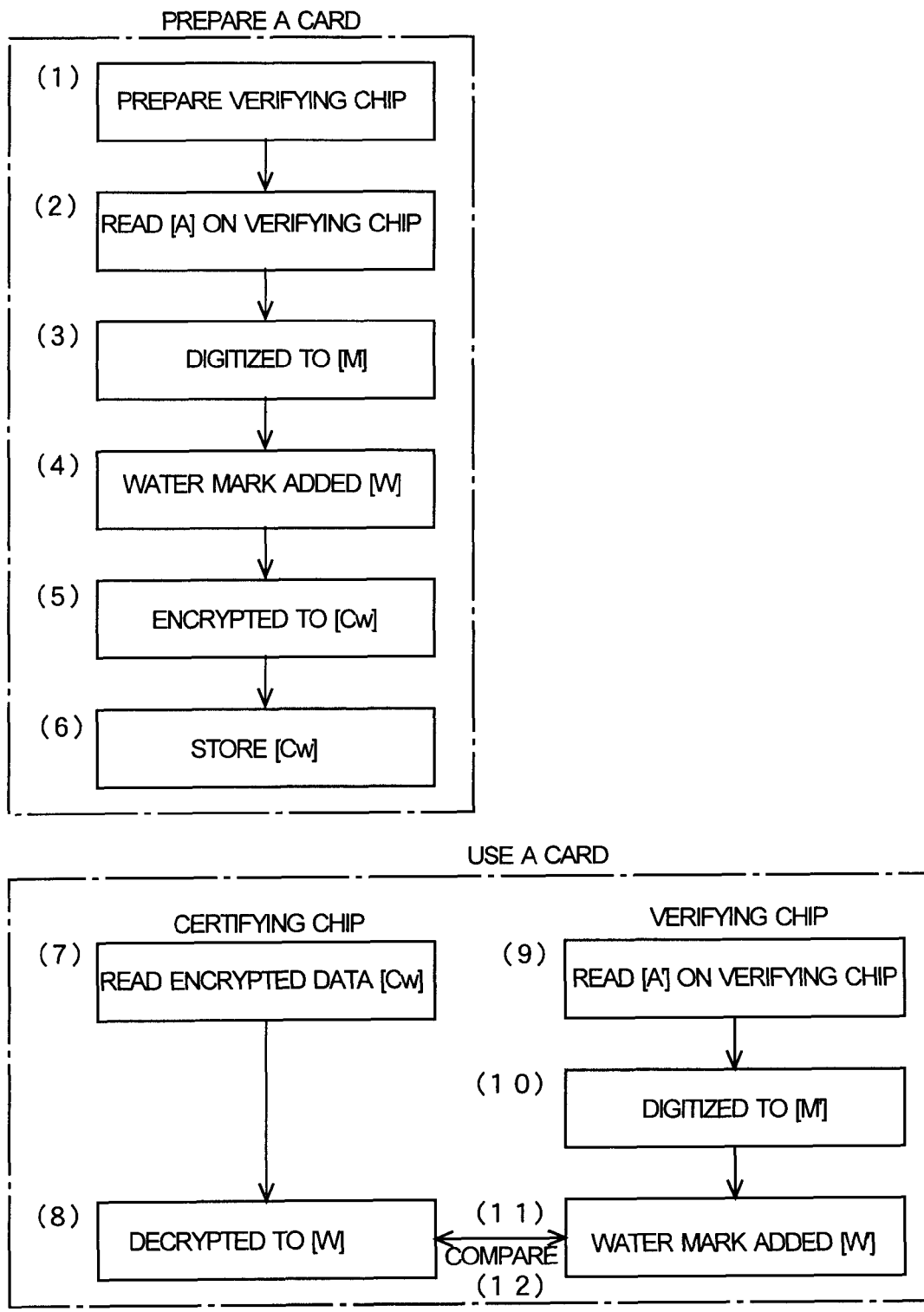
FIG. 47 is a flowchart to explain authentication certification of the card shown in FIG. 45.
Figure 48:
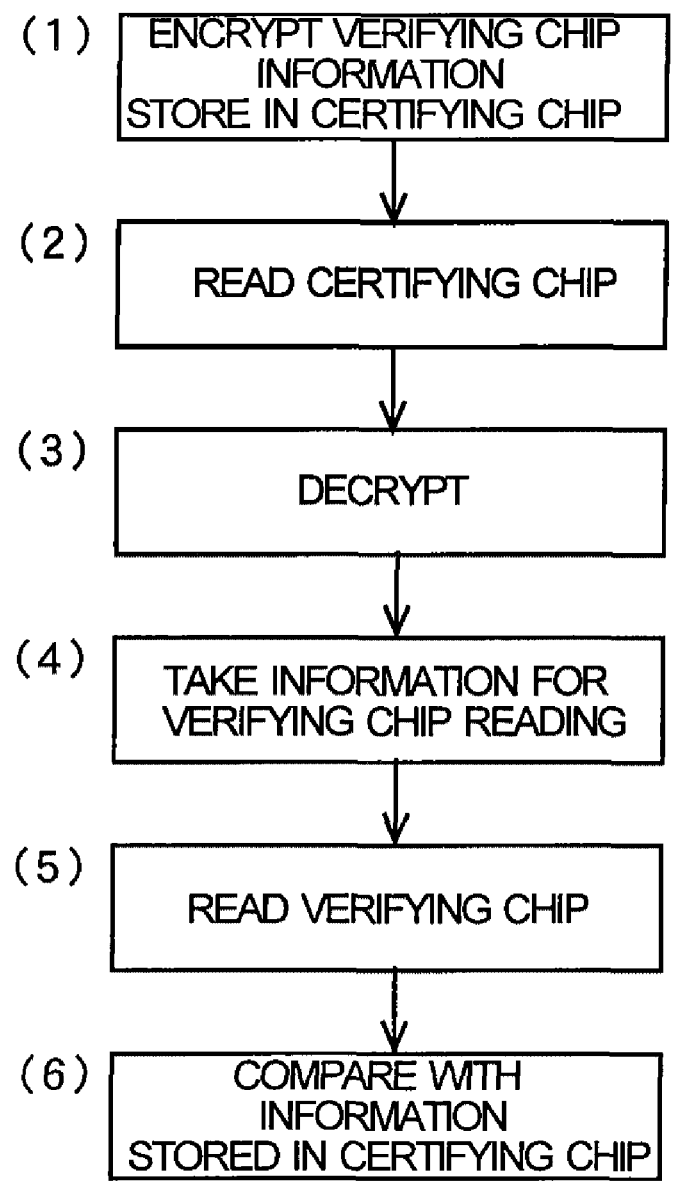
FIG. 48 is a flowchart of a method for protecting the reading.

FIG. 46 and FIG. 47 show an example of authentication certification using the digital watermark in Embodiment 30.

FIG. 46 shows the card. FIG. 47 shows a process to certify the validity of an authentication verifying chip by an authentication certifying chip.

On this card 198, there are provided an authentication verifying chip 192 where card Authentication verifying information [A] such as artifact-metrics is stored; and an authentication certifying chip 199 where the authentication verifying information [A] is digitized to the digitized data Message [M], turned to data with digital watermark [W] by adding the digital watermark to the digitized data [M], and is encrypted to the encrypted data [Cw] and is then, stored; and both are mounted non-separably from the card body. The authentication verifying ship 192 and the authentication certifying chip 199 may be disposed at different positions as shown in FIG. 46, or these may be positioned adjacent to each other or may be integrated together.

Referring to FIG. 47, description will be given on the function of the authentication verifying chip 192 and the authentication certifying chip 199 on the card body 198 shown in FIG. 46. In FIG. 47, the steps (1) to (6) give descriptions on the preparation of the card by a card issuer, and the steps (7) to (12) give descriptions when a user uses the card by means of a terminal apparatus such as an ATM.

(1) The authentication verifying chip 192 where the authentication verifying information [A] is stored is prepared.

Every artifact-metrics is different from each other, and each authentication verifying chip 192 having artifact-metrics is different. In particular, it is impossible to copy the artifact-metrics in a three-dimensional arrangement, and it cannot be forged.

(2) The information on the authentication verifying chip 192 is read by analog or digital means. To accurately perform the reading when the card is used, it is desirable to do the reading after the authentication verifying chip 192 is mounted on the card 198.

(3) An analog image of the authentication verifying chip 192 thus read is digitized to the digital data [M]. In a case where the data stored in the authentication verifying chip 192 to be read is digital data, the digitization is unnecessary.

(4) Digital watermark is added to the digital data [M], and data with digital watermark [W] is obtained.

(5) The data with digital watermark [W] is encrypted, and encrypted data [Cw] is obtained.

(6) The encrypted data [Cw] is recorded and stored in the authentication certifying chip 199, which is mounted non-separably on the card body 198. For recording and storing the encrypted data, adequate means such as the optical reading and recording method, the magnetic recording, etc. for barcode and two-dimensional barcode may be adopted.

In a case where the card body 1998 is an IC card with an IC chip mounted on it, the encrypted data can be stored in the IC chip. It is designed integrally in a non-separable structure, or a method such as welding may be adopted. Also, the data may be recorded on the card itself instead of mounting the chip on the card.

(7) When the card is used, the encrypted data [Cw] stored in the authentication certifying chip 199 is read.

(8) The encrypted data [Cw] is decrypted by using a predefined cryptography algorithm and the crypt key, and decrypted data [W] is obtained.

(9) At the same time, the information [A'] of the authentication verifying chip 192 is read. A camera is generally used as the reading means, while other means such as a reading head device or a scanner may be used instead of the camera.

(10) The information [A'] of the authentication verifying chip thus read is digitized, and the digital data [M'] is obtained.

(11) Digital watermark is added to the digital data [M'] and data with digital watermark [W'] is obtained.

(12) The decrypted data [W] is compared with the watermark added data [W']. If these are equal to each other, it is judged that the combination of the authentication verifying chip 192 and the authentication certifying chip 199 is legitimate. If these are different from each other, it is judged that the combination of the authentication verifying chip 192 and the authentication certifying chip 199 is not legitimate.

In this way, the authenticity of the authentication verifying chip 192 is certified by the authentication certifying chip 199, which is together with present on the card.

The data recorded on the authentication certifying chip 199 is the encrypted data which is obtained by adding digital watermark to the data based on the information of the authentication verifying chip 192, and is encrypted. In order to confirm the authenticity of the authentication verifying chip 192, it is necessary to add digital watermark to the data obtained from the authentication verifying chip 192 before comparing the data. If this digital watermark is kept in secret, anyone who does not know the digital watermark cannot cryptanalyze to know the crypt key.

In this embodiment, the information [A'] as read from the authentication verifying chip 192 is digitized to the digital data [M'] and digital watermark is added, and thus obtained data added with digital watermark [W'] is compared with the data [W], which is obtained by decrypting the encrypted data [Cw] read from the authentication certifying chip 199. It can be so designed that the digital data [M], which is obtained by removing the watermark from the data [W] decrypted from the data [Cw] as read from the authentication certifying chip 199, is compared with the digital data [M'], which is obtained by digitizing the information [A'] as read from the authentication verifying chip 192.

The cryptosystem and the method to use and manage crypt keys used in this embodiment are the same to those described as above, and new description is not given here.

In the examples of the certifying chip as described above, the hash algorithm is added in the Embodiment 27 to the basic arrangement of the Embodiment 26. Also, an ID of the card is added in the Embodiment 28, and digital watermark is added in the Embodiment 29. Each of these adding makes it difficult to make forgery.

It is not that only one technique is added, but is possible to add several types of technique combined. That is, the hash algorithm may be combined with the ID of the card or the like; the hash algorithm may be combined with the digital watermark; the ID of the card or the like may be combined with the digital watermark; or the hash algorithm, the ID of the card or the like, and digital watermark may be combined together.

Embodiment 30

FIG. 46 shows an example of authentication certification in Embodiment 31.

As the aspects for carrying out the invention according to the present application, there are the arrangements of the authentication verifying chip as given in the Embodiments 1 to 17, the arrangements of the reading device as given in the Embodiments 18 to 25, and the arrangements of judging methods as given in the Embodiments 26 to 29.

In the authentication certification of the authentication verifying chip as given in the Embodiments 26 to 29, the information of the authentication verifying chip as read is compared with the information as encrypted in the authentication certifying chip, and it is judged whether the authentication verifying chip is valid or not.

In this case, while the information of the authentication verifying chip can be easily observed, it must be kept in secret as to how the information is actually read or how the information thus read is judged.

In this respect, if the information as to what is the information for the authentication verification or how the reading is performed, etc. is encrypted and stored in the authentication certifying chip, the security on the authentication certification will be extensively increased.

(1) The information relating to the authenticity verifying such as a type or an arrangement of the authentication verifying information, and the information relating to the reading such as the wavelength of the light source to be used for the reading, etc. are encrypted and stored in the authentication certifying chip. Any type of the authentication certifying chip as given in the Embodiments 27 to 29 may be used.

(2) The information on the authentication certifying chip is read and decrypted.

(3) From the decrypted information, the information relating to the authentication verifying chip and the information relating to the reading of the authentication verifying chip is taken out.

(4) By using the information thus obtained, the authentication verifying chip is read.

(5) The information of the authentication verifying chip thus read is compared with the information of the authentication verifying chip which has been stored in the authentication certifying chip, and it is judged that the authentication verifying chip is authentic or not.

Because the information relating to the reading of the authentication verifying chip does not require large amount information, the public-key cryptosystem may be used.

INDUSTRIAL APPLICABILITY

A card having an authentication verifying chip which identifies the card as described above can be adopted in bank cash cards, credit cards, prepaid cards, membership cards, securities, ID cards, admission allowance and other types of certificate.

These can also be adopted in the applications such as a tag, which loses its certifying ability when it is detached, for example, a producer certifying tag, which is non-separably attached on commercial goods, an anklet non-detachably attached to an animal for conservation, etc.

If the digital signature is further used, that makes a person who gave the signature not allow to deny the content which the person has executed.

The applications as described above can also be extended to the authentication verifying chip based on other than the iridescent chip, for instance, an embossed hologram chip, a fluorescent granules chip, a radioactive substance chip, etc.

The invention claimed is:

1. An object for authentication verification, for which authentication verification is needed, wherein an authentication verifying chip having an iridescence pattern specific to and copy-unable for identifying said object is added non-separably from said object, and said iridescence pattern is based on an iridescent substance in a transparent thin layer.

2. An object for authentication verification according to claim 1, wherein an authentication certifying chip where authentication certifying information to certify authenticity of said authentication verifying chip is stored, is non-separably added further.

3. An object for authentication verification according to claim 2, wherein said authentication certifying information is encrypted information where the authentication verifying information obtained according to said iridescence pattern is encrypted.

4. An object for authentication verification according to claim 3, wherein said encrypted information for authentication certifying is obtained by encrypting hash value of the authentication verifying information obtained according to said iridescence pattern.

5. An object for authentication verification according to claim 3, wherein said encrypted information for authentication certifying is obtained by encrypting the authentication verifying information with identification information where identification information of said object is added to said authentication verifying information.

6. An object for authentication verification according to claim 3, wherein said encrypted information for authentication certifying is obtained by encrypting the authentication verifying information with watermark where a digital watermark is added to said authentication verifying information.

7. An object for authentication verification according to claim 3, 4, 5 or 6, wherein said encrypted information for authentication certifying is encrypted by using a common-key of a common-key cryptosystem under the control of an issuer of said object for authentication verification.

8. An object for authentication verification according to claim 3, 4, 5 or 6, wherein said encrypted information for authentication certifying is encrypted by using a secret-key of a public-key cryptosystem under the control of an issuer of said object for authentication verification.

9. An object for authentication verification according to claim 3, 4, 5 or 6, wherein said encrypted information for authentication certifying is encrypted by using a public-key of a public-key cryptosystem under the control of an issuer of said object for authentication verification.

10. An object for authentication verification according to claim 1, wherein said iridescent substance is an iridescence piece with a thin layer of a transparent resin.

11. An object for authentication verification according to claim 1, wherein said iridescent substance is a thin layer of a transparent resin with non-uniform thickness.

12. An object for authentication verification according to claim 1, wherein said iridescent substance is a thin layer of scattered transparent resin drops.

13. An object for authentication verification according to claim 1, wherein said iridescent substance is a thin layer of a transparent resin with non-uniform thickness and scattered in pits of uniform depth as formed on said authentication verifying chip.

14. An object for authentication verification according to claim 1, wherein said iridescent substance is a thin layer of a transparent resin scattered in pits of non-uniform depth as formed in said authentication verifying chip.

15. An object for authentication verification according to claim 1, wherein said iridescent substance is a thin layer of a transparent resin filled based on quaternary random numbers in pits with uniform depth regularly formed on said authentication verifying chip.

16. An object for authentication verification according to claim 10, 11, 12, 13, 14 or 15, wherein said authentication verifying chip has a cover made of a hard material for protecting said authentication verifying chip.

17. An object for authentication verification according to claim 10, 11, 12, 13, 14 or 15, wherein an upper surface of a card base plate where said authentication verifying chip comes into contact is in light-absorbing black color.

18. An object for authentication verification according to claim 10, 11, 12, 13, 14 or 15, wherein anti-luster processing is performed on a surface of said transparent resin.

19. An object for authentication verification according to claim 10, 11, 12, 13, 14 or 15, wherein a reflection preventive film is formed on said transparent resin.

20. An object for authentication verification according to claim 10, 11, 12, 13, 14 or 15, wherein said authentication verifying chip is a portion as cut out from a large original plate.

21. An object for authentication verification according to claim 1, wherein a position alignment mark for reading is provided in said authentication verifying chip.

22. An object for authentication verification according to claim 21, wherein there is one mark for the position alignment mark for reading.

23. An object for authentication verification according to claim 21, wherein there are a plurality of position alignment marks for reading.

24. An object for authentication verification according to claim 1, wherein there are provided a line to start the reading, a line to finish the reading, and a line indicating the reading end.

25. An object for authentication verification according to claim 1, wherein there is provided a mark for reading synchronization signal.

26. An authentication verifying chip reading device for reading an authentication verifying chip having a specific pattern of an iridescent substance of a transparent resin thin layer attached to an object for authentication verification, wherein:
said reading device is provided with a white light emitting diode for lighting said authentication verifying chip and a color camera for photographing the lighted authentication verifying chip.

27. An authentication verifying chip reading device for reading an authentication verifying chip having a specific pattern of an iridescent substance of a transparent resin thin layer attached to an object for authentication verification, wherein:
said reading device is provided with a red light emitting diode, a green light emitting diode, and a blue light emitting diode for lighting said authentication verifying chip, and with a color camera for photographing the lighted authentication verifying chip.

28. An authentication verifying chip reading device for reading an authentication verifying chip having a specific pattern of an iridescent substance of a transparent resin thin layer attached to an object for authentication verification, wherein:
said reading device is provided with a red light emitting diode, a green light emitting diode, and a blue light emitting diode for sequentially lighting said authentication verifying chip and with a monochrome camera for sequentially photographing the lighted authentication verifying chip.

29. An authentication verifying chip reading device for reading an authentication verifying chip having a specific pattern of an iridescent substance of a transparent resin thin layer attached to an object for authentication verification, wherein:
said reading device is provided with a light emitting/detecting elements matrix with the same area as that of the authentication verifying chip.

30. An authentication verifying chip reading device for reading an authentication verifying chip having a specific pattern of an iridescent substance of a transparent resin thin layer attached to an object for authentication verification, wherein:
said reading device is provided with a mechanism to move said authentication verifying chip and a light emitting/detecting elements array with the same width as that of said authentication verifying chip.

31. An authentication verifying chip reading device for reading an authentication verifying chip having a specific pattern of an iridescent substance of a transparent resin thin layer attached to an object for authentication verification, wherein:
said reading device is provided with a mechanism for moving said authentication verifying chip and light emitting/detecting elements movable in a direction of width of said authentication verifying chip.

32. An authentication verifying chip reading device for reading an authentication verifying chip having a specific pattern of an iridescent substance of a transparent resin thin layer attached to an object for authentication verification, wherein:
said reading device is provided with a mechanism for moving said authentication verifying chip, a reflecting paraboloid mirror in a cylindrical shape, a polygonal mirror being disposed at a focal point of said reflecting mirror, and light emitting/detecting elements being disposed behind said reflecting mirror.

33. A reading device according to claim 32, wherein said paraboloid is a full-paraboloid, a light hole is formed at the center of said reflecting mirror, and said light emitting/detecting elements are disposed behind said reflecting mirror.

34. A reading device according to claim 32, wherein said paraboloid is a half-paraboloid.

35. A reading device according to claim 32, wherein said paraboloid is a paraboloid smaller than a half-paraboloid, and said polygonal mirror is disposed in an offset arrangement.

36. A method for reading a specific pattern of an iridescent substance in form of a thin layer of a transparent resin on an authentication verifying chip, wherein said method comprises the steps of:
- dividing a surface of the iridescence pattern of said authentication verifying chip to a plurality of planes;
- dividing each of said plurality of planes further to a plurality of planes;
- repeating said dividing operations;
- detecting iridescence on a plurality of the divided planes; and
- identifying planes of said iridescence pattern according to the detected iridescence.

37. An authentication judging method for judging authenticity of an object for authentication verification, wherein said method comprises the steps of:
- for preparing said object for authentication verification,
- preparing an authentication verifying chip where authentication verifying information, which is based on an iridescent substance in a thin layer of a transparent resin and copy-unable, is stored;
- reading the authentication verifying information on said authentication verifying chip;
- digitizing said authentication verifying information and obtaining digital authentication verifying information;
- encrypting said digital authentication verifying information and obtaining encrypted digital authentication verifying information;
- storing said encrypted digital authentication verifying information on an authentication certifying chip; and
- for judging authenticity of said object for authentication verification,
- reading the encrypted digital authentication verifying information stored in said authentication certifying chip;
- decrypting said encrypted digital authentication verifying information and obtaining decrypted digital authentication verifying information;
- reading said authentication verifying information on said authentication verifying chip;
- digitizing said authentication verifying information and obtaining digital authentication verifying information; and
- judging authenticity of said object for authentication verification by comparing said digital authentication verifying information with said decrypted digital authentication verifying information.

38. An authentication judging method for judging authenticity of an object for authentication verification, wherein said method comprises the steps of:
- for preparing said object for authentication verification,
- preparing an authentication verifying chip where authentication verifying information, which is based on an iridescent substance in a thin layer of a transparent resin and copy-unable, is stored;
- reading the authentication verifying information on said authentication verifying chip;
- digitizing said authentication verifying information and obtaining digital authentication verifying information;
- hashing said digital authentication verifying information and obtaining hash-valued authentication verifying information;
- encrypting said hash-valued authentication verifying information and obtaining encrypted hash-valued authentication verifying information;
- storing said encrypted hash-valued authentication verifying information on an authentication certifying chip; and
- for judging authenticity of said object for authentication verification,
- reading the encrypted hash-valued authentication verifying information stored in said authentication certifying chip;
- decrypting said encrypted hash-valued authentication verifying information and obtaining decrypted hash-valued authentication verifying information;
- reading authentication verifying information on said authentication verifying chip;
- digitizing said authentication verifying information and obtaining digital authentication verifying information;
- hashing said digital authentication verifying information and obtaining hash-valued authentication verifying information; and
- judging authenticity of said object for authentication verification by comparing said hash-valued authentication verifying information with said decrypted hash-valued authentication verifying information.

39. An authentication judging method for judging authenticity of an object for authentication verification, wherein said method comprises the steps of:
- for preparing said object for authentication verification,
- preparing an authentication verifying chip where authentication verifying information, which is based on an iridescent substance in a thin layer of a transparent resin and copy-unable, is stored;
- reading the authentication verifying information on said authentication verifying chip;
- digitizing said authentication verifying information and obtaining digital authentication verifying information;
- adding object identifying information to said digital authentication verifying information, and obtaining authentication verifying information added with object identifying information;
- encrypting said authentication verifying information added with object identifying information and obtaining encrypted authentication verifying information added with object identifying information;
- storing said encrypted authentication verifying information added with object identifying information in an authentication certifying chip; and
- for judging authenticity of said object for authentication verification,
- reading the encrypted authentication verifying information added with object identifying information stored in said authentication certifying chip;
- decrypting said encrypted authentication verifying information added with object identifying information and obtaining decrypted authentication verifying information added with object identifying information;
- removing the object identifying information from said decrypted authentication verifying information added with object identifying information and obtaining decrypted authentication verifying information;
- reading authentication verifying information on said authentication verifying chip;
- digitizing said authentication verifying information and obtaining digital authentication verifying information; and
- judging authenticity of said object for authentication verification by comparing said digital authentication verifying information with said decrypted authentication verifying information.

40. An authentication judging method for judging authenticity of an object for authentication verification, wherein said method comprises the steps of:

for preparing said object for authentication verification, preparing an authentication verifying chip where authentication verifying information, which is based on an iridescent substance in a thin layer of a transparent resin and copy-unable, is stored;

reading authentication verifying information on said authentication verifying chip;

digitizing said authentication verifying information and obtaining digital authentication verifying information;

adding object identifying information to said digital authentication verifying information, and obtaining authentication verifying information added with object identifying information;

encrypting said authentication verifying information added with object identifying information and obtaining encrypted authentication verifying information added with object identifying information;

storing said encrypted authentication verifying information added with object identifying information in an authentication certifying chip; and for judging authenticity of said object for authentication verification, reading the encrypted authentication verifying information added with object identifying information stored in said authentication certifying chip;

decrypting said encrypted authentication verifying information added with object identifying information and obtaining decrypted authentication verifying information added with object identifying information;

reading authentication verifying information on said authentication verifying chip;

digitizing said authentication verifying information and obtaining digital authentication verifying information;

adding object identifying information to said digital authentication verifying information, and obtaining authentication verifying information added with object identifying information; and judging authenticity of said object for authentication verification by comparing said authentication verifying information added with object identifying information to said decrypted authentication verifying information added with object identifying information.

41. An authentication judging method for judging authenticity of an object for authentication verification, wherein said method comprises the steps of:

for preparing said object for authentication verification, preparing an authentication verifying chip where authentication verifying information, which is based on an iridescent substance in a thin layer of a transparent resin and copy-unable, is stored;

reading the authentication verifying information on said authentication verifying chip;

digitizing said authentication verifying information and obtaining digital authentication verifying information;

adding a digital watermark to said digital authentication verifying information and obtaining digital authentication verifying information added with the watermark;

encrypting said digital authentication verifying information added with the watermark and obtaining encrypted digital authentication verifying information added with the watermark;

storing said encrypted digital authentication verifying information added with the watermark in an authentication certifying chip; and for judging authenticity of said object for authentication verification, reading the encrypted digital authentication verifying information added with the watermark stored in said authentication certifying chip;

decrypting said encrypted digital authentication verifying information added with the watermark and obtaining decrypted digital authentication verifying information added with the watermark;

removing the watermark from said decrypted digital authentication verifying information added with the watermark and obtaining decrypted digital authentication verifying information;

reading authentication verifying information on said authentication verifying chip;

digitizing said authentication verifying information thus read and obtaining digital authentication verifying information; and judging authenticity of said object for authentication verification by comparing said digital authentication verifying information with said decrypted digital authentication verifying information.

42. An authentication judging method for judging authenticity of an object for authentication verification, wherein said method comprises the steps of:

for preparing said object for authentication verification, preparing an authentication verifying chip where authentication verifying information, which is based on an iridescent substance in a thin layer of a transparent resin and copy-unable, is stored;

reading the authentication verifying information on said authentication verifying chip;

digitizing said authentication verifying information and obtaining digital authentication verifying information;

adding a digital watermark to said digital authentication verifying information and obtaining digital authentication verifying information added with the watermark;

encrypting said digital authentication verifying information added with the watermark and obtaining encrypted digital authentication verifying information added with the watermark;

storing said encrypted digital authentication verifying information added with the watermark in an authentication certifying chip; and for judging authenticity of said object for authentication verification, reading the encrypted digital authentication verifying information added with the watermark stored in said authentication certifying chip;

decrypting said encrypted digital authentication verifying information added with the watermark and obtaining decrypted digital authentication verifying information added with the watermark;

reading authentication verifying information on said authentication verifying chip;

digitizing said authentication verifying information thus read and obtaining digital authentication verifying information;

adding a digital watermark to said digital authentication verifying information and obtaining digital authentication verifying information added with the watermark; and judging authenticity of said object for authentication verification by comparing said digital authentication verifying information added with the watermark to said decrypted digital authentication verifying information added with the watermark.

* * * * *